US012705611B2

(12) United States Patent
Barski

(10) Patent No.: US 12,705,611 B2
(45) Date of Patent: Aug. 11, 2026

(54) GENERATING A NEW KEY PAIR FOR UTILIZATION WITHIN A CONTRACT BLOCKCHAIN

(71) Applicant: RAISE MARKETPLACE, LLC, Dover, DE (US)

(72) Inventor: Conrad Hancock Barski, Evanston, IL (US)

(73) Assignee: Raise Marketplace, LLC, Dover, DE (US)

( * ) Notice: Subject to any disclaimer, the term of this patent is extended or adjusted under 35 U.S.C. 154(b) by 572 days.

(21) Appl. No.: 18/173,108

(22) Filed: Feb. 23, 2023

(65) Prior Publication Data

US 2023/0206229 A1 Jun. 29, 2023

Related U.S. Application Data

(63) Continuation of application No. 17/932,992, filed on Sep. 16, 2022, now abandoned, which is a (Continued)

(51) Int. Cl.
*G06Q 20/38* (2012.01)
*G06Q 20/40* (2012.01)

(52) U.S. Cl.
CPC ....... *G06Q 20/389* (2013.01); *G06Q 20/3825* (2013.01); *G06Q 20/401* (2013.01); *G06Q 20/405* (2013.01)

(58) Field of Classification Search
None
See application file for complete search history.

(56) References Cited

U.S. PATENT DOCUMENTS 8,423,463 B1 4/2013 Matthews
9,135,612 B1 9/2015 Proctor
(Continued)

FOREIGN PATENT DOCUMENTS

WO WO-2020197642 A1 * 10/2020 .............. H04L 9/50

OTHER PUBLICATIONS

K. Christidis and M. Devetsikiotis, "Blockchains and Smart Contracts for the Internet of Things," in IEEE Access, vol. 4, pp. 2292-2303, 2016, doi: 10.1109/ACCESS.2016.2566339. (Year: 2016).*
(Continued)

*Primary Examiner* — Michelle T Kringen
(74) *Attorney, Agent, or Firm* — Protectors of Tech IP Law; Timothy D. Taylor

(57) ABSTRACT

A method includes detecting a need by a second computing device to generate a new public/private key pair for utilization within a contract blockchain, where each contract block includes a contract package that includes contract information, and where a first computing device is a current owner of the contract blockchain. The method further includes obtaining control over the contract blockchain from the first computing device in accordance with a secure custody protocol. The method further includes generating a next contract block of the contract blockchain to include a signature of the second computing device utilizing a private key of the new public/private key pair over updated contract information that indicates signatures from the first computing device or the second computing device is acceptable for adding an additional contact block to the contract blockchain. The method further includes returning control of the contract blockchain to the first computing device.

20 Claims, 49 Drawing Sheets

Related U.S. Application Data continuation of application No. 17/305,585, filed on Jul. 9, 2021, now abandoned, which is a continuation-in-part of application No. 15/208,451, filed on Jul. 12, 2016, now Pat. No. 11,062,366.

(60) Provisional application No. 62/354,679, filed on Jun. 24, 2016.

(56) References Cited

U.S. PATENT DOCUMENTS

| | | | | |
|---|---|---|---|---|
| 2012/0226604 | A1 | 9/2012 | Isaacson | |
| 2013/0254086 | A1 | 9/2013 | Joa | |
| 2013/0297511 | A1 | 11/2013 | Monk | |
| 2016/0063483 | A1 | 3/2016 | Gula | |
| 2016/0125492 | A1 | 5/2016 | Walker | |
| 2016/0267474 | A1 | 9/2016 | Lingham | |
| 2017/0046799 | A1 * | 2/2017 | Chan | G06Q 20/4016 |
| 2017/0243208 | A1 | 8/2017 | Kurian | |

OTHER PUBLICATIONS

McConaghy, Trent, et al. “Bigchaindb: a scalable blockchain database.” white paper, BigChainDB (2016). (Year: 2016).

* cited by examiner

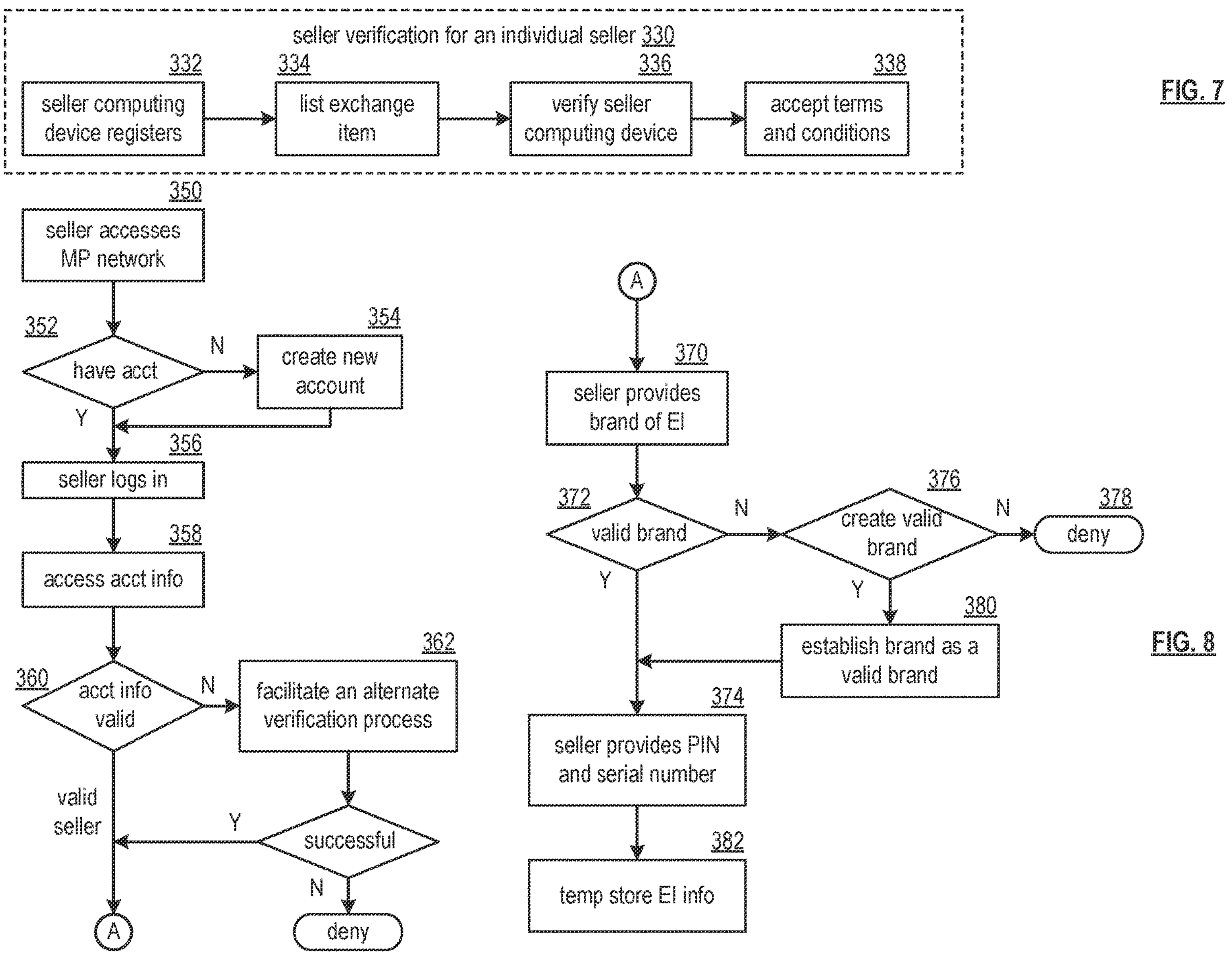

seller verification for an individual seller 330
332
seller computing device registers
334
list exchange item
336
verify seller computing device
338
accept terms and conditions
FIG. 7
350
seller accesses MP network
352
have acct
N
354
create new account
Y
356
seller logs in
358
access acct info
360
acct info valid
N
362
facilitate an alternate verification process
valid seller
Y
successful
N
A
deny
A
370
seller provides brand of EI
372
valid brand
N
376
create valid brand
N
378
deny
Y
Y
380
establish brand as a valid brand
FIG. 8
374
seller provides PIN and serial number
382
temp store EI info

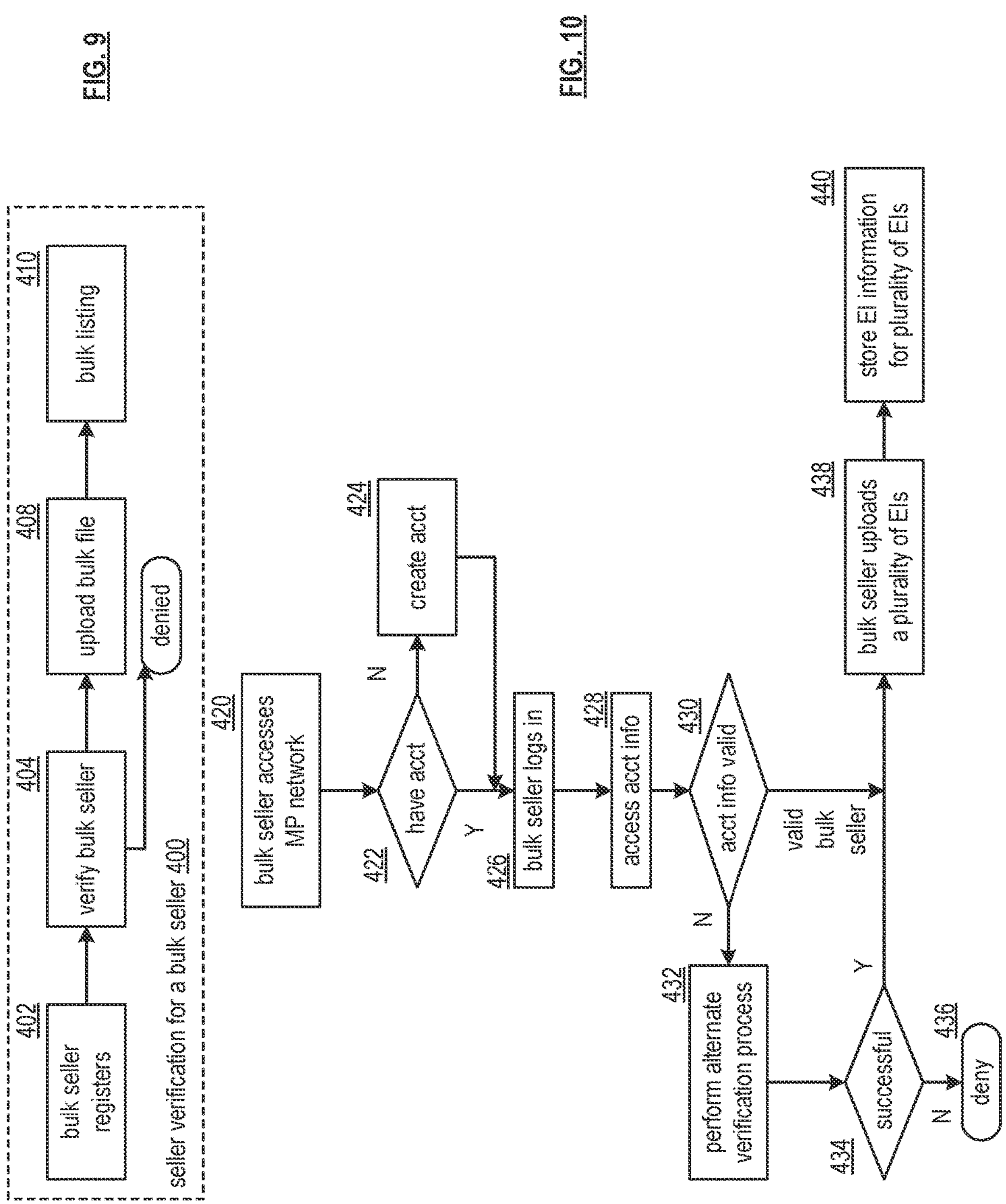
402
bulk seller registers
404
verify bulk seller
408
upload bulk file
410
bulk listing
denied
seller verification for a bulk seller 400
FIG. 9
420
bulk seller accesses MP network
422
have acct
N
424
create acct
Y
426
bulk seller logs in
428
access acct info
430
acct info valid
N
432
perform alternate verification process
valid bulk seller
434
successful
Y
N
436
deny
438
bulk seller uploads a plurality of EIs
440
store EI information for plurality of EIs
FIG. 10

| EI s/n | owner | conditions | EI rules |
|---|---|---|---|
| 001 | AA | a1,y4,z7 | set 1 |
| 002 | BD | a2,z3 | set 1 |
| 003 | FG | k1,m12 | set 1 |
| 004 | PE | a11,c4,d6 | set 3 |
| 005 | AA | e3,f6,p5 | set 4 |

| issuer | merchant | agreement |
|---|---|---|
| A_1 | A_1_n | agr. aa |
| A_1 | B_1C | agr. ks |
| DA_3 | DA_3 | agr. da |
| F_Z_3 | F_Z_3_m | agr. ft |
| B_K | B_K | agr. bk |

| EI s/n | issuer | owner | EI info | conditions | EI rules | offer for sale | use options |
|---|---|---|---|---|---|---|---|
| 001 | A_1 | AA | 01 info | x1,y4,z7 | set 1 | No | A_1_n |
| 002 | A_1 | BD | 02 info | x2,z3 | set 1 | Yes | A_1_n & B_1_C |
| 003 | DA_3 | FG | 03 info | k1,m12 | set 1&2 | No | DA_3 |
| 004 | F_Z_3 | PE | 04 info | n/a | none | Yes | F_Z_3_m |
| 005 | B_K | DZ | 05_1 info | e3,f6,p5 | set 4 | no | B_K |

| EI s/n | issuer | EI info | use options |
|---|---|---|---|
| 005 | B_K | 05_1 info | B_K |

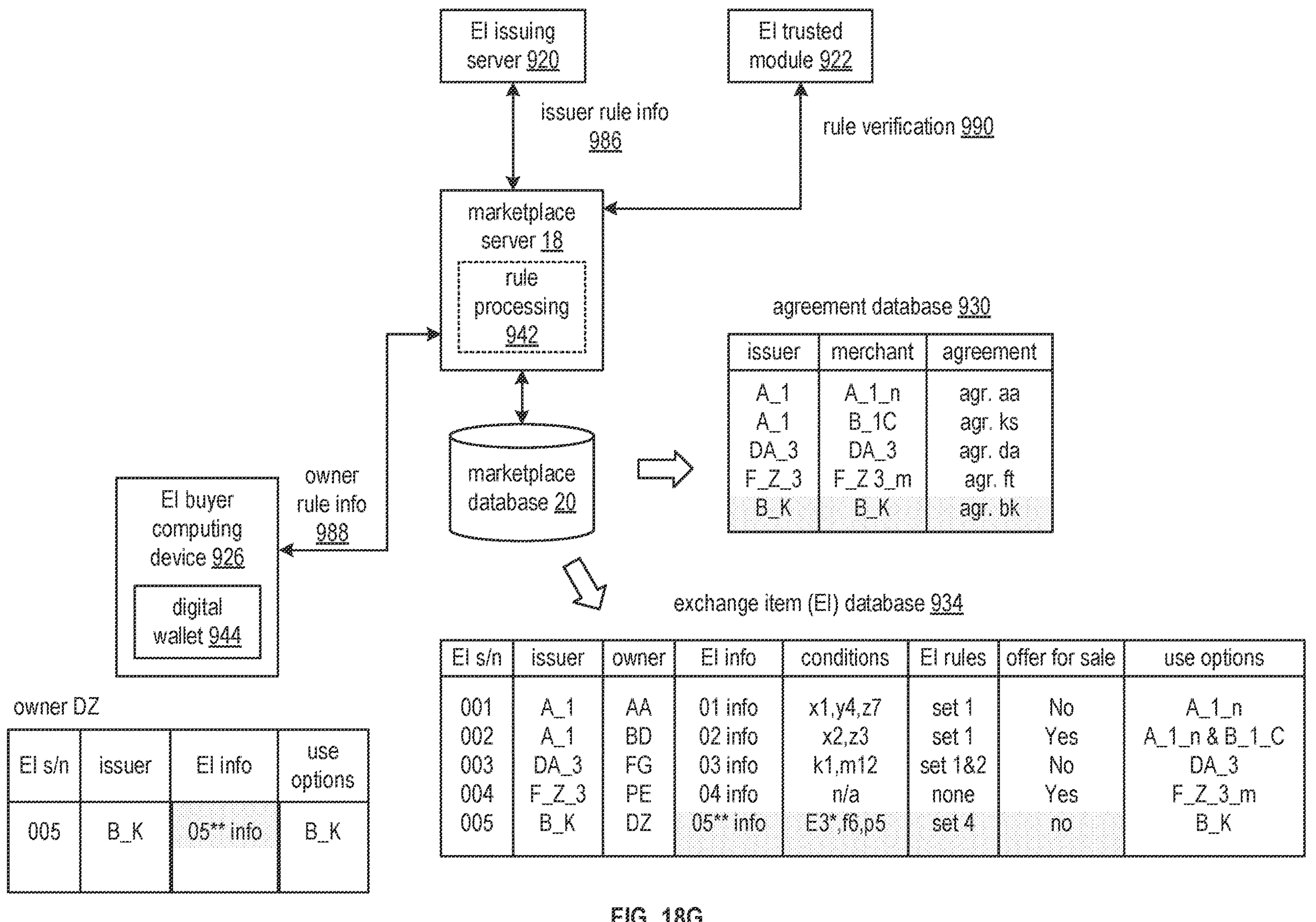

agreement database 930

| issuer | merchant | agreement |
|---|---|---|
| A_1 | A_1_n | agr. aa |
| A_1 | B_1C | agr. ks |
| DA_3 | DA_3 | agr. da |
| F_Z_3 | F_Z 3_m | agr. ft |
| B_K | B_K | agr. bk |

exchange item (EI) database 934

| EI s/n | issuer | owner | EI info | conditions | EI rules | offer for sale | use options |
|---|---|---|---|---|---|---|---|
| 001 | A_1 | AA | 01 info | x1,y4,z7 | set 1 | No | A_1_n |
| 002 | A_1 | BD | 02 info | x2,z3 | set 1 | Yes | A_1_n & B_1_C |
| 003 | DA_3 | FG | 03 info | k1,m12 | set 1&2 | No | DA_3 |
| 004 | F_Z_3 | PE | 04 info | n/a | none | Yes | F_Z_3_m |
| 005 | B_K | DZ | 05** info | E3*,f6,p5 | set 4 | no | B_K |

owner DZ

| EI s/n | issuer | EI info | use options |
|---|---|---|---|
| 005 | B_K | 05** info | B_K |

FIG. 18G exchange item (EI) database 934

| EI s/n | issuer | owner | EI info | conditions | EI rules | offer for sale | use options | block chain control | block chain location |
|---|---|---|---|---|---|---|---|---|---|
| 001 | A_1 | AA | 01 info | x1,y4,z7 | set 1 | No | A_1_n | owner | owner |
| 002 | A_1 | BD | 02 info | x2,z3 | set 1 | Yes | A_1_n & B_1_C | MP server | MP server |
| 003 | DA_3 | FG | 03 info | k1,m12 | set 1&2 | No | DA_3 | merchant | MP server |
| 004 | F_Z_3 | PE | 04 info | n/a | none | Yes | F_Z_3_m | issuer | owner |
| 005 | B_K | AA | 05 info | E3,f6,p5 | set 4 | yes | B_K | trusted module | owner |

FIG. 18H

| issuer | merchant | agreement |
|---|---|---|
| A_1 | A_1_n | agr. aa |
| A_1 | B_1C | agr. ks |
| DA_3 | DA_3 | agr. da |
| F_Z_3 | F_Z 3_m | agr. ft |
| B_K | B_K | agr. bk |

GENERATING A NEW KEY PAIR FOR UTILIZATION WITHIN A CONTRACT BLOCKCHAIN

CROSS REFERENCE TO RELATED PATENTS

The present U.S. Utility patent application claims priority pursuant to 35 U.S.C. § 120 as a continuation of U.S. patent application Ser. No. 17/932,992, filed Sep. 16, 2022, entitled, "SECURELY PROCESSING EXCHANGE ITEMS IN A DATA COMMUNICATION SYSTEM," which is a continuation of U.S. patent application Ser. No. 17/305,585, filed Jul. 9, 2021, entitled, "RESOLVING A PARAMETER ERROR ASSOCIATED WITH A PRIMARY BLOCKCHAIN," which is a continuation in part of U.S. patent application Ser. No. 15/208,451, filed Jul. 12, 2016, entitled, "SECURELY PROCESSING EXCHANGE ITEMS IN A DATA COMMUNICATION SYSTEM," issued as U.S. Pat. No. 11,062,366 on Jul. 13, 2021, which claims priority pursuant to 35 U.S.C. § 119(e) to U.S. Provisional Application No. 62/354,679, entitled "SECURELY PROCESSING EXCHANGE ITEMS IN A DATA COMMUNICATION SYSTEM," filed Jun. 24, 2016, expired, all of which are hereby incorporated herein by reference in their entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computer networks and more particularly to an exchange item marketplace network.

Description of Related Art

The use of credit cards, debit cards, and gift cards to pay for goods and services is well known. It is further known to use services such as PayPal™ or Apple Pay™ to expand the use of credit cards and debit cards through computing devices (e.g., computers, tablets, cell phones, etc.). The use of these services is aided by the standardized numbering system and format used by credit card issuers and debit card issuers.

For a credit card and debit card transaction, the credit or debit cardholder presents the credit or debit card to a merchant (e.g., on line or brick & mortar) to pay for a purchase. The merchant uses point of sale (POS) equipment to capture the information of the credit or debit card and to enter the amount of the purchase. This information is sent to an acquirer (e.g., the financial institution of the merchant). The acquirer sends the transaction information via a secure network of a credit card company to the cardholder's issuer (e.g., a financial institution that issued the credit or debit card to the cardholder).

The issuer approves or declines the transaction and sends the response back to the acquirer via the secure network of the credit card company. The acquirer sends the response (e.g., approved or declined) to the merchant to complete the transaction. Money, however, is not exchanged at the time of purchase, but is done during clearing and settlement.

Clearing and settlement begins when the merchant deposits the transaction receipt with the acquirer. The acquirer credits the merchant's account and sends the transaction receipt to the issuer via the secure network. The issuer posts the transaction to the cardholder's account. The cardholder pays the issuer in response to receiving a monthly statement.

The issuance and use of a gift card is significantly different than that of a credit card. FIG. 1 illustrates a diagram regarding the issuance and use of a gift card. A branded company (e.g., a retailer, a chain store, a restaurant, etc.) issues a request to create gift cards to a processor service. The processor service creates the gift cards, which may be issued with specific values or issued as blanks; where the value is specified at the time of purchase.

The processor service provides the gift cards to a distributor who is responsible for distributing the gift cards so that a consumer may purchase them. For example, the distributor may provide gift cards to merchants so they may sell the gift cards. At some point, a consumer purchases a gift card (e.g., a sporting goods company gift card for $50.00). The payment for the gift card is processed such that the distributor, processing service, and branded company each are paid their respective shares.

If the gift card is used, a merchant (e.g., a franchise owner of the branded company) captures information of the gift card via point of sale (POS) equipment. The information of the gift card is processed to determine if it is a valid gift card and to determine the balance remaining on the gift card. If the card is valid, the use of the gift card is authorized up to the balance remaining on the gift card. Once the use is complete, the balance is updated, processing fees are paid, and the branded company is debited.

Another difference between credit cards and gift cards is that gift cards do not have a standardized numbering system or format. As such, gift cards can have one of thousands of different numbering systems and formats, which have to be recognizable by the POS equipment.

Yet another different between credit cards and gift cards is when money is processed. For credit cards, money is not processed until a purchase occurs, while gift cards are purchased and then subsequently used. As such, money is processed at the time of purchase of the gift card and again if the gift card is used.

A still further difference between credit cards and purchased gift cards is that, if a credit card goes unused, no money is spent. In contrast, if a purchased gift card goes unused, money has been spent to acquire the card, but no goods or services are acquired. It is estimated that billions of dollars' worth of purchased gift cards go unused annually. While this may be a favorable scenario for the branded company, it is not a favorable scenario for consumers.

Raise Marketplace Inc. introduced a system that enables gift cardholders to sell their unused or unwanted gift cards. This system allows a gift card seller to post a gift card for sale in a virtual gift card marketplace. Buyers can access the virtual gift card marketplace and purchase gift cards that are offered for sale. When a gift card is purchased, the system processes the purchase to debit the buyer, credit the seller, and provide the gift card to the buyer.

The system may provide the physical gift card to the buyer, which requires obtaining the physical gift card from the seller and delivering it to the buyer. Alternatively, the system provides the information of the gift card to the user in a voucher format (e.g., a document that the buyer can print off that includes the relevant information of the gift card).

BRIEF DESCRIPTION OF THE SEVERAL VIEWS OF THE DRAWING(S)

FIG. 7 is a diagram of an embodiment of individual seller verification in an exchange item marketplace network in accordance with the present invention;

FIG. 8 is a logic diagram of an embodiment of a method of individual seller verification in an exchange item marketplace network in accordance with the present invention;

FIG. 9 is a diagram of an embodiment of bulk seller verification in an exchange item marketplace network in accordance with the present invention;

FIG. 10 is a logic diagram of an embodiment of a method of bulk seller verification in an exchange item marketplace network in accordance with the present invention;

FIG. 18G is a schematic block diagram of another embodiment of an exchange item marketplace network in accordance with the present invention;

FIG. 18H is a diagram of an exchange item database in accordance with the present invention;

DETAILED DESCRIPTION OF THE INVENTION

Figure 1:
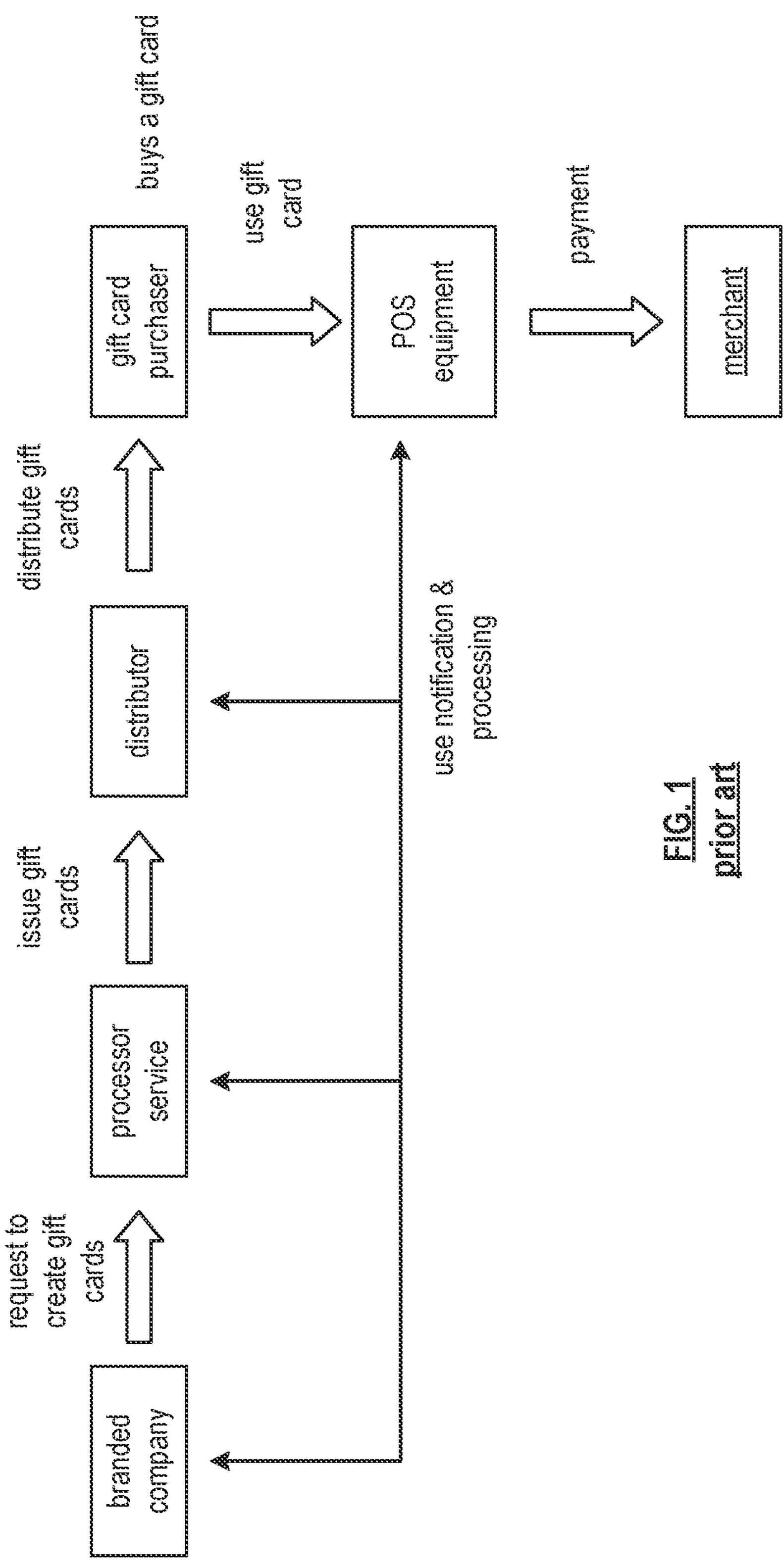
FIG. 1 is a schematic block diagram of a prior art gift card issuance and use system.
Figure 2:
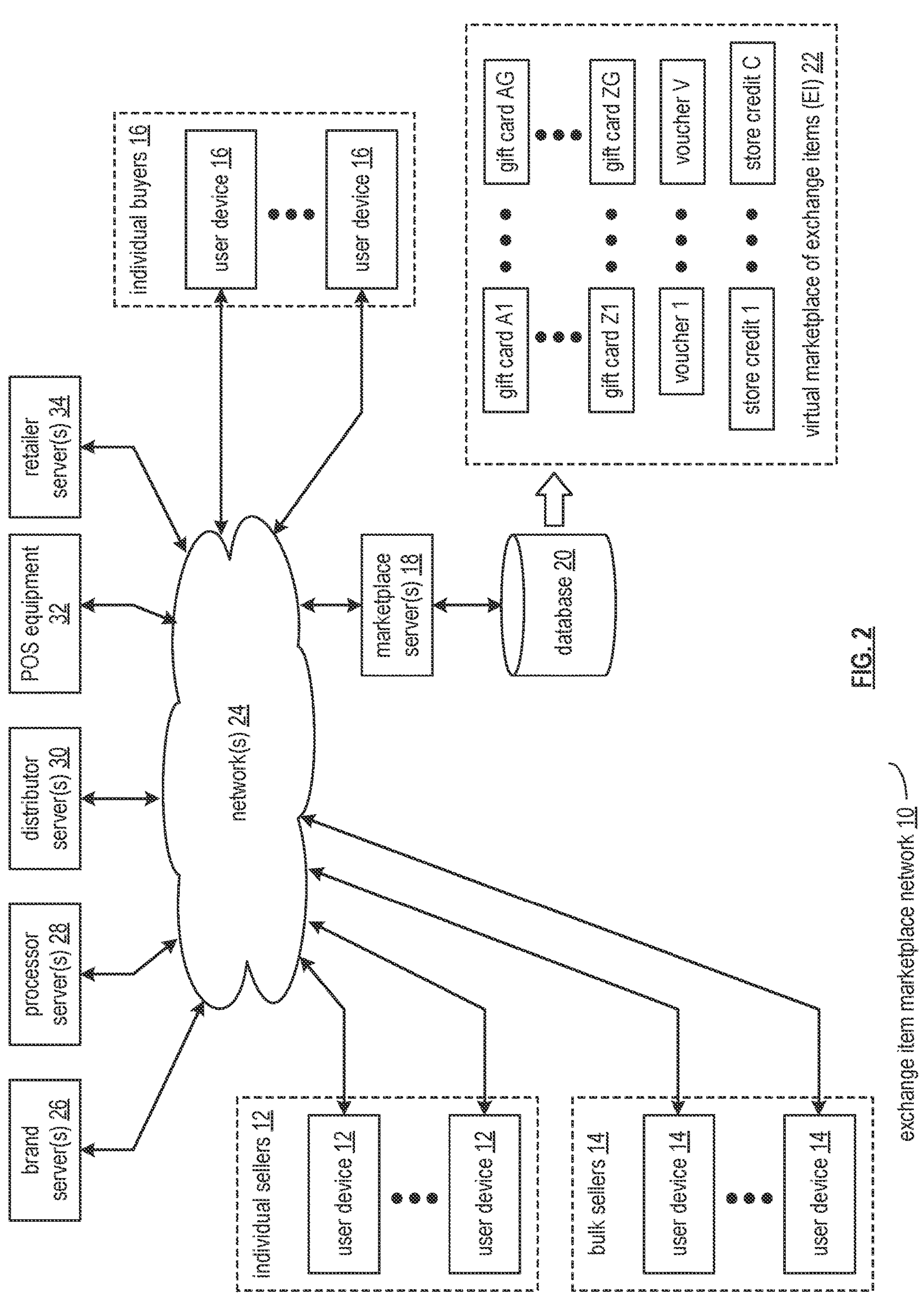
FIG. 2 is a schematic block diagram of an embodiment of an exchange item marketplace network in accordance with the present invention.
Figure 4:
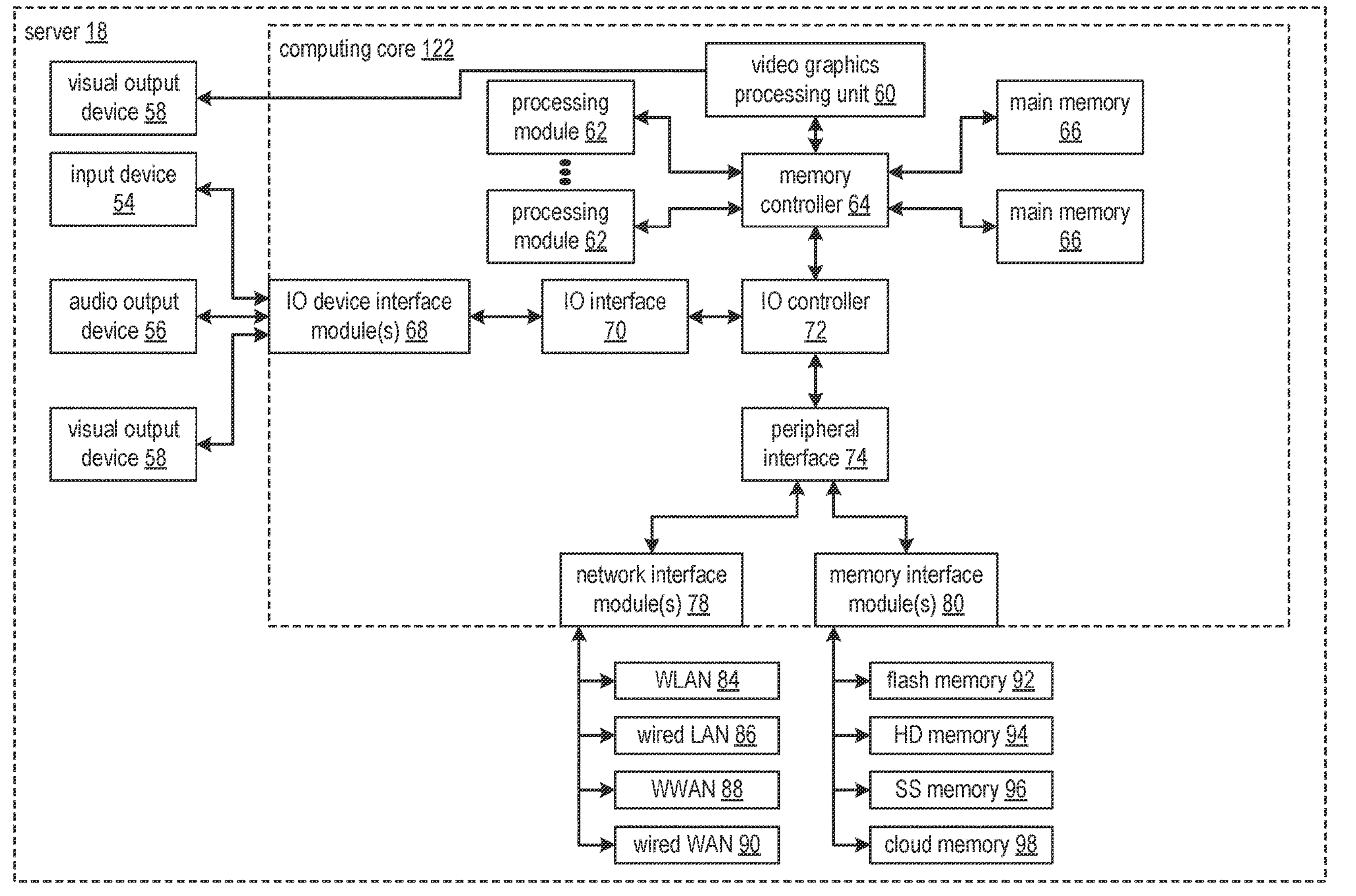
FIG. 4 is a schematic block diagram of an embodiment of a marketplace server of exchange item marketplace network in accordance with the present invention.

FIG. 2 is a schematic block diagram of an embodiment of an exchange item marketplace network 10 that includes user devices 12 of individual sellers, user devices 14 of bulk sellers, user devices 16 of individual buyers, one or more marketplace servers 18 (an example embodiment is shown in FIG. 4), one or more databases 20, one or more networks 24, one or more brand server(s) 26, one or more processor servers 28, one or more distributor servers 30, point of sale (POS) equipment 32, and one or more retailer servers 34. Hereafter, the exchange item marketplace network 10 may be interchangeably referred to as a marketplace network, a system, a communication system, a data communication system, and a communication network. The one or more marketplace servers 18 process, and the one or more databases 20 store a virtual marketplace of exchange items 22. Hereafter, the virtual marketplace of exchange items 22 may be interchangeably referred to as a virtual marketplace, a marketplace, and exchange items.

Each of the user devices 12, 14, and 16 is a computing device that includes a computing core. In general, a computing device is any electronic device that can communicate data, process data, and/or store data. A further generality of a computing device is that it includes a central processing unit (CPU), a memory system, user input/output interfaces, peripheral device interfaces, and an interconnecting bus structure.

As specific examples, each of the user devices 12-16 may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment that includes a computing core. An embodiment of a computing device 12-16 is further described below with reference to FIG. 3.

The exchange item marketplace network 10 supports the selling and purchasing of exchange items. An exchange item is a closed loop financial instrument and/or other digital goods. For example, a closed loop financial instrument is a gift card, a voucher, a store credit, and/or other brand company (or merchant) sponsored form of credit for a specific use (e.g., in a specific store, in a specific chain of stores, for a particular type of goods, etc.). A closed loop financial instrument is distinguished from an open loop financial instrument, such as a credit card.

A digital good is digital item that can legally be sold or resold by an individual. For example, the digital item may be an original digital book, an original digital photograph, an original video clip, a purchased video game, a purchased software application, a purchase video, a purchased music file, a purchased digital book, a purchased audio book, etc.

In support of selling an exchange item, the marketplace server 18 communicates with a user device of a seller (e.g., individual or bulk) to verify the user device (and the seller) and to ascertain information regarding the exchange item being offered for sale. For example, the marketplace server 18 verifies user information (e.g., the seller's name, account, personal identification number (PIN), a user identification number (ID), payment account information (e.g., a credit card number, checking or savings account information), seller's mailing address, etc.) and device information (e.g., an IP address, device serial number, a marketplace application ID, etc.) of the seller's computing device. Verification of the seller and corresponding computing device is discussed in greater detail with reference to one or more of FIGS. 6A-6D, and 7-10.

Upon receiving the information regarding the exchange item, which includes a brand name (e.g., a coffee franchise, a sporting good franchise, an electronics store, etc.), a serial number, a selling price, a remaining balance, restrictions of use, a bar code, and/or other pertinent information, the marketplace server 18 verifies it. When the seller and the information regarding the exchange item are verified, the marketplace server 18 posts it in the virtual marketplace of exchange items 22, which is stored in database 20.

The marketplace server 18 posts the exchange item in the virtual marketplace 22 by creating a digital representation of the exchange item. To do this, the server creates a digital image of the exchange item, determines the brand of the exchange item, and the information regarding the exchange item (e.g., a brief description, brand, selling price, balance, serial number, restrictions (if any), expiration date (if any), and/or any other pertinent information). In accordance with an organization protocol of the virtual marketplace, the digital representation of the exchange item is added. For instance, the organization protocol groups exchange items by types (e.g., restaurants, sporting goods, coffee shops, automotive goods, etc.), by brands (e.g., a sporting goods chain, a coffee shop chain, etc.), by sales price, by balance of the exchange item, by a savings value (e.g., a difference between the balance and the sales price), by expiration date, by date offered for sale, by special promotions, by seller, by restrictions, by a brief description (e.g., title of a video for resale), and/or any other organization scheme that lends itself to searching for particular items.

As such, for a particular exchange item offered for sale, its digital representation is added to the database 20 and will be displayed within a grouping per the organization protocol when a potential buyer or other user of the system 10 selects the grouping. In one example, if the exchange item is a gift card, a digital image of the gift card is displayed along with at least some of the related information (e.g., sales price, balance, etc.). If the gift card includes a logo of the branded company offering the gift card, the logo is often displayed in accordance with requirements of the branded company.

A potential buyer of an exchange item offered for sale accesses the system 10 using its user device 16. For example, the user device 16 logs into the system 10. If the user device 16 is associated with a buyer that does not have an account with the system 10, the buyer creates one through the user device 16 with the system. For buyers with an account, the marketplace server 18 verifies the buyer user device 16 before allowing it access to the virtual marketplace 22. The buyer verification process is discussed in greater detail with reference to one or more of FIGS. 5, 6A-6D, and 13.

Once the buyer is verified, the buyer computing device 16 is allowed access the virtual marketplace 22. The buyer computing device 16 uses searching criteria that are in accordance with the organization protocol to search the virtual marketplace 22 for exchange items of interest. The marketplace server 18 provides video-graphics data to the buyer computing device 16 in accordance with the searching. When the buyer computing device 16 finds exchange items of interest, it displays the video-graphics of the corresponding exchange items (e.g., a grouping of gift cards).

The buyer computing device 16 receives an input corresponding to a selection of one of the exchange items of interest for purchase. The buyer computing device 16 sends the selected exchange item to the marketplace server 18 for processing.

The marketplace server 18 processes the selected exchange item via a multiple step process. One step includes verifying that the buyer is authorized to purchase the exchange item (e.g., has the financial resources, is not limited by buying restrictions (e.g., dollar amount, quantity, type, etc.), is a legitimate buyer, etc.). Another step includes verifying integrity of the information of the selected exchange item (e.g., balance remaining is accurate, the offer to sell the exchange item has not been withdrawn, the exchange item is not currently being processed for sale to another buyer, the exchange item is not expired, the exchange item has not been voided by the branded company, etc.).

When the buyer is authorized and the information regarding the selected exchange item has been verified, another step includes removing the exchange item from the virtual marketplace 22. Another step includes processing payment for the selected exchange item. The multiple step buying process is further described with reference to one or more of FIGS. 5, 6A-6D, and 11-14.

Figure 3:
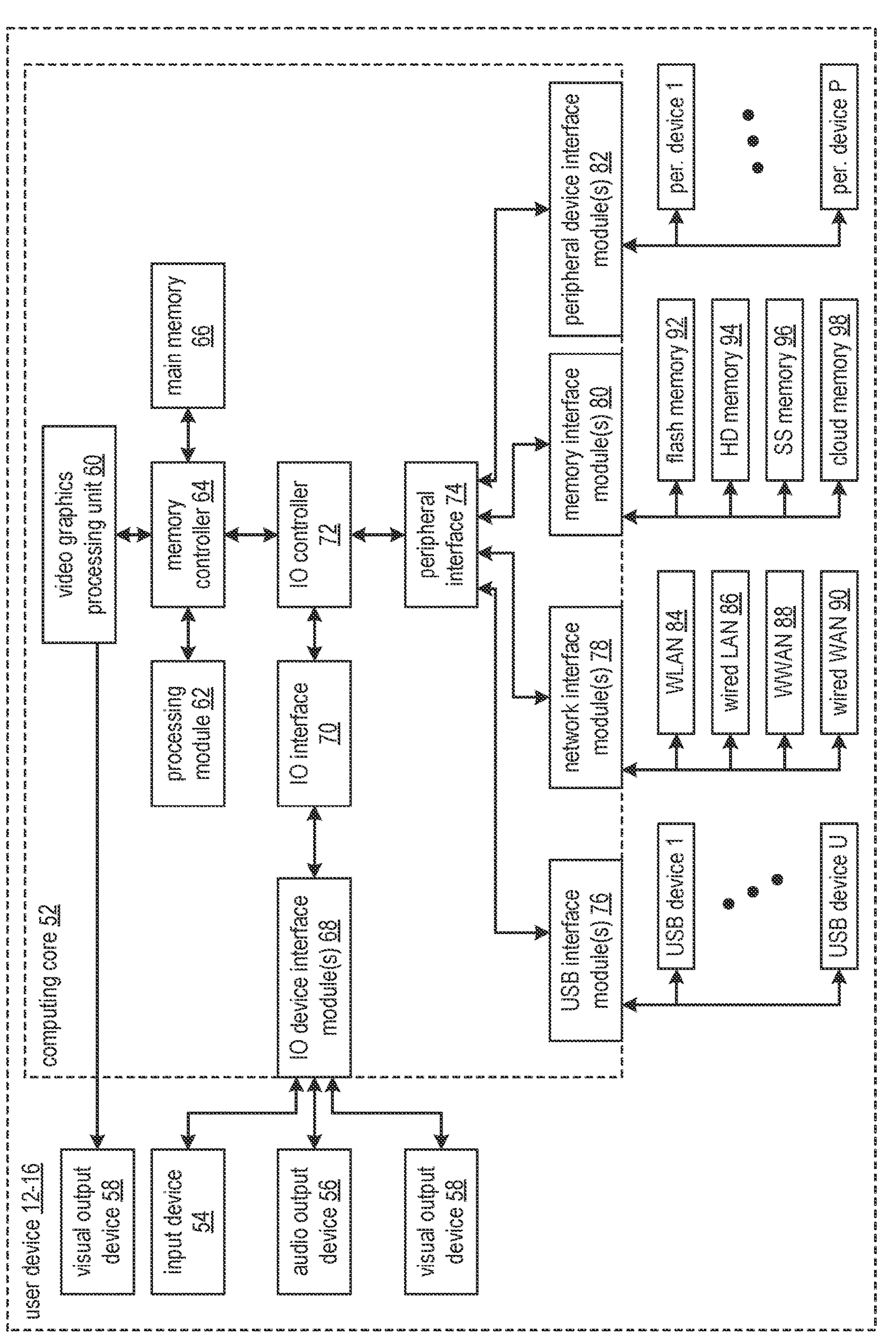
FIG. 3 is a schematic block diagram of an embodiment of user device of exchange item marketplace network in accordance with the present invention.

FIG. 3 is a schematic block diagram of an embodiment of computing device 12-16 of exchange item marketplace network 10. The computing device 12-16 includes a computing core 52, one or more input devices 54 (e.g., keypad, keyboard, touchscreen, voice to text, etc.), one or more audio output devices 56 (e.g., speaker(s), headphone jack, etc.), one or more visual output devices 58 (e.g., video graphics display, touchscreen, etc.), one or more universal serial bus (USB) devices, one or more networking devices (e.g., a wireless local area network (WLAN) device 84, a wired LAN device 86, a wireless wide area network (WWAN) device 88 (e.g., a cellular telephone transceiver, a wireless data network transceiver, etc.), and/or a wired WAN device 90), one or more memory devices (e.g., a flash memory device 92, one or more hard drives 94, one or more solid state (SS) memory devices 96, and/or cloud memory 98), and one or more peripheral devices.

The computing core 52 includes a video graphics processing unit 60, one or more processing modules 62, a memory controller 64, main memory 66 (e.g., RAM), one or more input/output (I/O) device interface module 68, an input/output (I/O) interface 70, an input/output (I/O) controller 72, a peripheral interface 74, one or more USB interface modules 76, one or more network interface modules 78, one or more memory interface modules 80, and/or one or more peripheral device interface modules 82. Each of the interface modules 68, 76, 78, 80, and 82 includes a combination of hardware (e.g., connectors, wiring, etc.) and operational instructions stored on memory (e.g., driver software) that is executed by the processing module 62 and/or a processing circuit within the interface module. Each of the interface modules couples to one or more components of the computing device 12-16. For example, one of the IO device interface modules 68 couples to an audio output device 56. As another example, one of the memory interface modules 80 couples to flash memory 92 and another one of the memory interface modules 80 couples to cloud memory 98 (e.g., an on-line storage system and/or on-line backup system).

FIG. 4 is a schematic block diagram of an embodiment of a marketplace server 18 of exchange item marketplace network 10. The server 18 includes a computing core 122, one or more input devices 54 (e.g., keypad, keyboard, touchscreen, voice to text, etc.), one or more audio output devices 56 (e.g., speaker(s), headphone jack, etc.), one or more visual output devices 58 (e.g., video graphics display, touchscreen, etc.), one or more networking devices (e.g., a wireless local area network (WLAN) device 84, a wired LAN device 86, a wireless wide area network (WWAN) device 88 (e.g., a cellular telephone transceiver, a wireless data network transceiver, etc.), and/or a wired WAN device 90), one or more memory devices (e.g., a flash memory device 92, one or more hard drives 94, one or more solid state (SS) memory devices 96, and/or cloud memory 98), and one or more peripheral devices. Note that the server 18 may include more or less devices than shown in this example embodiment of a server.

The computing core 122 includes a video graphics processing unit 60, a plurality of processing modules 62, a memory controller 64, a plurality of main memories 66 (e.g., RAM), one or more input/output (I/O) device interface module 68, an input/output (I/O) interface 70, an input/output (I/O) controller 72, a peripheral interface 74, one or more network interface modules 78, and/or one or more memory interface module 80.

Figure 5:
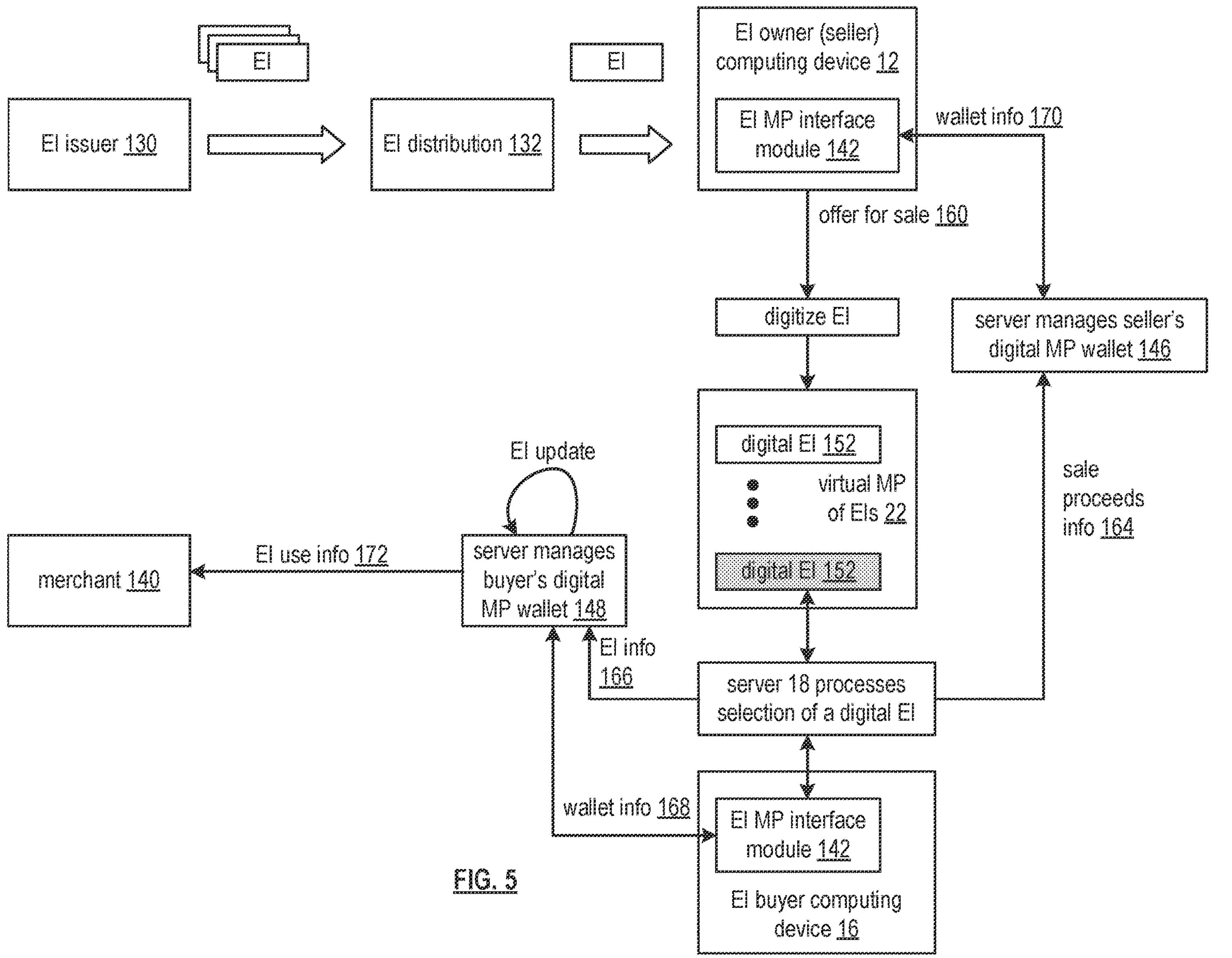
FIG. 5 is a schematic block diagram of an example of operation of an exchange item marketplace network in accordance with the present invention.

FIG. 5 is a schematic block diagram of an example of operation of an exchange item marketplace network 10. In this example, an exchange item (EI) issuer 130 issues a plurality of exchange items (e.g., closed loop financial instruments and/or other digital goods), which are distributed to consumers by an EI distributor 132. At some point in time, a consumer owns one of the exchange items (e.g., purchases the exchange item, is given the exchange item as a gift, is given the exchange item as compensation, etc.). At some later point in time, the owner of the exchange item decides to sell it.

To sell the exchange item, the owner of the EI evokes an EI marketplace (MP) interface module 142 on its computing device 12 or 14. The EI MP interface module 142 includes a browser application, a mobile device application, and/or any type of application that enables access to the virtual marketplace of exchange items 22. The computing core 52 of the user device executes one or more of these applications. For instance, each of the applications includes operational instructions that are stored in memory (e.g., main memory, flash memory, SS memory, HD memory, and/or cloud memory) and executed by the processing module 62 of the computing core 52. Alternatively, the EI MP interface module 142 includes a processing circuit and memory, wherein the memory stores and the processing circuit executes the operational instructions of the application. As yet another alternative, the processing circuit of the EI interface module 142 and the processing module 62 of the computing core 52 co-process the operational instructions of one or more of the applications.

With the EI MP interface module 142 operational on the computing device 12, the computing device 12 provides information regarding the EI for sale to the server 18 of the network 10. The information includes a type of EI (e.g., a gift card, a voucher, a credit, a digital good, etc.), brand information, if any, (e.g., a chain store, a restaurant, etc.), a balance remaining on or value of the exchange item, a sales price, a serial number and/or other identifying data regarding the exchange item.

The server 18 digitizes the exchange item to create a digital exchange item 152, which is added to the virtual marketplace of exchange items 22. For example, if the exchange item is a gift card, the digital exchange item 152 is a digital representation of the gift card (e.g., a rendered digital picture of the gift card, including any relevant logos). As another example, if the exchange item is a digital good (e.g., a video game), the digital exchange item 152 is a digital representation of packaging of the digital good. Note that the server 18 may be interacting with hundreds to hundreds of thousands of seller computing device 12-14 to post exchange items for sale in the virtual marketplace of exchange items 22.

For a digital exchange item 152 in the virtual marketplace of exchange items 22, its digital representation is displayed along with its relevant information (e.g., sales price, a discount percentage, restrictions (if any), etc.). The digital exchange item 152 is typically grouped and displayed with other like exchange items. For example, if the exchange item is a gift card for a particular coffee shop, it is grouped with other gift cards from the same coffee shop. The grouping of like exchange items may be further refined by sub-grouping based on one or more of sales price, time on the marketplace, discount amount, remaining balance, etc.

A buyer desiring to purchase an exchange item offered for sale 160 in the marketplace of exchange items 22 utilizes its computing device 16 and its EI MP interface module 142 to access the marketplace 22. While accessing the marketplace 22, the buyer, via the EI MP interface module 142 and the computing device 16 selects one of the exchange items to purchase, which is shaded gray.

The server 18 processes the selection of the exchange item by verifying the buyer, the buyer's computing device, the buyer's purchasing abilities, and/or the information regarding the selected exchange item. When verified, the server removes the selected exchange item from the marketplace 22 and places it in the buyer's digital wallet 148. To do this, the server processes the buyer's wallet information 168 (e.g., the buyer's ID, buyer account ID, buyer use restrictions (if any), etc.) and EI information 166 of the selected exchange item. For example, the buyer's digital wallet includes a digital representation of the recently purchased exchange item and the corresponding information. The recently purchased exchange item is displayed in a categorical manner (e.g., date of purchase, type of exchange item, value, or remaining balance of exchange item, etc.).

In addition, the server processes the financial transaction for the purchase of the selected exchange item. For example, the server 18 communicates with the financial server of the buyer to receive the funds for the purchase. The server then dispenses the funds to the seller, less processing and/or commission fees. The funds may be dispensed to seller in a variety of ways. For example, the server 18 transfers the seller's funds to a financial server of the seller (e.g., the seller's bank and/or other financial service institution). As another example, the server provides the funds as sales proceeds information 164 to the seller's digital wallet 146, which is maintained by the server 18. The seller may withdraw the funds as wallet information 170, or a portion thereof, from its wallet (e.g., as instructed via the seller's computing device, the server 18 transfers the selected amount of the funds to the seller's financial service's server). As another example, the seller acts as a buyer to buy an exchange item from the marketplace 22 and the funds in the wallet are used to pay for the purchased exchange item.

When the buyer utilizes the exchange item, certain transaction information associated with the utilizing of the exchange item may be communicated as EI use information 172 to a merchant 140. The EI use information 172 includes one or more of a brand identifier, a balance, an amount utilized for a utilization transaction, and a timestamp.

Figure 6A:
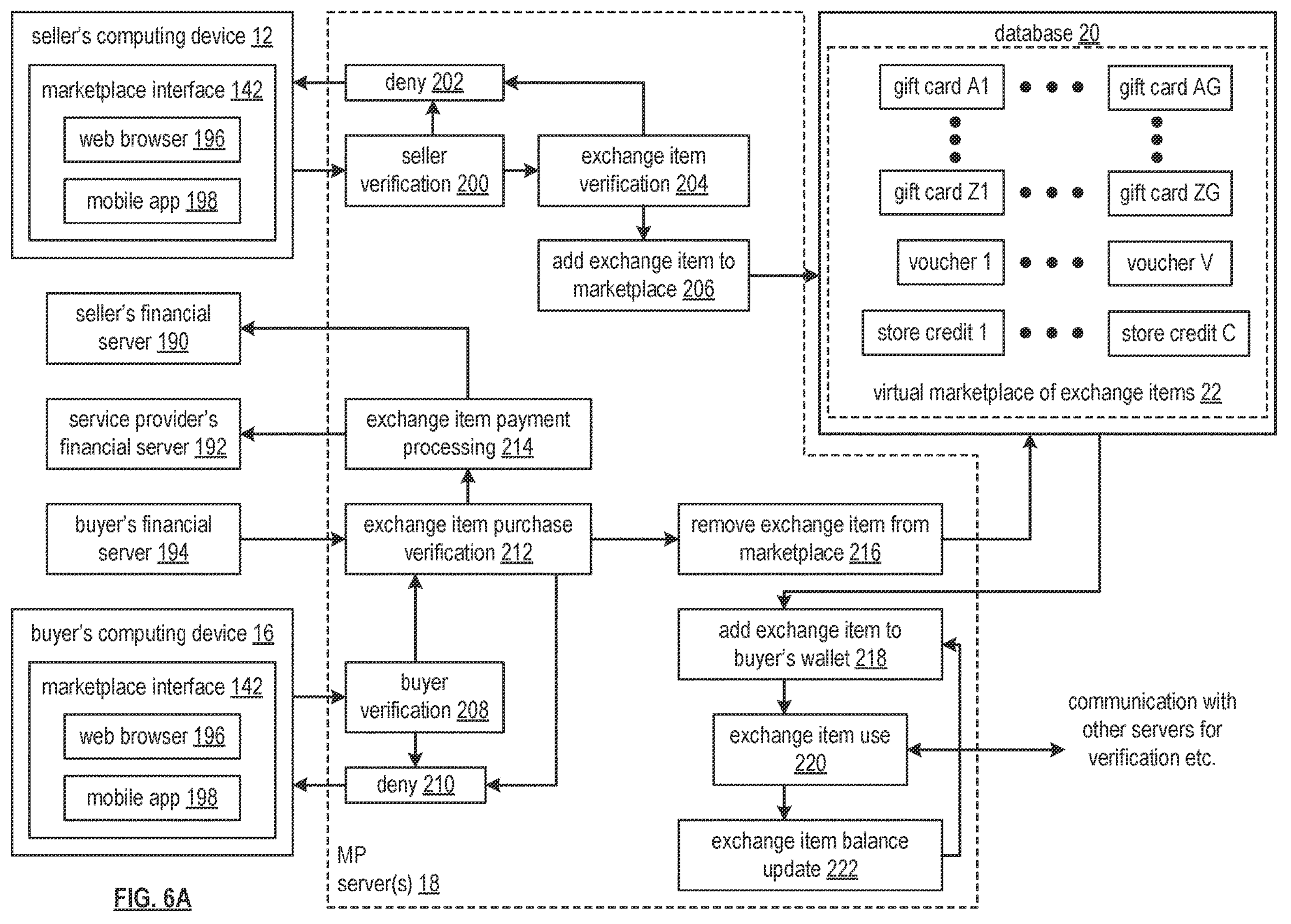
FIG. 6A is a schematic block diagram of another embodiment of an exchange item marketplace network in accordance with the present invention.

FIG. 6A is a schematic block diagram of another embodiment of an exchange item (EI) marketplace (MP) network that includes the seller's computing device 12, the buyer's computing device 16, a seller's financial server 190, a service provider's financial server 192, a buyer's financial server 194, the marketplace (MP) server(s) 18, and the database 20, which includes the virtual marketplace of exchange items 22. Each of the seller's computing device 12 and buyer's computing device 16 includes the (EI) marketplace interface 142, which includes a web browser 196 and a mobile application 198.

The MP server 18 performs function blocks that includes a seller verification 200, a deny 202, an exchange item verification 204, an add exchange item to marketplace 206, a buyer verification 208, a deny 210, an exchange item purchase verification 212, an exchange item payment processing 214, a remove exchange item from marketplace 216, an add exchange item to buyer's wallet 218, an exchange item use 220, and an exchange item balance update 222.

As an example of operation, the mobile application 198 of the seller's computing device 12 sends a request to sell an exchange item to the marketplace (MP) server(s) 18. The server 18 performs the seller verification 200 functional block to determine whether the seller and/or the seller's computing device 12 are a valid seller (e.g., device and/or seller are valid). When invalid, the server(s) 18 performs the deny 202 functional block to communicate a denial of the request to sell the exchange item to the seller's computing device 12.

When the seller is verified, the server performs the exchange item verification 204 functional block to determine whether the exchange item is valid (e.g., is a valid exchange item, perform a balance check with an associated entity, i.e., a retailer, etc.). When invalid, the server(s) perform the deny 202 functional block. When the exchange item is valid, the server(s) 18 perform the add exchange item to marketplace 206 functional block to add a digital representation of the exchange item to the virtual marketplace of exchange items 22 (e.g., creates a new entry for inventory within the virtual marketplace of exchange items 22).

When a buyer desires to purchase an exchange item, the mobile application 198 of the buyer's computing device 16 sends a request to buy a selected exchange item to the MP server(s) 18. The server(s) 18 perform the buyer verification 208 functional block to determine whether the buyer is valid (e.g., the user and/or buyer computing device are valid). When invalid, the server(s) 18 perform the deny 210 functional block to issue a denial of the purchase request to the buyer's computing device 16.

When the buyer is validated, the server(s) 18 perform the exchange item purchase verification 212 functional block to verify that the buyer, via the buyer's computing device, has sufficient means (e.g., money, credit, valid credit card, valid debit card, etc.) to pay for the selected exchange item. For example, the exchange item purchase verification 212 functional block enables the server 18 to receive buyer information from the buyer's financial server 194 verifying payment and/or verifying an ability to pay. When unable to purchase the selected exchange item, the server 18 performs the deny 210 functional block.

When the buyer is able to purchase the selected exchange item, the server 18 performs the exchange item payment processing 214 functional block to process payment for the selected exchange item. For example, the server 18 collects payment from the buyer's e-wallet, the buyer's computing device 16, or the buyer's financial server 194, issues a payment to the seller's e-wallet, to the seller's computing device, or to the seller's financial server 190, and issues a commission payment to the service provider's financial server 192.

After processing payment or concurrent with the processing of the payment, the server 18 performs the remove exchange item from marketplace 216 functional block to remove the selected exchange item from the virtual marketplace of exchange items 22. For example, the server 18 deletes an entry associated with the selected exchange item from the database 20.

The server 18 performs the add exchange item to the buyer's wallet 218 functional block to facilitate adding the exchange item to a buyer's e-wallet. For example, the server 18 updates a representation of the buyer's wallet within the database 20 to include a digital representation of the purchased exchange item and issues a message to the mobile application 198 to store a local copy of the digital representation within the buyer's computing device 16.

When the buyer desires to purchase something using an exchange item, the mobile application 198 communicates a utilization message to the server 18. The server 18 evokes the exchange item use 220 functional block to receive the utilization message and to facilitate communication with other servers for verification and transaction execution. For example, the server 18 forwards the utilization message to a retailer server associated with the exchange item to initiate execution of the transaction. Having successfully used the exchange item, the server 18, via the exchange item balance update 222 functional block, updates the buyer's wallet to indicate that the exchange item has been utilized and to update the balance remaining on the exchange item, when appropriate.

Figure 6B:
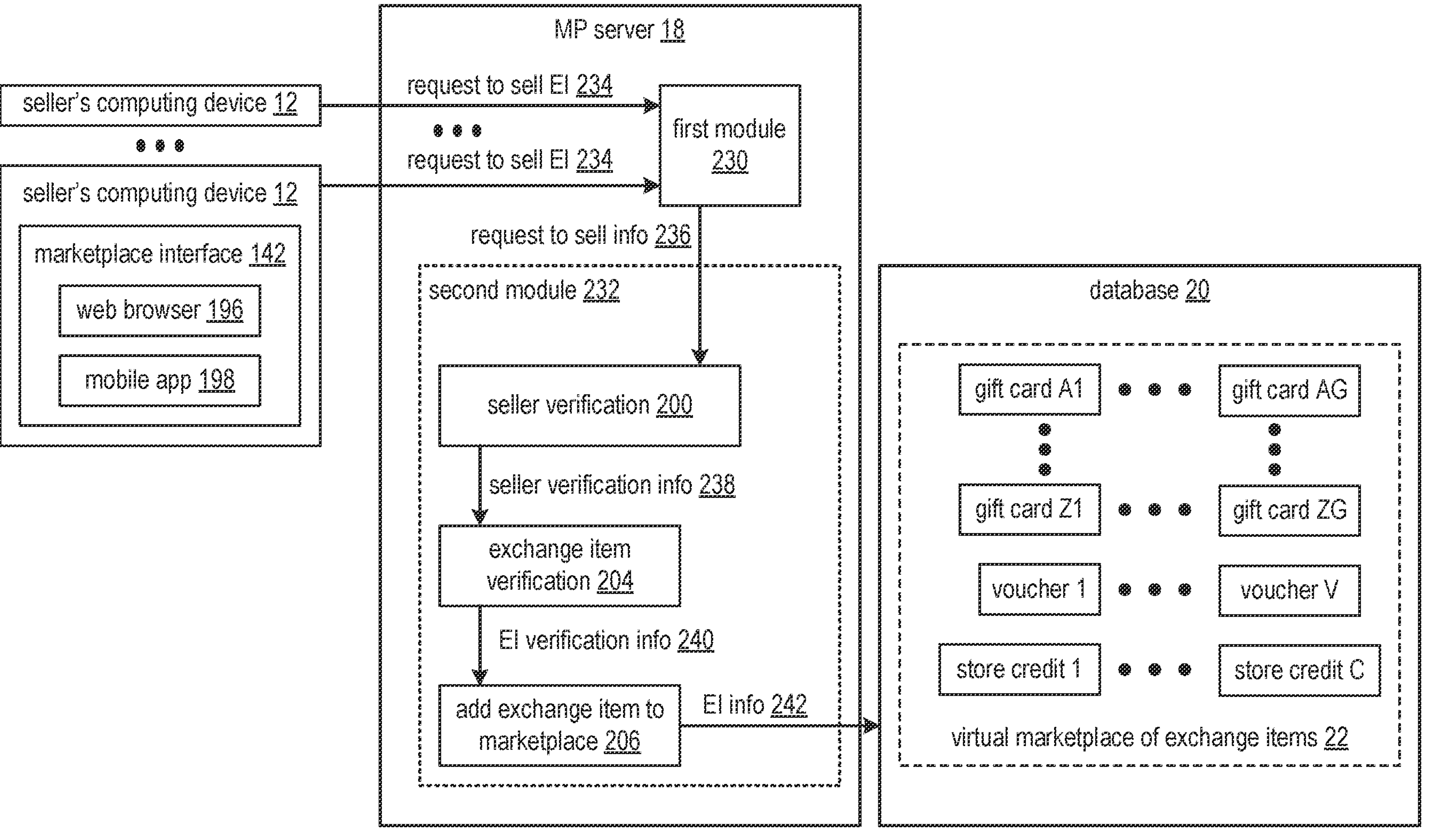
FIG. 6B is a schematic block diagram of an embodiment of seller portion of an exchange item marketplace network in accordance with the present invention.

FIG. 6B is a schematic block diagram of an embodiment of seller portion of an exchange item marketplace network that includes a plurality of seller's computing devices 12, the marketplace (MP) server(s) 18, and the database 20, which stores the virtual marketplace 22. Each of the seller's computing devices 12 include the marketplace interface 142, which includes the web browser 196 and the mobile application 198.

The MP server 18 includes a first module 230 to process receiving of requests to sell exchange items 234 and a second module 232 to process a selected request to sell an exchange item. The second module 232 includes several sub-modules (e.g., more modules). In an embodiment, the second module 232 includes the seller verification 200 functional block, the exchange item verification 204 functional block, and the add exchange item to marketplace 206 functional block.

In an example of operation, the first module 230 receives requests to sell exchange items (EI) 234 from the seller computing devices 12. Each request includes information regarding the exchange item being offered for sale 236. The information includes one or more of a selling price, branding information, a description of the exchange item (if applicable), a value of the exchange item, restrictions regarding the exchange item, etc.

The first module 230 provides the requests to the second module 232, which processes the requests to sell in a serial manner, in a parallel manner, and/or in a combined serial-parallel manner. For each request to sell, the second module 232 processes the request via the seller verification functional block 200, the exchange item verification functional block 204, and the add exchange item to the marketplace functional block 206.

The server(s) 18 perform the seller verification functional block 200 to verify seller information (e.g., information regarding the seller and/or information regarding the seller computing device). Accordingly, the server 18 verifies the information regarding the seller and/or seller computing device by one or more of verifying user information (e.g., user name, user account number, personal information number (PIN), user identifier, payment account info, etc.) associated with the seller computing device and verifying device information (e.g., Internet protocol (IP) address of the seller user device, authorized seller user device serial number, the seller user device is utilizing an authorized mobile application 198, etc.) of the seller computing device.

When the seller information is favorably verified 238, the server 18 performs the exchange item verification functional block 204 to verify information regarding the exchange item being offered for sale. Accordingly, the server 18 determines validity of one or more of a brand identifier (e.g., and/or an exchange item type indicator) of the exchange item, a value of the exchange item, and a serial number of the exchange item. For example, the server 18 compares the information regarding the exchange item provided by the seller to information and/or rules stored in the database 20. For instance, the server verifies the serial number and/or format of the serial number for the brand identifier. Further, the server 18 verifies the value of the exchange item by issuing a value verification request to an external entity and receiving a verification response thereto.

When the exchange item is verified 240, the server 18, via the exchange item verification 204 functional block, further determines a selling price for the exchange item. For instance, the server uses one or more seller software tools as is discussed with reference to FIG. 16.

The server 18 also performs the add exchange item to marketplace functional block 206 to add the exchange item to marketplace of exchange items 22 (e.g., a digital exchange item marketplace). The adding includes creating a digital representation of the exchange item. The digital representation of the exchange item includes one or more of an image of the exchange item when the exchange item is a physical entity, the brand, serial number, the value, the selling price, the discount level, and the identifier of the seller user device. The adding further includes associating the selling price with the digital representation of the exchange item and adding the digital representation with the associated selling price to the digital exchange item marketplace. For example, the add exchange item to marketplace 206 issues exchange item information 242 to the database 20 for storage in the virtual marketplace of exchange items 22. The exchange item information 242 includes one or more of the association of the selling price to the digital representation and the digital representation of the exchange item.

Figure 6C:
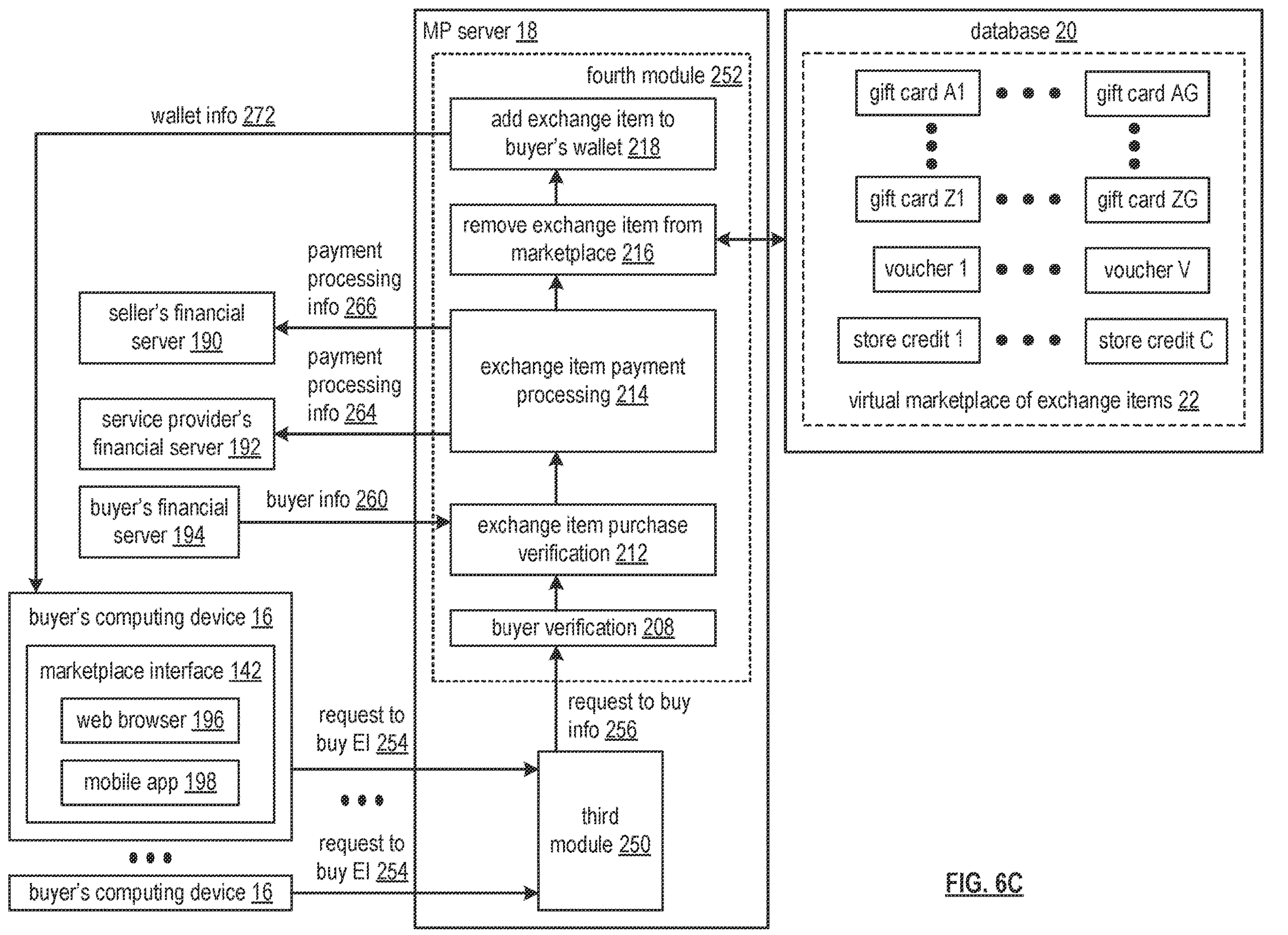
FIG. 6C is a schematic block diagram of an embodiment of buyer portion of an exchange item marketplace network in accordance with the present invention.

FIG. 6C is a schematic block diagram of an embodiment of buyer portion of an exchange item marketplace network that includes buyer's computing devices 16, the marketplace (MP) server(s) 18, the database 20 that stores the virtual marketplace 22, the buyer's financial server 194, the service provider's financial server 192, and the seller's financial server 190. Each buyer computing device 16 includes the marketplace interface 142, which includes the web browser 196 and the mobile application 198.

The MP server 18 includes a third module 250 to receive requests to buy and a fourth module 252 to process the requests to buy. The fourth module 252 includes the buyer verification 208 functional block, the exchange item purchase verification 212 functional block, the exchange item payment processing 214 functional block, the remove exchange item from marketplace 216 functional block, and the add exchange item to buyer's wallet 218 functional block.

In an example of operation, the third module 250 receives requests to buy 254 from the buyer computing devices. Each request to buy 254 includes one or more of a brand identifier, an exchange item (EI) type indicator, a purchase price, a purchase price range, purchase terms (e.g., payment timing, delivery timing, payment method, etc.), buyer payment account information (e.g., credit or debit card information, Apple Pay™ information, PayPal™ information, etc.), buyer user device information (e.g., buyer name, exchange item marketplace identifier, etc.), security information (e.g., buyer PIN, digital security certificate information, etc.), and other buyer information (e.g., security question responses, etc.). The server(s) 18 process the requests to buy in a serial manner, in a parallel manner and/or in a serial-parallel manner. For example, the server 18 may process the requests to buy based on one or more of a random selection, a first in first out approach, a buyer prioritization approach, a brand based approach, a discount level approach, a serial number based approach, an EI value ranking approach, and a market efficiency optimizing approach.

The fourth module 252 begins processing of request to buy information 256 via the buyer verification 208 functional block to verify buyer information (e.g., buyer information and/or information regarding the computing device). The verifying includes one or more of verifying user information (e.g., buyer name, buyer account information, buyer PIN, buyer user ID, buyer payment account info, etc.) associated with the buyer computing device, verifying device information (e.g., buyer user device IP address, buyer user device serial number, version of buyer's user device mobile application 198, etc.) of the buyer computing device, and executing a verification tree process.

The buyer verification 208 functional block includes a verification tree process that issues a series of questions to the buyer computing device and/or the buyer's financial server 194, receives a series of responses from the buyer computing device, and evaluates the series of responses in an effort to verify the information regarding the buyer computing device.

When the information regarding the buyer computing device is favorably verified, the server 18 performs the exchange item purchase verification 212 functional block to verify payment. The verifying includes verifying information regarding the selected exchange item and verifying buyer payment account information in light of the verified information regarding the selected exchange item.

The verifying the information regarding the selected exchange item includes one or more of accessing the virtual marketplace of exchange items 22 to verify that the selected exchange item is still for sale, verifying that an alternative exchange item is available when the selected exchange item is now unavailable, verifying the balance, verifying the purchase price to a selling price, and verifying that any selling restrictions are met (e.g., transaction timing, payment type, etc.). The verifying buyer payment account information includes one or more of receiving buyer information 260 from the buyer's financial server 194 indicating payment approval, verifying that any buying restrictions have been met, and verifying validity of buyer financial payment information. For example, the exchange item purchase verification 212 indicates favorable payment verification information when verifying that the selected exchange item is still available for sale at the purchase price and that the buyer user device 16 is able to make the payment.

When the payment information is favorably verified, the server 18 performs the exchange item payment processing 214 functional block to process payment for the selected exchange item. The server 18 processes the payment for the selected exchange item utilizing one or more payment processing steps. As an example of the one or more payment processing steps, the exchange item payment processing 214 functional block determines a transaction processing fee (e.g., a credit card payment fee of 3% of the selling price), determines a commission fee (e.g., a flat rate fee of 15% of the selling price for the marketplace operator, a variable fee based on other factors, may further include the transaction processing fee), debits an account associated with the buyer computing device for the selling price of the selected exchange item (e.g., completing a transaction with the buyer's financial server 194), credits an account associated with the seller computing device for the selling price less the commission fee (e.g., issues payment processing information 266 to the seller's financial server 190), and credits one or more accounts for the transaction processing fee and for the commission fee (e.g., issuing payment processing information 264 for the commission fee to the service provider's financial server 192).

When the payment processing information 264 indicates that the payment has been successful, the server 18 performs the remove exchange item from marketplace 216 functional block to remove the selected exchange item from the digital exchange item marketplace. In addition, the server performs the add exchange item to buyer's wallet 218 functional block to add the selected exchange item to a digital wallet associated with the buyer computing device. For example, when the digital wallet is active, the server provides a digital representation of the selected exchange item and exchange item information to the buyer's computing device for display thereon. For example, the server 18 generates wallet information 272 from the exchange item information and sends the wallet information 272 to the buyer's computing device 16 for storage and display. The wallet information 272 includes the digital representation (e.g., an image of the exchange item when the exchange item represents a physical item) of the selected exchange item and the exchange item information (e.g., EI type, brand, balance, serial number, PIN, etc.).

Figure 6D:
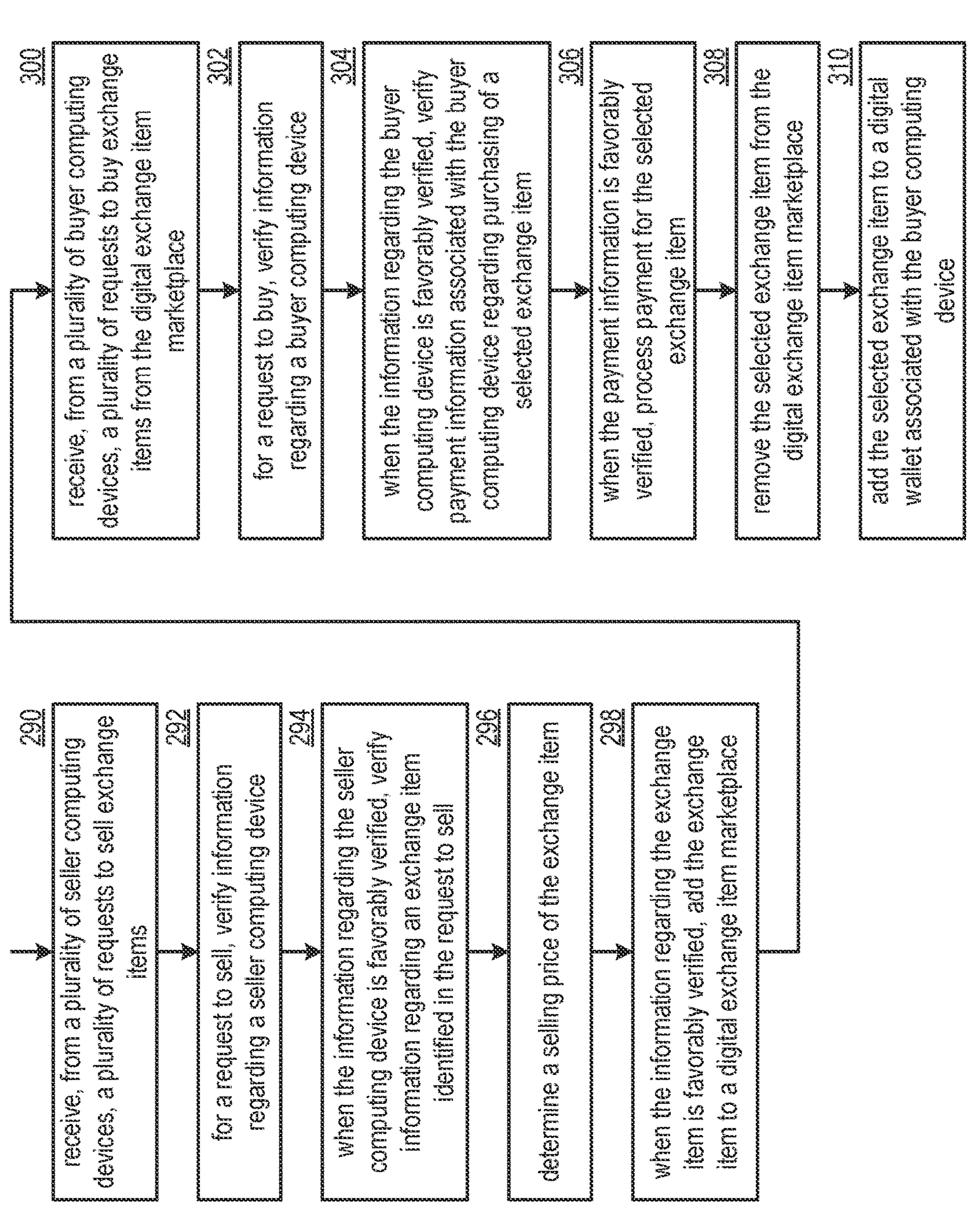
FIG. 6D is a flowchart illustrating an example of exchanging exchange items within an exchange item marketplace network in accordance with the present invention.

FIG. 6D is a flowchart illustrating an example of buying and selling exchange items within an exchange item marketplace network. The method includes step 290 where a processing module of a computing device and/or a server receives requests to sell exchange items from seller computing devices. For a request to sell, the method continues at step 292 where the processing module processes the request to sell by verifying information regarding a seller's computing device associated with the request to sell. The verifying includes one or more of verifying user information (e.g., seller name, seller account, seller PIN, seller ID, seller payment account info, etc.) associated with the seller computing device and verifying device information (e.g., seller user device IP address, seller user device serial number, seller user device application information, etc.) of the seller's computing device.

When the information regarding the seller's computing device is favorably verified, the method continues at step 294 where the processing module verifies information regarding an exchange item identified in the request to sell. The verifying includes determining that a brand identifier of the exchange item, a value of the exchange item, and a serial number of the exchange item are valid. When the brand identifier of the exchange item, the value of the exchange item, and the serial number of the exchange item are valid, the method continues at step 296 where the processing module determines a selling price for the exchange item. For example, the processing module utilizing seller software tools to establish a selling price.

When the information regarding the exchange item is favorably verified, the method continues at step 298 where the processing module adds the exchange item to a digital exchange item marketplace. The adding includes one or more of creating a digital representation of the exchange item, associating a selling price with the digital representation of the exchange item, and adding the digital representation with the associated selling price to the digital exchange item marketplace.

The method includes step 300 where the processing module receives requests to buy exchange items from buyer computing devices. For a request to buy, the method continues at step 302 where the processing module begins to process the request to buy by verifying information regarding a buyer computing device (e.g., buyer user information and/or information regarding the buyer computing device) associated with the request to buy. The verifying includes one or more of verifying user information associated with the buyer computing device (e.g., buyer user name, buyer account information, buyer PIN, buyer user ID, buyer payment account info, etc.), verifying device information (e.g., buyer device IP address, buyer device serial number, buyer device application identification, etc.) of the buyer computing device, and executing a verification tree process.

When the information regarding the buyer computing device is favorably verified, the method continues at step 304 where the processing module verifies payment information associated with the buyer computing device regarding purchasing of a selected exchange item (e.g., buyer information and exchange item information). The verifying includes one or more of verifying information regarding the selected exchange item (e.g., the EI is still valid, verify balance, verify selling price, selling restrictions, etc.) and verifying buyer payment account information in light of the verified information regarding the selected exchange item (e.g., buyer has sufficient funds, any buying restrictions have been satisfied, buyer financial payment information is valid, etc.).

When the payment information is favorably verified, the method continues at step 306 where the processing module processes payment for the selected exchange item. The processing of the payment for the selected exchange item includes one or more steps. Examples of the steps includes determining a transaction processing fee (e.g., credit card payment fee), determining a commission fee (e.g., flat rate for the marketplace service provider, variable fee based on other factors, may include the transaction processing fee), debiting an account associated with the buyer computing device for the selling price of the selected exchange item, deciding to credit an account associated with the seller computing device for the selling price less the commission fee, and crediting one or more accounts for the transaction processing fee and for the commission fee (e.g., transaction processing fee to credit card affiliate, commission less transaction processing fee to market place operator/service provider).

The method continues at step 308 where the processing module removes the selected exchange item from the digital exchange item marketplace. For example, the processing module updates a database associated with the digital exchange item marketplace to delete an entry associated with the purchased exchange item.

The method continues at step 310 where the processing module adds the selected exchange item to a digital wallet associated with the buyer's computing device. The adding includes, when the digital wallet is active, providing a digital representation of the selected exchange item and exchange item information to the buyer's computer device for display thereon.

FIG. 7 is a flowchart illustrating an example of seller verification for an individual seller 330 within an exchange item marketplace network. The method includes step 332 where a seller's computing device 12 registers with the marketplace network 10 (e.g., with a marketplace server 18 via a network). For example, the seller's computing device registers by issuing a registration request to the marketplace server 18, where the registration request includes one or more of a seller identifier, a seller user device identifier, seller payment information, an identifier of an exchange item for sale, and other information describing the exchange item for sale.

The method continues at step 334 where the marketplace server 18 lists the exchange item for sale. The listing includes updating the virtual marketplace of exchange items to provisionally include an entry for the exchange item for sale, but not display it for sale. The provisional entry of the exchange item includes one or more of the identifier of the exchange item for sale, at least some of the other information describing the exchange item for sale, a balance associated with exchange item for sale, and a discount level associated with exchange item for sale.

The method continues at step 336 where the marketplace server 18 verifies the seller's computing device. The verifying includes one or more of determining whether to allow the seller to sell the exchange item and determining whether to allow the seller's computing device to be utilized in the selling of the exchange item for sale. The method continues to step 338 where, when the seller computing device has been favorably verified, the seller's computing device accepts terms and conditions associated with the offering of the exchange item for sale from the marketplace server.

FIG. 8 is a flowchart illustrating an example of offering an exchange item for sale by an individual seller within an exchange item marketplace network. The method begins or continues at step 350 where a seller's computing device associated with an individual seller accesses an exchange item marketplace network. The method continues at step 352 where the marketplace server 18 determines whether the individual seller has an account with the exchange item marketplace network 10. For example, the marketplace server accesses accounts information to identify an entry associated with the individual seller.

When the individual seller does not have the account, the method continues at step 354 where the marketplace server 18 creates a new entry within the accounts information for the individual user and/or seller user device (e.g., generating the new entry to include one or more of an identifier of the individual seller, an identifier of the seller user device, a personal identification number (PIN), seller payment information, seller address, etc.).

When the individual seller has the account or has just created an account, the method continues at step 356 where the seller's computing device logs in to access to the exchange item marketplace network. The method continues at step 358 where the marketplace server accesses the account information for the individual seller. The method continues at step 360 where the marketplace server determines whether the accessed account information for the individual seller is valid. For example, the marketplace server compares a listed address of the seller to a list of valid addresses. As another example, the marketplace server receives a query response to a query request regarding the seller payment information (e.g., verifying banking information).

When the account information is invalid, the method continues at step 362 where the marketplace server facilitates performing an alternate verification process. The alternate verification process includes one or more of informing an operator to perform a manual verification, verifying another aspect of portions of the seller account information, issuing a verification request to an external entity, and interpreting a received verification response. When the verification was unsuccessful, access to the marketplace is denied.

When the verification was successful, the method continues at step 370 where the seller's computing device provides a brand of an exchange item for sale. For example, the seller user device issues exchange item information to the marketplace server, where the exchange item information includes an identifier of the exchange item for sale and other information associated with exchange item for sale.

The method continues at step 372 where the marketplace server determines whether a brand identifier of the exchange item for sale is valid. For example, the marketplace server compares the brand identifier to a list of valid brand identifiers. As another example, the marketplace server interprets a brand identifier verification response associated with a brand identifier verification request, where the request and response are exchanged with an external entity. As yet another example, the marketplace server indicates that the brand is valid when a received serial number of the exchange item for sale from the seller user device compares favorably to at least one valid serial number associated with the brand.

When the marketplace server determines that the brand identifier is invalid, the method continues at step 376 where the marketplace server attempts to create a valid brand (e.g., establishing a new brand for sale). For example, the marketplace server performs a brand analysis algorithm to produce a brand validity indicator. For instance, the marketplace server issues a brand establishment request to a server associated with establishment of a new brand, receives a brand establishment response, and interprets the brand establishment response to produce the brand validity indicator. When a valid brand cannot be established, the method continues at step 378 where the marketplace server denies the request to sell.

When the brand can be established, the method continues at step 380 where the marketplace server establishes the brand as a valid brand. For example, the marketplace server updates a virtual marketplace of exchange items to include in association of the brand identifier and a valid brand indicator.

With a valid brand, the method continues at step 374 where the seller's computing device provides a personal identification number (PIN) and serial number associated with the exchange item for sale. For example, the seller user device captures an image of the exchange item for sale, sends the captured image to the marketplace server, and the marketplace server interprets the captured image to produce the PIN and serial number. The method continues at step 382 where the marketplace server temporarily stores exchange item information. For example, the marketplace server facilitates storage within the virtual marketplace of exchange items of one or more of the identifier of the exchange item for sale, the serial number of the exchange item for sale, the PIN of the exchange item for sale, the captured image, the brand, the value, and a discount level.

FIG. 9 is a flowchart illustrating an example of seller verification for a bulk seller 400 within an exchange item marketplace network. The method begins or continues at step 402 where the bulk seller registers with the exchange item marketplace network. For example, a bulk seller server associated with the bulk seller's computing device issues a registration request to a marketplace server of the exchange item marketplace network. The registration request includes one or more of an identifier of the bulk seller and/or the computing device, banking information associated with the bookseller, a descriptor of potential bulk exchange items for sale.

The method continues at step 404 where the marketplace server verifies the bulk seller and/or the bulk seller's computing device. The verifying includes one or more of verifying a bulk selling organization and verifying the bulk seller's computing device. For example, the marketplace server performs a credit check on the bulk selling organization. As another example, the marketplace server compares attributes of the bulk seller's computing device (e.g., IP address, access the street, etc.) to expected attributes of the bulk seller's computing device. If not verified, the request is denied.

When the bulk seller is verified, the method continues at step 408 where the bulk seller's computing device uploads bulk file information to the marketplace server. The bulk file information includes one or more of an identifier of the bulk selling organization, an identifier of the bulk seller server, identifiers of the exchange items for sale, and other information associated with the exchange items for sale (e.g., sale price, discount level, serial numbers, personal identification numbers (PINs), etc.). The method continues at step 410 where the marketplace server performs bulk listing of information associated with the bulk file information. For example, the marketplace server adds the exchange items for sale to a virtual marketplace of exchange items.

FIG. 10 is a flowchart illustrating an example of offering an exchange item for sale by a bulk seller within an exchange item marketplace network. The method includes step 420 where a bulk seller's computing device attempts to access an exchange item marketplace network. For example, the bulk seller's computing device issues an access request to a marketplace server of the exchange item marketplace network.

The method continues at step 422 where the marketplace server determines whether the bulk seller has an account with the exchange item marketplace network. For example, the marketplace server accesses accounts information to identify an entry associated with the bulk seller. If not, the method continues at step 424 where the marketplace server creates a new entry within the accounts information for the bulk seller and/or bulk seller's computing device (e.g., generating the new entry to include one or more of an identifier of the bulk seller, an identifier of the bulk seller server, a personal identification number (PIN), bulk seller payment information, bulk seller address, etc.).

When the bulk seller has the account or newly created account, the method continues at step 426 where the bulk seller server logs in to the exchange item marketplace network. The method continues at step 428 where the marketplace server accesses the account information for the bulk seller. The method continues at step 430 where the marketplace server determines whether the accessed account information for the bulk seller is valid. For example, the marketplace server compares a listed address of the bulk seller to a list of valid addresses. As another example, the marketplace server receives a query response to a query request regarding the bulk seller payment information (e.g., verifying banking information).

When the account information is invalid, the method continues at step 432 where the marketplace server facilitates performing an alternate verification process. The alternate verification process includes one or more of informing an operator to perform a manual verification, verifying another aspect of portions of the bulk seller account information, issuing a verification request to an external entity, and interpreting a received verification response. The method continues at step 434 where the marketplace server determines whether the alternate verification process successfully verified the account information associated with the bulk seller. If not, the access request is denied at step 436.

When the account information has been verified, the method continues at step 438 where the bulk seller's computing device uploads exchange items for sale. For example, the bulk seller server sends a bulk sale request to the marketplace server, where the bulk sale request includes one or more of identifiers of the exchange items for sale, sale prices, discount levels, serial numbers, personal identification numbers (PINs), etc. The method continues at step 440 where the marketplace server stores exchange item information for the exchange items for sale. For example, the marketplace server stores the identifiers of the exchange items for sale, the sale prices, the discount levels, the serial numbers, the PINs, etc. in a virtual marketplace of exchange items associated with the marketplace server.

Figure 11:
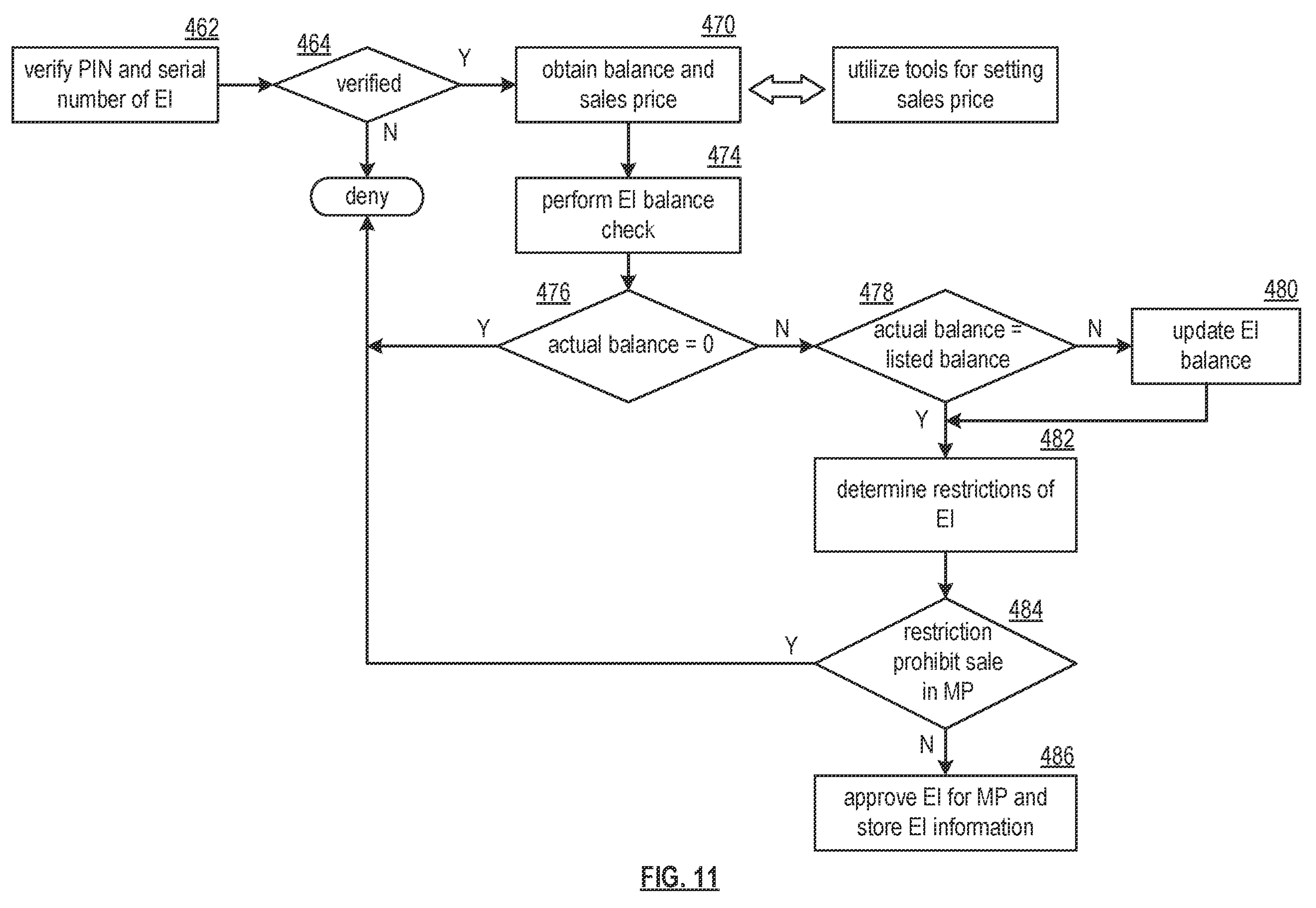
FIG. 11 is a logic diagram of an embodiment of a method of verification of an exchange item in an exchange item marketplace network in accordance with the present invention.

FIG. 11 is a flowchart illustrating an example of exchange item verification within an exchange item marketplace. The method includes step 462 where a marketplace server of an exchange item marketplace verifies a personal identification number (PIN) and a serial number of an exchange item for sale. For example, the marketplace server verifies that the serial number conforms to serial number rules associated with a particular brand associated with the exchange item for sale. As another example, the marketplace server verifies that the PIN corresponds to the serial number in accordance with one or more of the serial number rules associated with particular brand and a received serial number verification response (e.g., from an exchange item brand server).

The method continues at step 464 where the marketplace server determines whether the verification is favorable. When the verification is unfavorable, the request to add the exchange item to the marketplace is denied.

When the verification is favorable, the method continues at step 470 where the marketplace server obtains balance and sales price information. For example, the marketplace server receives balance information for the exchange item for sale and a desired price as the sales price information. The marketplace server may utilize seller software tools for setting the sales price. For example, when the user requests automatic price determination, the marketplace server determines at least one of a sales pricing range and a recommended sales price based on one or more of sales history, seller information, potential buyer information, and exchange item availability information.

The method continues at step 474 where the marketplace server performs an exchange item balance check. For example, the marketplace server issues a balance check request to a brand server associated with exchange item for sale, receives a balance check response, and compares a balance received from a seller (e.g., a listed balance) to a balance received from the brand server (e.g., an actual balance), where the balance check request includes one or more of the balance received from the seller, the serial number, and the PIN.

The method continues at step 476 where the marketplace server determines whether the actual balance is substantially equal to zero. If so, the request is denied. If not, the method continues at step 478 where the marketplace server determines whether the actual balance is substantially the same as the listed balance. If not, the method continues at step 480 where the marketplace server updates the exchange item balance (e.g., within a database of the marketplace) to indicate the actual balance.

The method continues at step 482 where the marketplace server determines restrictions (e.g., online only use, in-store only use, etc.) of the exchange item for sale. The determining may be based on one or more of a predetermination, accessing the database of the marketplace, and interpreting a restrictions query response from the brand server. The method continues at step 484 where the marketplace server determines whether the restrictions inhibit sale of the exchange item in the marketplace. The determining includes comparing circumstances of selling exchange items within the marketplace with the restrictions to produce a comparison and interpreting the comparison to determine whether the sale is prohibited. For example, the marketplace server indicates that the sale is prohibited when detecting that a particular restriction associated with the exchange item prohibits the sale by the seller (e.g., unauthorized seller). If so, the request is denied. If not, the method continues at step 486 where the marketplace server approves the exchange item for the marketplace and stores exchange item information (e.g., brand identifier, serial number, PIN, barcode information, exchange item image, actual balance, and the restrictions).

Figure 12:
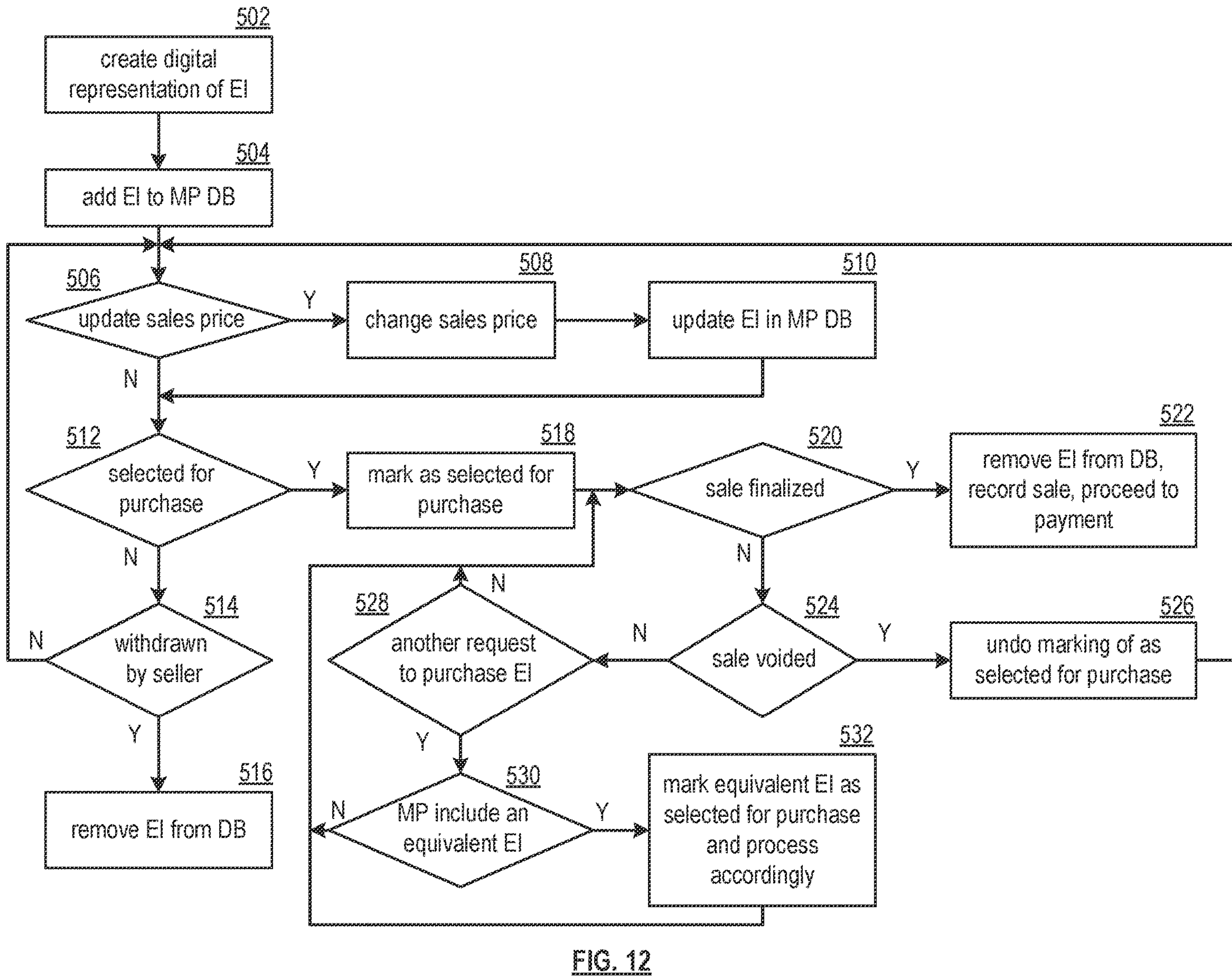
FIG. 12 is a logic diagram of an embodiment of a method of adding and deleting an exchange item to an exchange item marketplace network in accordance with the present invention.

FIG. 12 is a flowchart illustrating an example of adding and/or removing an exchange item within an exchange item marketplace network. The method includes step 502 where a marketplace server of the exchange item marketplace network creates a digital representation of an exchange item for sale. For example, the marketplace server captures a digital image of a front and back of a gift card exchange item and interprets the captured digital image to produce exchange item information (e.g., brand, value, serial number).

The method continues at step 504 where the marketplace server adds the exchange item (EI) to a database (DB) of the marketplace (MP). For example, the marketplace server inserts a new entry into a sorted list of other previously entered exchange items within the database associated with the brand, where the new entry includes the brand, the value, the serial number, and a price (e.g., a discounted price as compared to the value).

The method continues at step 506 where the marketplace server determines whether to update sales price for the exchange item within the database. The determining may be based on one or more of a request and a market efficiency pricing algorithm output. For example, the marketplace server receives a request from a seller associated with the exchange item to change the price. As another example, the marketplace server executes a market efficiency pricing algorithm to produce an indication that the price should be changed to improve the efficiency of the marketplace. If the price is to be updated, the method continues at step 508 where the marketplace server changes the sales price accordingly. The method continues at step 510 where the marketplace server updates the exchange item information in the database of the marketplace.

If the price is not being updated or after the price has been updated, the method continues at step 512 where the marketplace server determines whether the exchange item has been selected for purchase. If not, the method continues at step 514 where the marketplace server determines whether the offer to sell the exchange item has been withdrawn (e.g., interpreting a request from the seller, in accordance with a withdraw protocol, accessing the database). If yes, the method continues at step 516 where the marketplace server removes the exchange item from the database (e.g., database update to remove the entry associated with exchange item). If not, the method repeats at step 506.

When the exchange item has been selected for purchase, the method continues at step 518 where the marketplace server marks the exchange item as selected for purchase. For example, the marketplace server updates an entry of the marketplace database to indicate that the exchange item has been selected for purchase, but not yet sold. The method continues at step 520 where the marketplace server determines whether the sale has been finalized. The determining may be based on one or more of confirming payment from a purchaser, confirming payment to the seller, and confirming payment to another payee (e.g., a commission to a market place operator).

When the sale is finalized, the method continues at step 522 where the marketplace server removes the exchange item from the market database (e.g., removes the entry associated with the exchange item from the database), records sale of the exchange item (e.g., notifies a seller of the purchase), adds the exchange item to the buyer's e-wallet, and proceeds to a payment process (e.g., to collect payment from the purchaser).

When the sale is not finalized (e.g., still pending approval of the buyer's financial information), the method continues at step 524 where the marketplace server determines whether the sale is to be voided. The determining may be based on one or more of detecting an unfavorable payment condition, receiving a sale voided request, and detecting an estimated fraud level that compares unfavorably to a fraud threshold level.

If the sale is to be voided, the method continues at step 526 where the marketplace server undoes the marking of the as selected for purchase (e.g., database updated to reflect that the exchange item is available for sale). The method then repeats at step 506.

When the sale is not to be voided, the method continues at step 528 where the marketplace server determines whether another request to purchase another exchange item has been received (e.g., a request purchase, the same exchange item or a similar exchange item). If not, the method repeats at step 520.

When another request to purchase the exchange item has been received, the method continues at step 530 where the marketplace server determines whether the marketplace includes another equivalent exchange item (e.g., performs a database search). If not, the method repeats at step 520. If yes, the method continues at step 532 where the marketplace server marks the equivalent exchange item as selected for purchase and processes the purchase accordingly. The method branches to step 520 to finalize both pending sales.

Figure 13:
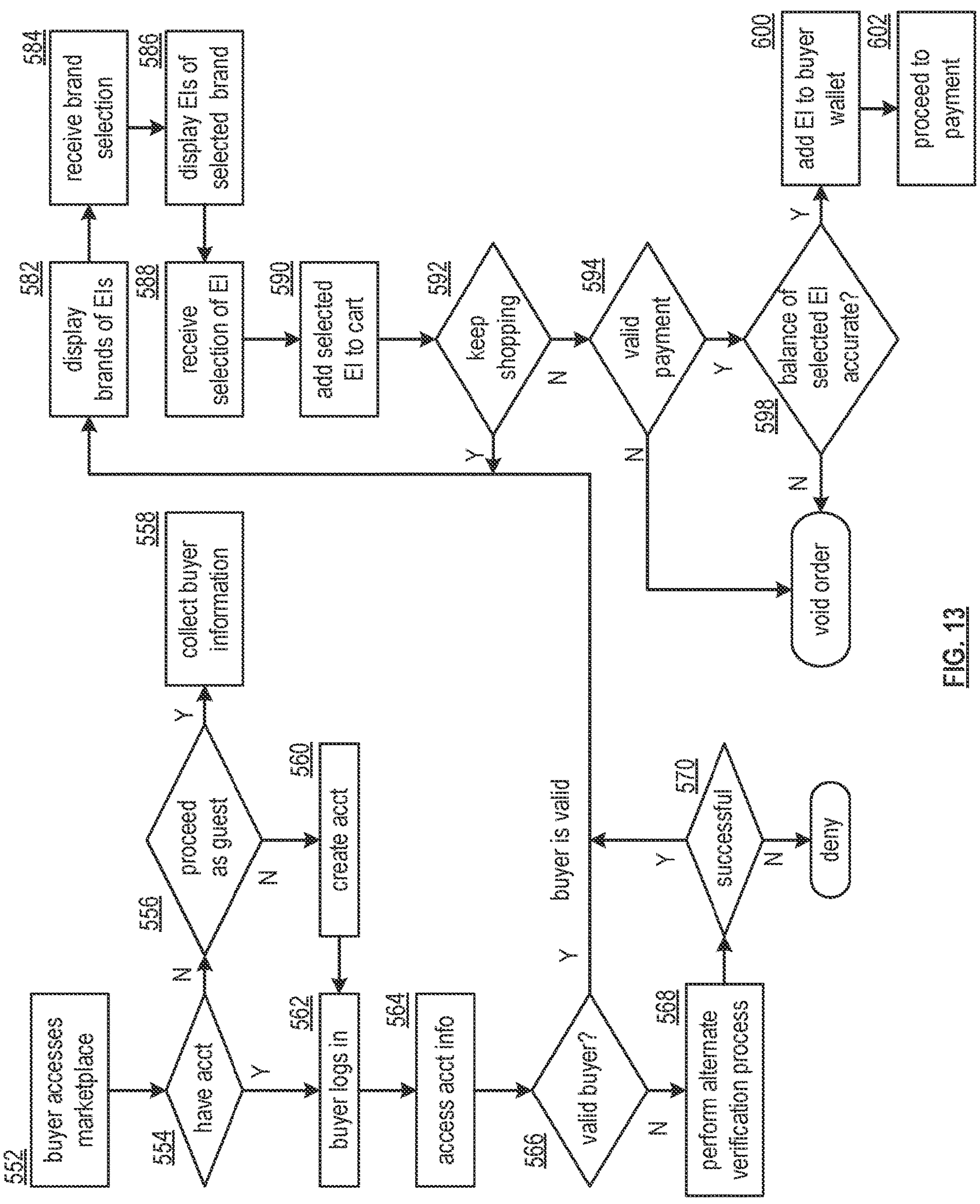
FIG. 13 is a logic diagram of an embodiment of a method of buyer verification in an exchange item marketplace network in accordance with the present invention.

FIG. 13 is a flowchart illustrating an example of buyer verification and exchange item purchase verification within an exchange item marketplace. The method includes step 552 where a buyer's computing device accesses the exchange item marketplace. For example, the buyer's computing device sends a registration request to the marketplace server. The registration request includes one or more of an identifier of the buyer, an identifier of the buyer user device, payment information associated with the buyer, a security credential, and other buying information (e.g., buying history, buying preferences, buying terms and conditions, etc.).

The method continues at step 554 where the marketplace server determines (e.g., database access) whether the buyer has an account the marketplace. If not, the method continues at step 556 where the marketplace server determines whether to allow the buyer to proceed as a guest. The determining may be based on one or more of a system security level, a fraud detection algorithm fraud level indicator, a comparison of the fraud level indicator to a fraud threshold level, a request, a predetermination, a marketplace activity indicator, and a marketplace efficiency indicator.

If the buyer is allowed to access the system as the guest, the method continues at step 558 where the marketplace server collects the buyer's information (e.g., information contained the request and any other information to support the buyer functioning as a guest in the marketplace), and may, based on the buyer's information, enable the buyer to further access the marketplace to purchase an exchange item. If the buyer is not allowed to access the system as the guest, the method continues at step 560 where the marketplace server creates an account for the buyer (e.g., adds a new entry in the database). The creating of the account may include obtaining further information from the buyer.

When the buyer has an account or after the account is created, the method continues at step 562 where the buyer logs into the marketplace (e.g., accesses the marketplace network). The method continues at step 564 where the marketplace server accesses account information for the buyer (e.g., retrieves buyer information from the database).

The method continues at step 566 where the marketplace server determines whether the buyer is a valid buyer. For example, the marketplace server compares one or more aspects of the buyer information to expected values of the one or more aspects to produce a comparison and interprets the in light of a desired pattern for the comparison. For instance, the marketplace server utilizes a decision tree structure to interpret a plurality of fraud detection questions to provide a plurality of fraud detection answers and to interpret the plurality of fraud detection answers to indicate whether the buyer is valid.

When the buyer is invalid, the method continues at step 568 where the marketplace server performs an alternate verification process (e.g., facilitating manual interpretation of risk factors by an operator associated with the market place network, invoking a secondary fraud detection algorithm). The method continues at step 570 where the marketplace server determines whether the alternate verification process is successful. If not, the buyer's access to the marketplace is denied.

If the buyer is validated, the method continues at step 582 where the marketplace server facilitates display of brands of exchange items available for purchase. For example, the marketplace server sends marketplace inventory information (e.g., brands, values, discount levels, etc.) to the buyer's computing device for display thereon. The method continues at step 584 where the marketplace server receives a brand selection from the buyer's computing device.

The method continues at step 586 where the marketplace server facilitates display of exchange items associated with the selected brand. For example, the marketplace server sends marketplace inventory information associated with the selected brand to the buyer's computing device for display thereon (e.g., displaying various available balances and discount levels for exchange items of the brand). In addition, the marketplace server provides the buyer's computing device with exchange item information of related brands to the selected brand (e.g., selected a particular coffee shop, provide exchange items from multiple coffee shops).

The method continues at step 588 where the marketplace server receives a selection of an exchange item for purchase from the buyer's computing device. For example, the buyer's computing device sends the server a message that includes one or more of the ID of the exchange item, the brand(s) of the exchange item, a descriptor of the exchange item, a value of the exchange item, a purchase price of the exchange item, a desired purchase price of the exchange item, a range of a desired purchase price of the exchange item, a serial number associated with exchange item, and/or buyer payment information.

The method continues at step 590 where the marketplace server adds the selected exchange item to a cart associated with the buyer (e.g., update a temporary list of one or more exchange items for purchase). The method continues at step 592 where the marketplace server determines whether the buyer intends to keep shopping. The determining may be based on one or more of detection of the expiration of a shopping timer, receiving an indicator that buyer is still shopping, receiving an indicator that the buyer has finished shopping. If yes, the method repeats at step 582.

When buyer desires to checkout, the method continues at step 594 where the marketplace server determines whether valid payment has been obtained. The determining includes at least one of verifying a complete payment (e.g., verifying a credit card transaction, etc.) and verifying that the buyer is capable of providing full payment (e.g., verifying purchase ability on a buyer credit card). If not, the order is voided. Alternatively, the method branches from step 564 to step 582 to perform the steps 582-592, such that steps 566-570 to validate the buyer are performed after step 592 and before step 594.

If a valid payment is received, the method continues at step 598 where the marketplace server determines whether a balance of each selected exchange item is accurate (e.g., a balance listed in the database matches a balance check response from a brand server associated with the exchange item). If the balance is not accurate, the transaction is voided. Note that it may be restarted with adjustments made based on the accurate balance.

If the balance is accurate, the method continues at step 600 where the marketplace server adds the exchange item to a buyer wallet (e.g., the marketplace server sends exchange item information to the buyer user device). The method continues at step 602 where the marketplace server continues to proceed to payment to conclude collection of payment from the buyer if not already collected and to distribute payment to one or more payees (e.g., the seller, other payees).

Figure 14:
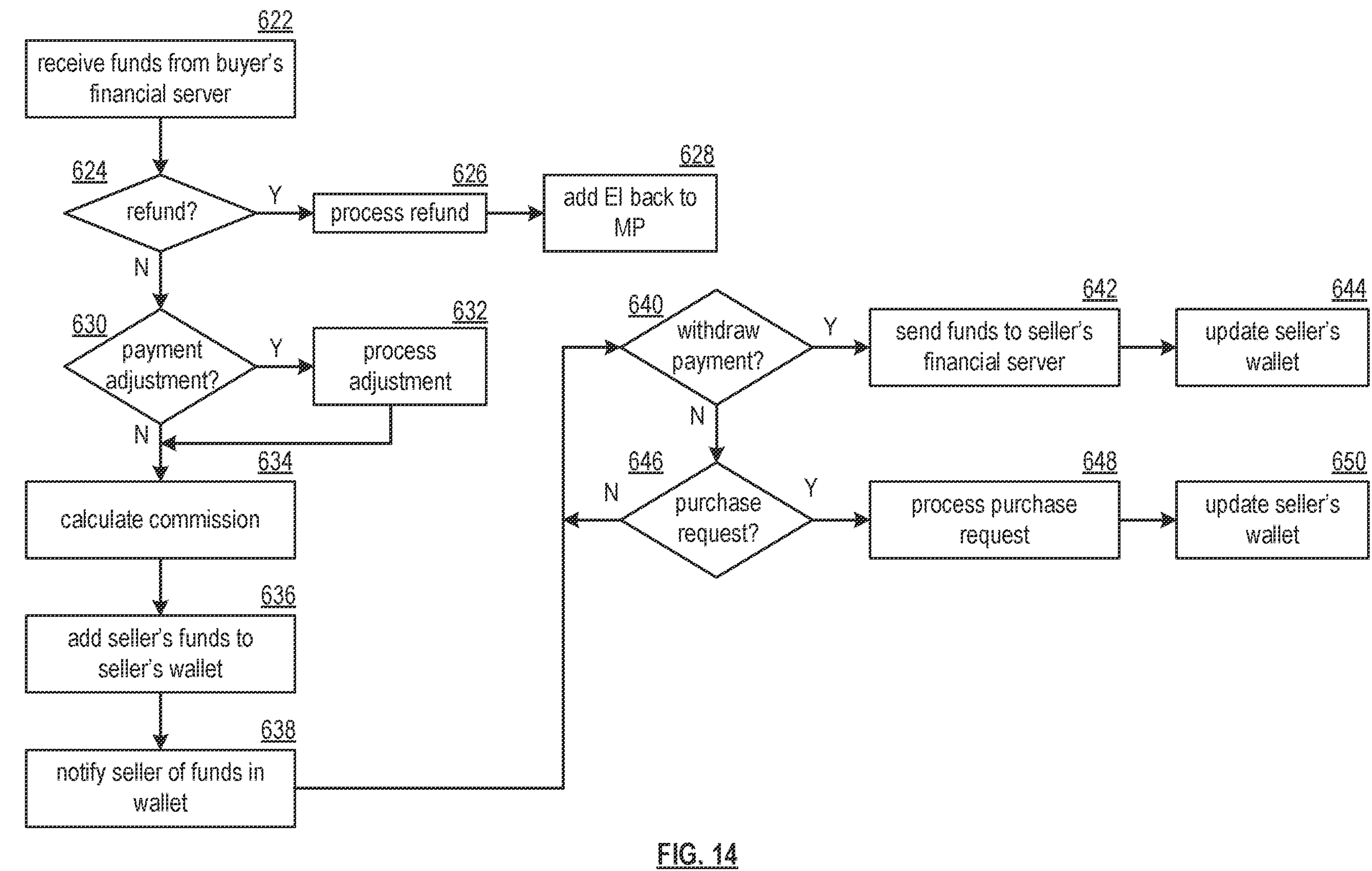
FIG. 14 is a logic diagram of an embodiment of a method of exchange item payment in an exchange item marketplace network in accordance with the present invention.

FIG. 14 is a flowchart illustrating an example of exchange item payment within an exchange item marketplace. The method includes step 622 where a marketplace server associated with exchange item marketplace receives funds from a buyer's financial server for payment of a selected exchange item for purchase. For example, the marketplace server verifies that a credit card payment shall be made to compensate for purchase of the selected exchange item.

The method continues at step 624 where the marketplace server determines whether a refund is to be processed for the payment of the exchange item for purchase. The determining may be based on one or more of receiving a transaction cancellation request after the funds have been received for payment, detecting that an estimated fraud level is greater than a fraud threshold level, and interpreting at least one of a seller or buyer terms and conditions to trigger the refund.

If a refund is to be made, the method continues at step 626 where the marketplace server processes the refund (e.g., reverse a credit card payment from the buyer). The method continues to step 628 where the marketplace server adds the selected exchange item back to the marketplace for sale (e.g., re-creates an entry to include the exchange item information and stores the entry in a database associated with the exchange item marketplace).

If a refund is not being made, the method continues at step 630 where the marketplace server determines whether a payment adjustment is to be processed when the refund is not to be processed. The determining may be based on one or more of interpreting seller terms and conditions, buyer terms and conditions, network operator terms and conditions, and other payee's terms and conditions. For example, the marketplace server interprets terms and conditions of a credit card company associated with the buyer that indicates that a 3% fee is required. If an adjustment is required, the method continues at step 632 where the server processes the adjustment.

If no adjustments are to be made or after the adjustment is made, the method continues at step 634 where the marketplace server calculates a commission for the network operator and/or other payees in accordance with terms and conditions associated with payment resolution. For example, the marketplace server subtracts the 3% credit card fee from a gross commission rate of 15% for the network operator to produce a net commission rate of 12% for the network operator.

The method continues at step 636 where the marketplace server adds the seller's funds to a seller's e-wallet. The adding includes at least one of indicating a marketplace credit, indicating a cash payment, indicating a payment in accordance with payment information for the seller, and indicating another exchange item as compensation for the seller. The method continues at step 638 where the marketplace server notifies the seller of funds in the seller's wallet. For example, the marketplace server sends a seller wallet update to a seller user device, where the seller wallet update includes an indication of the funds to be added the seller's wallet.

The method continues at step 640 where the marketplace server determines whether a funds withdraw request has been received from the seller's computing device. If not, the method continues at step 646 where the server determines whether it is receiving a purchase request from the seller's computing device, which is now functioning as a buyer's computing device. If not, the method repeats at step 640.

When a funds withdraw request is received, the method continues at step 642 where the marketplace server sends funds to the seller's financial server. For example, the marketplace server sends and automatic clearinghouse (ACH) transfer of funds to the seller's financial server in accordance with seller payment information. The method continues at step 644 where the marketplace server updates the seller's wallet. For example, the marketplace server sends a further update to the seller user device indicating that the seller's wallet has been updated to include the payment.

When a purchase request is received, the method continues at step 648 where the marketplace server processes the purchase request. For example, the marketplace server indicates that the selected other exchange item has been removed from the marketplace and transferred to the seller's wallet. The method continues at step 650 where the marketplace server updates the seller's wallet to debit the amount of the purchase just processed.

Figure 15:
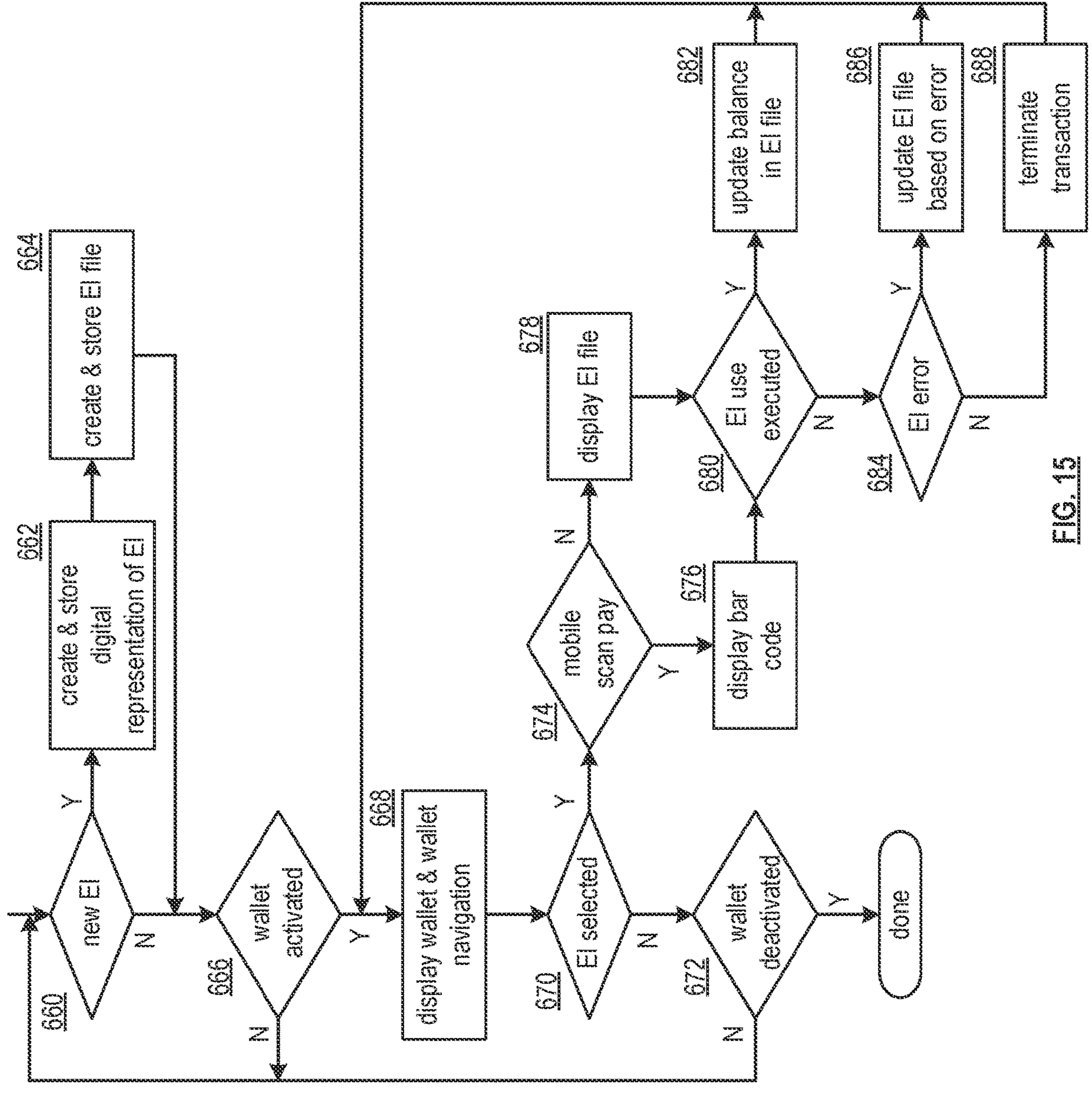
FIG. 15 is a logic diagram of an embodiment of a method of exchange item balance update in an exchange item marketplace network in accordance with the present invention.

FIG. 15 is a flowchart illustrating a method that includes step 660 where a marketplace server determines whether a new exchange item is to be added to a buyer wallet associated with the buyer user device. The determining may be based on one or more of processing a purchase request for the new exchange item, obtaining a favorable purchase response to a purchase request for the new exchange item, and receiving a payment response indication that includes the new exchange item as compensation.

If a new exchange item is to be added to the buyer's e-wallet, the method continues at step 662 where the marketplace server and/or the buyer's computing device creates and stores a digital representation of the exchange item. The creating of the digital representation includes at least one of capturing a digital image of the exchange item, interpreting the captured image to produce attributes (e.g., brand, brand logo, serial number, barcode, etc.) of the exchange item, and receiving the attributes of the exchange item. The method continues at step 664 where the buyer's computing device and/or the marketplace server creates and stores an exchange item file, where the file includes the digital representation of the exchange item and other information regarding the exchange item.

The method continues at step 666 where the buyer's computing device determines whether the buyer's wallet is activated (e.g., status check, interpret a query). If not, the method repeats at step 660. If the wallet is activated, the method continues to step 668 where the buyer's computing device displays the buyer wallet and wallet navigation information (e.g., tools to facilitate searching a plurality of digital representations of the exchange items associated with the buyer wallet). The method continues at step 670 where the buyer's computing device determines whether an exchange item has been selected for utilization (e.g., to spend down a gift card when the exchange item is the gift card). If not, the method continues at step 672 where the buyer's computing device determines whether the wallet has been deactivated. If deactivated, the method ends. If not deactivated, the method repeats at step 660.

When an exchange item has been selected, the method continues at step 674 where the buyer's computing device determines whether use of the selected exchange item will be via a mobile scan payment (e.g., displaying a bar code of the exchange item on a display of the buyer's computing device). If yes, the method continues at step 676 where the buyer's computing device displays a bar code of the exchange item and, at step 680, the bar code is read by point of sales equipment of a merchant to execute a purchase.

If mobile scan pay is not being used, the method continues at step 678 where the buyer's computing device displays the exchange item file (e.g., including a unique serial number associated with the exchange item). The displaying of the exchange item file facilitates manual reading of the unique serial number by an operator of the point-of-sale terminal or similar to facilitate utilization of the exchange item to execute a purchase.

The method continues at step 680 where the buyer's computing device determines whether the exchange item use has been successfully executed to make a purchase. The determining may be based on one or more of interpreting a payment confirmation indicator, receiving a purchase verification, and receiving an indicator that at least a portion of an available balance associated with the exchange item for use has been utilized. If yes, the method continues at step 682 where the buyer's computing device updates balance information in the exchange item file. For example, the buyer user device subtracts a point-of-sale purchase amount from a previous balance of the exchange item to produce an updated balance.

If the use of the exchange item was not executed, the method continues at step 684 where the buyer's computing device determines whether the unsuccessful use of the exchange item to execute a purchase was due to an error of the exchange item. The error may be an expired exchange item, insufficient balance on the exchange item, a violated restriction, etc. If it is not an error (e.g., a denial by the POS equipment), the method continues at step 688 where the transaction is terminated and the method repeats at step 668.

If it is an error, the method continues at step 686 where the buyer's computing device updates the exchange item file based on the exchange item error. For example, the buyer user device updates the exchange item file correct the balance when the balance mismatch has been indicated.

Figure 16:
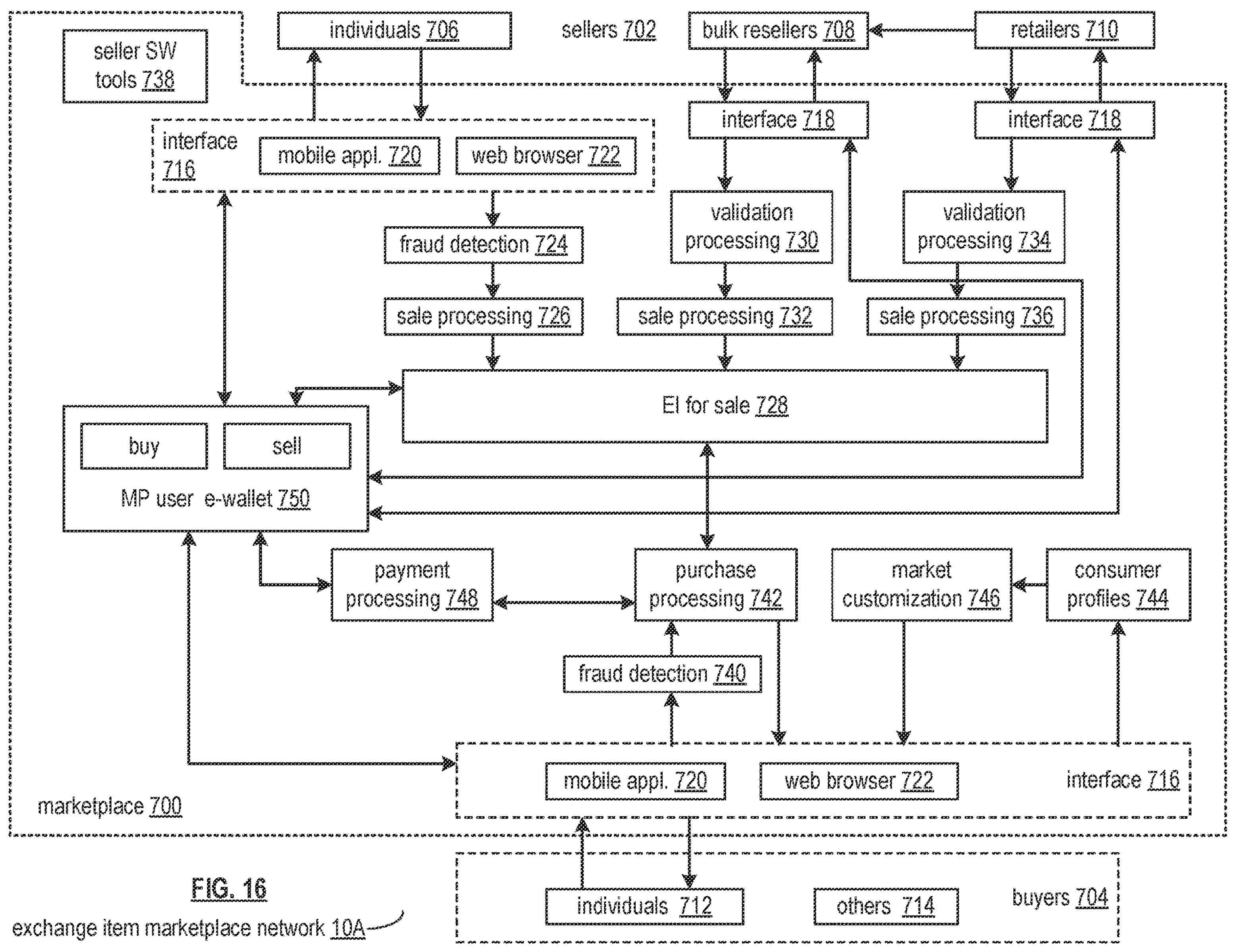
FIG. 16 is a schematic block diagram of another embodiment of an exchange item marketplace network in accordance with the present invention.

FIG. 16 is a schematic block diagram of another embodiment of an exchange item marketplace network 10A that includes a plurality of sellers 702, a plurality of buyers 704, and an on-line exchange item marketplace 700. Hereafter, the exchange item marketplace network 10A may be interchangeably referred to as a system, a communication system, and a communication network. The sellers 702 include individual sellers 706, bulk resellers 708, and retailers 710. The buyers 704 include individual buyers 712 and other types of buyers 714 (e.g., bulk buyers, resale buyers, etc.).

Each seller 702 and each buyer 704 corresponds to a computing device 12-16 that includes a marketplace interface module 716 that enables the computing device access to the marketplace 700 and to function therein. The marketplace interface module 716 includes a browser application 722, a mobile device application 720, and/or any type of application that enables access to the marketplace 700. The computing core 52 of the user device executes one or more of these applications. For instance, each of the applications includes operational instructions that are stored in memory (e.g., main memory, flash memory, SS memory, HD memory, and/or cloud memory) and executed by the processing module 62 of the computing core 52.

Alternatively, the marketplace interface module 716 includes a processing circuit and memory, wherein the memory stores and the processing circuit executes the operational instructions of the application. As yet another alternative, the processing circuit of the marketplace interface module 716 and the processing module 62 of the computing core 52 co-process the operational instructions of one or more of the applications. Interface 718 functions in a similar manner to provide bulk resellers 708 and/or retailers 710 access and function within the marketplace 700.

One or more marketplace servers 18 supports the online exchange item (EI) marketplace 700 by performing the functions of the corresponding functional blocks. The functional blocks include seller software tools 738, individual seller fraud detection 724, individual sale processing 726, bulk seller verification processing 730, bulk sale processing 732, retailer verification processing 734, retailer sale processing 736, displaying exchange items for sale 728 in the marketplace 700, payment processing 748, MP user e-wallet 750, buyer fraud detection 740, purchase processing 742, consumer profiles 744, and market customization 746. A functional block includes one or more of a standalone processing module that executes operational instructions to perform the corresponding functions of the block, a software algorithm executed by the computer core of the server to perform the corresponding functions of the block, and/or a combination thereof.

The server(s) 18 perform the marketplace user e-wallet functional block 750 to create and maintain an e-wallet for a user of the marketplace 700. The e-wallet is essentially a file for an individual user (e.g., a person, a legal entity, etc.) that stores information regarding exchange items bought, sold, and/or used by the user. For example, the e-wallet stores a digital representation of each purchased exchange item that has a value greater than zero. For example, a digital representation of a gift card is displayed in an asset section of the e-wallet while the gift card has a balance above zero and the gift card has not expired. When the balance is zero or the gift card expires, the digital representation is removed and the information regarding the gift card is stored in an archive section of the e-wallet.

The e-wallet is further capable of storing and tracking marketplace credit. For example, a user may purchase marketplace credit that is subsequently used to purchase an exchange item. In addition, a seller of an exchange item may be paid in marketplace credit that the seller may use to purchase an exchange item or cash out.

The e-wallet further functions to archive data regarding previous exchange item purchases and/or previous exchange item sales. The amount of data stored for each exchange item purchase or sale may be user defined or set based on a system default setting. For example, the data for a purchase includes one or more of a purchase price, the exchange item ID, a serial number, a brand name, a purchase date, the value of the exchange item, restrictions of the exchange item, and an expiration date. The data for a purchased exchange item may further include use information (e.g., when the exchanged item was used, the amount of value used, the date of use, the place of use, etc.) and/or remaining value information.

As another example, the data for a sale includes one or more of an asking selling price, a sold price, the exchange item ID, a serial number, a brand name, an offer for sale time stamp, a sold time stamp, the value of the exchange item, restrictions of the exchange item, and an expiration date. The data for a sold exchange item may further include price reduction information (e.g., the amount of the change, a change time stamp, etc.) and/or information regarding a withdrawal of an offer for sale.

The server(s) 18 perform the seller software tools functional block 738 to assist a seller (e.g., individual, bulk, or retailer) in setting a price for an exchange item. For example, the server(s) 18 record data regarding exchange items offered for sale, data regarding purchases of exchange items, and data regarding exchange items for which the offer for sale was withdrawn. From this data, the server(s) 18 determines predictive sales information. For example, the server(s) 18 determines for a particular type of exchange item (e.g., a gift card for a particular franchise) a correlation between the value of the exchange item and duration in the marketplace (e.g., a $250 gift card has an average duration of 1 day, a $100 gift card has an average duration of 12 hours, a $50 gift card has an average duration of 5 hours, etc.).

As another example of predictive sales information, the server(s) 18 determine a correlation between sales price and duration in the marketplace (e.g., a 5% discount has an average duration of 12.5 hours, a 3% discount has an average of 1 day, and a 10% discount has an average duration of 1.5 hours). As yet another example, the server(s) 18 determine a periodic sales volume for a particular exchange item (e.g., how many sold in an hour, six hours, a day, etc.). As yet another example, the server(s) 18 determine a current quantity of the particular exchange items for sale (e.g., how many are currently being offered for sale, at what sales price, the current average duration in the marketplace, etc.). The server(s) 18 may further analyze any type of data maintained by the system 10A to assist in the creation of predictive sales information.

In addition to creating the predictive sales information, the server(s) 18 generate a seller's profile, which includes information regarding the sales tendencies and/or preferences of a particular seller. For example, the seller's profile includes information regarding one or more of the types of exchange items offered for sale, information regarding if and when exchange item offers for sale are withdrawn, initial asking prices for exchange items offered for sale, actual sales price information and corresponding discounted percentage, frequency for which initial asking price is adjusted, average duration of exchange items in the marketplace, standard deviation of duration of exchange items in the marketplace, etc.

From the predictive sales information and the seller's profile, the server(s) 18 provide a suggested sales price for a particular exchange item. For example, the seller profile indicates that the seller has a tendency to offer a particular exchange item with a minimal discount and prefers that the exchange item remain in the marketplace for less than 6 hours. Further, the predictive sales information for the particular exchange item indicates that there is currently above normal quantity of the exchange item for sale, the current asking price has a greater discount than the seller's preference, and the current average duration in the marketplace is 7 hours, the server(s) 18 provides one or more recommendations and corresponding predictive outcomes (e.g., an initial asking price below the seller's profile to sell the exchange item within 6 hours, an initial asking price corresponding to the seller's profile to sell the exchange item within 11 hours, etc.). The server(s) 18 may further provide the predictive sales information to the seller's computing device.

The server(s) 18 perform the individual seller fraud detection functional block 724 to automate detection of a fraudulent seller and/or a fraudulent exchange item. This includes the seller verification and the exchange item verification as discussed in one or more of FIGS. 6A—6D, and 7-11. The fraud detection further includes an automated process for resolving a potential fraud issue. For example, when a verification of seller falls between verified and not verified, the server(s) 18 evoke a process to render a definitive verification decision. As another example, when the verification of an exchange item falls between verified and not verified, the server(s) 18 evoke a process to render a definitive verification decision.

To extend the use of the marketplace to retailers or branded companies (i.e., the entity that initiates a gift card and ultimately accepts the gift card as payment), the server(s) 18 perform the retailer verification processing functional block 734 and the retailer sale processing functional block 736. The retailer verification processing functional block 734 includes one or more of setting up an account for a retailer to sell exchange items via the marketplace, verifying the retailer at least at the setup of the account and potentially for each transaction conducted via the marketplace, verifying the exchange items being offered for sale, and/or other verification mechanisms. As an example, a secure portal is established between the retailer seller and the marketplace server(s) 18 such that any communications via the secure portal is at least initially deemed a valid communication.

The retailer sale processing functional block 736 includes one or more of creating digital representations of the exchange items offered for sale, determining selling parameters and posting the digital representations and the parameters in the marketplace. The selling parameters include one or more of sales price, listing duration before changing price, restrictions, withdraw procedures, etc.

The server(s) 18 perform the buyer fraud detection functional block 740 to automate detection of a fraudulent buyer and/or fraudulent financial information used for purchasing. This includes the buyer verification and the purchase verification as discussed in one or more of FIGS. 5, 6A-6D, and 13. The fraud detection further includes an automated process for resolving a potential fraud issue. For example, when a verification of buyer falls between verified and not verified, the server(s) 18 evoke a process to render a definitive verification decision. As another example, when the verification of financial information falls between verified and not verified, the server(s) 18 evoke a process to render a definitive verification decision.

The server(s) 18 perform the payment processing functional block 748 to process payment through the user e-wallets of the seller and of the buyer. For instance, payment by the buyer is made from the buyer's e-wallet by debiting a credit card, a checking account, a savings account, a currency balance (e.g., money on account for purchases), and/or marketplace credit. Payment to the seller is made by crediting the seller's e-wallet with currency, marketplace credit, and/or some form of financial receipt. The mechanics of the payment process include the functionality described in one or more of FIGS. 5, 6A-6D, and 11-14.

The server(s) 18 perform the consumer profiles functional block 744 for a buyer. For the buyer, its consumer profile includes data regarding exchange item purchases of the buyer. The data includes one or more of the exchange items purchased, frequency of purchases, average purchase price, average value of purchased like exchange items (e.g., coffee shop gift cards), preferred discounts, etc. Note that this may be included in the buyer's e-wallet or maintained as a separate file.

The server(s) 18 perform the market customization functional block 746 to customize marketing of exchange items being offered for sale to particular buyers based on their buyer profiles. The market customization functional block 746 further includes determining a type and a quantity of exchange items a retailer should offer for sale and directing marketing efforts to a particular segment of buyers. In this manner, the system 10A efficiently and effectively couples exchange items for sale to buyers who typically buy such exchange items.

The server(s) 18 perform the individual sales processing function block 726, the bulk seller verification processing functional block 730, the bulk sale processing functional block 732, and the purchase processing functional block 742 as described with reference to one or more of FIGS. 2, 5, 6A—6D, and 7-10. The server(s) 18 also perform the displaying exchange items for sale functional block 728 to add/remove/edit an exchange item in the marketplace 700 as described with reference to one or more of FIGS. 2, 5, 6A-6D, 7-10, and 12.

Figures 17A, 17B:
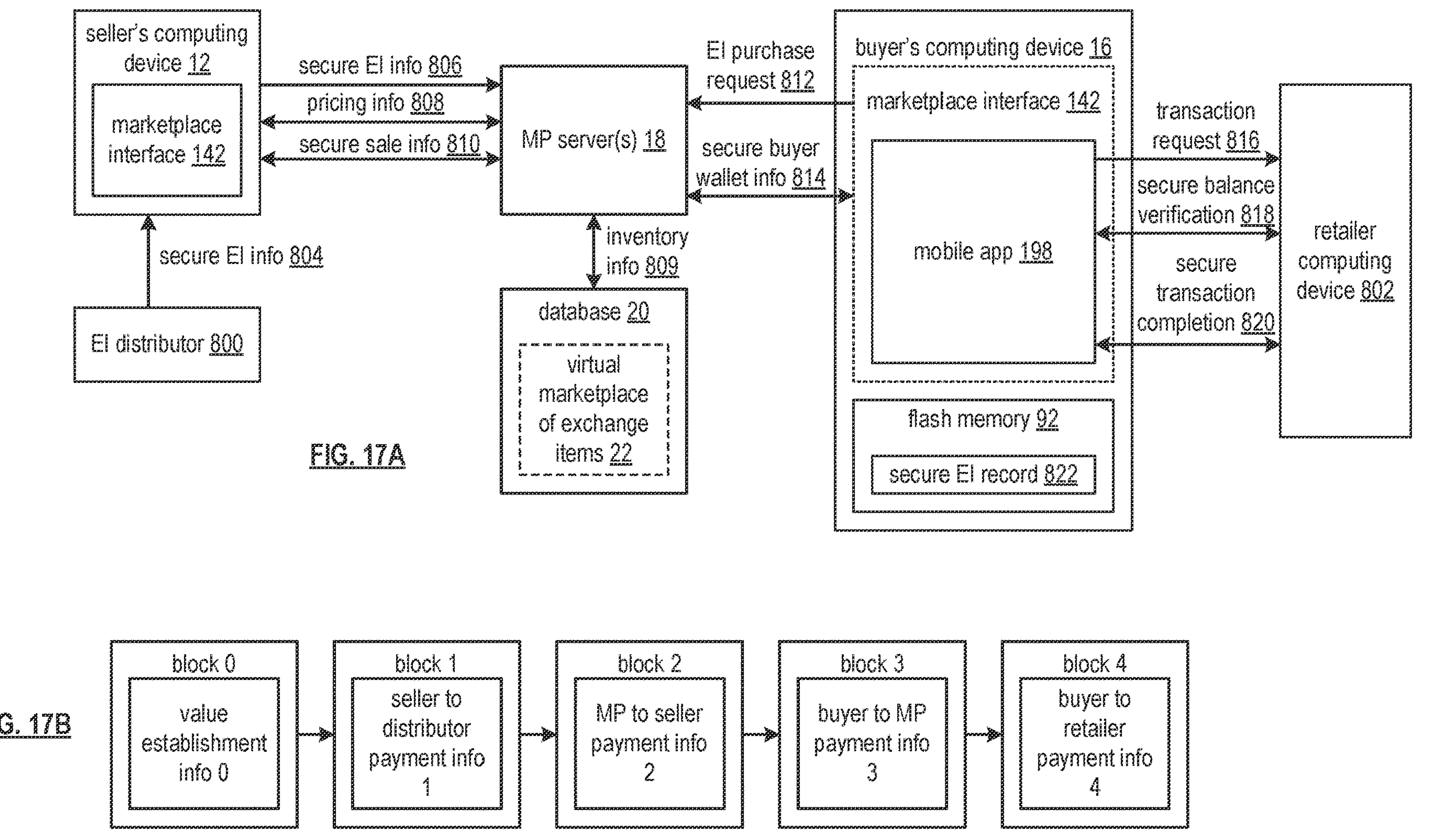
FIG. 17A is a schematic block diagram of another embodiment of an exchange item marketplace network in accordance with the present invention.
FIG. 17B is a schematic block diagram of a transactions blockchain in accordance with the present invention.

FIG. 17A is a schematic block diagram of another embodiment of an exchange item marketplace network that includes an EI distributor 800, the seller's computing device 12, the MP server(s) 18, the database 20, the buyer's computing device 16, and a retailer computing device 802. Alternatively, the MP server may include the database 20, where the virtual marketplace of exchange items 22 is stored as one or more transaction blockchains of a secure custody protocol. The EI distributor 800 may be implemented utilizing one or more of the distributor servers 30 of FIG. 2, the brand server(s) 26 of FIG. 2, the MP server 18, and a merchant server (e.g., any entity acting on behalf of a brand in a distributor role). The retailer computing device 802 may be implemented utilizing one or more of the point-of-sale (POS) equipment 32 of FIG. 2, a merchant server, and the retail servers 34 of FIG. 2. The seller's computing device 12 includes the marketplace interface 142. The buyer's computing device 16 includes the marketplace interface 142 and the flash memory 92 of FIG. 3. The marketplace interface 142 includes the mobile app 198. The exchange item marketplace network functions to generate a transactions blockchain while facilitating a plurality of exchange item transactions. For example, a transactions block chain is maintained for each exchange item. As another example, the transactions block chain is maintained for a plurality of exchange items. As yet another example, a single transactions block chain is maintained for all the exchange items for the entire virtual marketplace of exchange items 22. The transactions blockchain includes a block associated with each transaction of the plurality of exchange item transactions. Each block includes a header section and a transaction section. A structure of the transactions blockchain is discussed in greater detail with reference to FIGS. 17B-C.

In an example of operation of the generating of the transactions blockchain, the EI distributor 800 generates a block 0 of the transactions blockchain to establish exchange item (EI) information when determining to offer an exchange item for sale. The determining may be based on one or more of receiving a purchase request from the seller's computing device 12, receiving a bulk EI creation request, receiving the EI information from one or more of a branded company server and a processor service, and interpreting a schedule. For example, the EI distributor 800 determines to establish the EI information when receiving, via the processor service, EI information for a plurality of exchange items from the branded company server. As another example, the EI distributor 800 determines to establish the EI information when receiving, via a retail point-of-sale device, a purchase request for the EI from the seller's computing device 12.

Having determined to offer the EI for sale, the EI distributor 800 obtains the EI information. The obtaining includes receiving the EI information from the processor service and generating the EI information. The generating the EI information includes obtaining one or more of available balance, serial number, personal identification number (PIN), brand, EI type, expiration date, pricing approach, purchase restrictions, a hash of one or more of the elements of the EI information (e.g., a secure hash of the EI type using a private key of a private/public key pair of the brand server(s) 26), and the public key of the private/public key pair of the brand server(s) 26. Having obtained the EI information, the EI distributor 800 generates the block 0 to include the EI information.

The generating of the block 0 includes populating the block zero with a representation of the EI information and establishing trust for the block 0 utilizing a trust approach. The trust approach includes at least one of a digital signature approach utilizing a private key of a private/public key pair of the EI distributor 800 and encrypting the EI information utilizing the private key of the private/public key pair of the EI distributor 800 to produce the representation of the EI information. For example, the EI distributor 800 encrypts the EI information and the public key of the EI distributor 800 utilizing the private key of the EI distributor 800 to produce the transaction section of the block 0 when utilizing the encryption trust approach. As another example, the EI distributor 800 utilizes the private key of the EI distributor 800 to generate a digital signature over the EI information and the public key of the EI distributor 800 to produce the transaction section of the block 0.

When receiving the EI purchase request from the seller's computing device 12, the EI distributor 800 generates a block 1 of the EI transactions chain to indicate that the seller's computing device 12 is purchasing the EI from the EI distributor 800, where the block 1 is chained to the block 0 in accordance with a trusted chaining approach, and where the block 1 is generated utilizing the trust approach (e.g., as utilized when generating the block 0). The trusted chaining approach is discussed in greater detail with reference to FIG. 17C.

The generating of the block 1 includes generating seller to distributor payment information 1 (e.g., purchase price of this transaction, a timestamp of this transaction, purchaser identifier, and the transaction portion of the previous block), and establishing trust for the block 1 utilizing the trust approach. For example, the EI distributor 800 obtains a public key of a private/public key pair of the seller's computing device 12, encrypts the seller to distributor payment information 1 and the public key of the seller's computing device 12 utilizing the private key of the EI distributor 800 to produce the transaction portion of the block 1 when utilizing the encryption trust approach. As another example, the EI distributor 800 utilizes the private key of the EI distributor 800 to generate a digital signature over the seller to distributor payment information 1 and the public key of the seller's computing device 12 to produce the transaction section of the block 1.

Having generated the block 1 chained to the block 0, the EI distributor 800 issues secure EI information 804 to the seller's computing device 12. The issuing includes generating the secure EI information 804 to include the EI transactions chain (e.g., blocks 0-1) and sending the secure EI information 804 to the seller's computing device 12.

When determining to offer the EI for sale via the virtual marketplace of exchange items 22, the seller's computing device 12 issues secure EI information 806 to the MP servers 18, where the secure EI information 806 includes one or more of the secure EI information 804 and a request to sell the EI via the virtual marketplace of exchange items 22. Having received the secure EI information 806, MP servers 18 communicates pricing information 808 with the seller's computing device 12, where the pricing information 808 includes one or more of a desired price, a desired price range, a recommended price range, a recommended price, and a confirmed price.

Having communicated the confirmed price, the seller's computing device 12 and the MP servers 18 communicates secure sale information 810. For example, the MP servers 18 updates inventory information 809 (e.g., brand, balance, price, expiration date, volume, pricing rules by brand, etc.) to provide a representation of the EI for storage in the database 20 based on the transaction portion of the block 1, the MP servers 18 provides a public key of a private/public key pair of the MP servers 18 to the seller's computing device 12, and the seller's computing device 12 generates a block 2 of the EI transactions chain to indicate that the MP servers 18 is representing the EI for purchase by a buyer's computing device 16, where the block 2 is chained to the block 1 in accordance with the trusted chaining approach, and where the block 2 is generated utilizing the trust approach (e.g., as utilized when generating the block 1).

The generating of the block 2 includes generating a marketplace to seller representation and/or payment information 2 (e.g., desired price, a timestamp of this transaction, purchaser identifier, and the transaction portion of the previous block), and establishing trust for the block 2 utilizing the trust approach. For example, the seller's computing device 12 obtains the public key of a private/public key pair of the MP servers 18, encrypts the seller representation and/or payment information 2 and the public key of the MP servers 18 utilizing the private key of the seller's computing device 12 to produce the transaction section of the block 2 when utilizing the encryption trust approach. As another example, the seller's computing device 12 utilizes the private key of the seller's computer device 12 to generate a digital signature over the seller representation and/or payment information 2 and the public key of the MP servers 18 to produce the transaction portion of the block 2.

Having generated the block 2 chained to the block 1, the seller's computing device 12 issues the secure sale information 810 to the MP servers 18. The issuing includes generating the secure sale information 810 to include the EI transactions chain (e.g., blocks 0-2) and sending the secure sale information 810 to the MP servers 18.

When determining to purchase the EI for sale via the virtual marketplace of exchange items 22, the buyer's computing device 16 issues an EI purchase request 812 to the MP servers 18, where the EI purchase request 812 includes a request to purchase the EI (e.g., buyer's computing device 16 identifier, public key of a private/public key pair of the buyer's computing device 16, a purchase price, etc.). Having received the EI purchase request 812, the MP servers 18 communicate secure buyer wallet information 814 with the buyer's computing device 16. For example, the buyer's computing device 16 sends payment instructions to the MP servers 18 (e.g., purchase price, payment account information), the MP servers 18 generates a block 3 of the EI transactions chain to indicate that the buyer's computing device 16 is purchasing the EI for the purchase price amount, where the block 3 is chained to the block 2 in accordance with the trusted chaining approach, and where the block 3 is generated utilizing the trust approach (e.g., as utilized when generating the block 2).

The generating of the block 3 includes generating buyer to marketplace payment information 3 (e.g., a confirmed purchase price, payment instructions, a timestamp of this transaction, purchaser identifier, and the transaction portion of the previous block), and establishing trust for the block 3 utilizing the trust approach. For example, the MP servers 18 obtains the public key of the private/public key pair of the buyer's computing device 16, encrypts the buyer to marketplace payment information 3 and the public key of the buyer's computing device 16 utilizing the private key of the MP servers 18 to produce the transaction section of the block 3 when utilizing the encryption trust approach. As another example, the MP servers 18 utilizes the private key of the MP servers 18 to generate a digital signature over the buyer to marketplace payment information 3 and the public key of the buyer's computing device 16 to produce the transaction section of the block 3.

Having generated the block 3 chained to the block 2, the MP servers 18 issues secure buyer wallet information 814 to the buyers computing device 16. The issuing includes generating the secure buyer wallet information 814 to include the EI transactions chain (e.g., blocks 0-3) and sending the secure buyer wallet information 814 to buyer's computing device 16, where the mobile app 198 facilitates storage of the transactions chain as a secure EI record 822 in the flash memory 92.

When the buyer's computing device 16 determines to utilize the EI for payment of a transaction with the retailer computing device 802, the buyer's computing device 16 sends a transaction request 816 to the retailer computing device 802, where the transaction request 816 includes one or more of a retail transaction identifier of the transaction with the retailer computing device 802, and payment instructions that identifies the EI.

Having received the transaction request 816 the retailer computing device 802 and the buyer's computing device 16 communicate secure balance verification 818. The communicating of the secure balance verification information 818 includes the buyer's computing device 16 sending one or more of the secure EI record 822 (e.g., blocks 0-3) to the retailer computing device 802 and the public key of the private/public key pair of the MP servers 18.

Having received the secure EI record 822, the retailer computing device 802 verifies that a sufficient balance level is associated with the secure EI record 822 to facilitate completion of the transaction request 816. For example, the retailer computing device 802 decrypts the secure transaction section of the secure EI record 822 utilizing the public key of the MP servers 18 to reveal the balance level and a public key of the buyer's computing device 16 for verification with a public key received directly from the buyer's computing device 16. The retailer computing device 802 indicates favorable verification when the revealed balance level is sufficient and the received public key from the buyer's computing device 16 compares favorably (e.g., substantially the same) to the revealed public key from the secure EI record 822. As another example, the retailer computing device 802 verifies a signature over the secure transaction portion of the secure EI record 822 utilizing the public key of the MP servers 18 to verify the balance level and to verify the public key of the buyer's computing device 16. The retailer computing device 802 indicates favorable verification when the verified balance level is sufficient and the public key from the buyer's computing device 16 is verified from the secure EI record 822. As yet another verification example, the retail computing device 802 decrypts the hash of the one or more of the elements of the EI information using the private key of the EI distributor 800 (e.g., or a brand server(s) 26) and indicates favorable verification when the decrypted hash is substantially the same as a calculated hash over the one or more of the elements of the EI information. As such, the EI can be considered a legitimately issued EI from the brand server(s) 26 (e.g., from the brand owner).

When the verifications are favorable, the retailer computing device 802 and the buyer's computing device 16 communicate secure transaction completion 820. For example, the buyer's computing device 16 sends payment instructions to the retailer computing device 802 (e.g., purchase price, EI information), the buyer's computing device 16 generates a block 4 of the EI transactions chain to indicate that the buyer's computing device 16 is utilizing the EI for the purchase price amount, where the block 4 is chained to the block 3 in accordance with the trusted chaining approach, and where the block 4 is generated utilizing the trust approach (e.g., as utilized when generating the block 3).

The generating of the block 4 includes generating buyer to retailer payment information 4 (e.g., a confirmed purchase price, payment instructions utilizing the EI, a timestamp of this transaction, purchaser identifier, and the transaction portion of the previous block), and establishing trust for the block 4 utilizing the trust approach. For example, the buyer's computing device 16 obtains the public key of the private/public key pair of the retailer computing device 802, encrypts the buyer to retailer payment information 4 and the public key of the retailer computing device 802 utilizing the private key of the buyer's computing device 16 to produce the transaction section of the block 4 when utilizing the encryption trust approach. As another example, the buyer's computing device 16 utilizes the private key of the buyer's computing device 16 to generate a digital signature over the buyer to retailer payment information 4 and the public key of the retailer computing device 802 to produce the transaction section of the block 4.

Having generated the block 4 chained to the block 3, the buyer's computing device 16 issues the secure transaction completion 820 to the retailer computing device 802. The issuing includes generating the secure transaction completion 820 to include the EI transactions chain (e.g., blocks 0-4) and sending the secure transaction completion 820 to the retailer computing device 802, where the mobile app 198 may facilitate storage of an updated transactions chain as an updated secure EI record 822 in the flash memory 92. Alternatively, or in addition to, each of the seller's computing device 12, the MP servers 18, and the buyer's computing device 16 may validate information within the EI transactions chain by validating the chaining of each block to a next block utilizing the trusted chaining approach and may further validate information with the EI transactions chain by validating integrity of the transaction section of one or more of the blocks utilizing the trust approach (e.g., verifying a signature, decrypting an encrypted transaction to reveal a public key for verification).

In another example of operation of the generating of the transactions blockchain, at least one of the EI distributor 800, the seller's computing device 12, and the MP server(s) 18, authenticates value of an exchange item to produce an authenticated value of the exchange item. The exchange item includes one of a closed loop financial instrument and a digital good. The authenticating of the value includes a variety of authenticating approaches.

A first authenticating approach includes the seller's computing device 12 authenticating the value of the exchange item via a communication with a brand server (e.g., issue an authentication request, interpret a received verification response to identify an available balance of the exchange item associated with the brand server), generating a secure exchange item package, and securely passing, by the seller's computing device 12 to the marketplace servers 18, control over the secure exchange item package such that the marketplace server 18 obtains the control over the secure exchange item package. The securely passing includes updating a transaction section of the secure exchange item package by including a public key of a recipient device (e.g., the marketplace servers 18) of the secure exchange item package and signing the secure exchange item package by a transferring device (e.g., the seller's computing device 12) of the secure exchange item package. The secure exchange item package includes a header section and a transaction section. The secure exchange item package is discussed in greater detail with reference to FIG. 17C. A second authenticating approach includes the MP server(s) 18 authenticating the value of the exchange item via the communication with the brand server, generating the secure exchange item package, and obtaining control over the secure exchange item package as a result of being an originator of the secure exchange item package.

With the authenticated value of the exchange item produced, the marketplace servers 18 obtains control over the secure exchange item package, where the secure exchange item package includes identity of the exchange item, identity of an authenticated owner of the exchange item, identity of the marketplace server, and the authenticated value (e.g., face value of the exchange item or remaining balance of the exchange item) of the exchange item and where only a device possessing control over the secure exchange item package may modify the secure exchange item package.

As an example of the obtaining of the control, the marketplace servers 18 receives from the seller's computing device 12, a request to sell the exchange item (e.g., receives the secure EI information 806). In response to valid processing of the request to sell (e.g., communicating pricing information 808), the seller's computing device 12 securely passes, to the marketplace servers 18, control over the secure exchange item package (e.g., communicates secure sale information 810). Having obtained control, the marketplace servers 18 lists a representation of the exchange item for sale by storing associated inventory information 809 in the database 20 to update the virtual marketplace of exchange items 22.

With the exchange item represented within the virtual marketplace of exchange items 22, the marketplace server 18 receives, from the buyer's computing device 16, a request to purchase the exchange item (e.g., the EI purchase request 812). Having received the request to purchase the exchange item, the marketplace servers 18, in response to valid processing of the request to purchase the exchange item (e.g., exchanging secure buyer wallet information 814), securely passes to the buyer computing device 16, control over the secure exchange item package (e.g., via the secure buyer wallet information 814). Having received the secure buyer wallet information 814, the mobile app 198 stores the secure buyer wallet information 814 as the secure EI record 822 in the flash memory 92.

For use of the exchange item (e.g., as initiated with the transaction request 816), the buyer computing device 16 securely passes, to the retailer computing device 802 (e.g., the merchant server), control over the secure exchange item package. The use may further include the retailer computing device 802 into verifying that the balance of the exchange item is sufficient for a purchase transaction by communicating secure balance verification 818 with the buyer's computing device 16.

With control over the secure exchange item package, the merchant server (e.g., the retailer computing device 802) executes use of the exchange item by updating the value of the exchange item to produce an updated value of the exchange item. For example, the retailer computing device 802 subtracts an amount of the purchase transaction (e.g., for goods provided by a retailer to a user of the buyer's computing device 16) from the value of the exchange item to produce the updated value of the exchange item.

Having generated the updated value of the exchange item, the retailer computing device 802 generates an updated secure exchange item package, where the updated secure exchange item package includes identity of the exchange item, identity of the merchant server, identity of the buyer computing device, and the updated value of the exchange item. Having generated the updated secure exchange item package, the merchant server (e.g., the retailer computing device 802) securely passes control over the updated secure exchange item package to the buyer's computing device 16 (e.g., by communicating the secure transaction completion 820).

Alternatively, or in addition to, for a second use of the exchange item, the buyer's computing device 16 securely passes, to a second merchant server, control over the updated secure exchange item package. The second merchant server executes the second use of the exchange item by updating the updated value of the exchange item to produce a second updated value of the exchange item, generating a second updated secure exchange item package, where the second updated secure exchange item package includes identity of the exchange item, identity of the second merchant server, identity of the buyer's computing device 16, and the second updated value of the exchange item, and securely passes, to the buyer's computing device 16, control over the second updated secure exchange item package.

FIG. 17B is a schematic block diagram of a transactions blockchain where the transactions blockchain includes a plurality of blocks. The transactions blockchain represents an exchange item (EI) transaction chain when the plurality of blocks include exchange item transaction sections. Each block includes a header section and a transaction section. Each other portion links one block to other block in a sequential fashion. The linking is discussed in greater detail with reference to FIG. 17C. The transaction section includes EI transaction information associated with an EI transaction between two or more entities of an exchange item marketplace. For example, the block 0 includes valuable establishment 0 transaction information with regards to a genesis of a particular exchange item to be available to entities of the exchange item marketplace, the block 1 includes seller to distributor payment information 1 transaction information with regards to the seller's computing device 12 purchasing the EI from the EI distributor 800, the block 2 includes marketplace servers 18 to seller representation/payment information 2 transaction information with regards to the seller's computing device 12 offering the EI for sale utilizing the MP servers 18, the block 3 includes buyer to marketplace payment information 3 transaction information with regards to the buyer's computing device 16 purchasing the EI via the MP servers 18 from the seller's computing device 12, and the block 4 includes buyer to retailer payment information 4 transaction information with regards to the buyer's computing device 16 utilizing the EI to complete a desired purchase transaction with the retailer computing device 802.

Figure 17C:
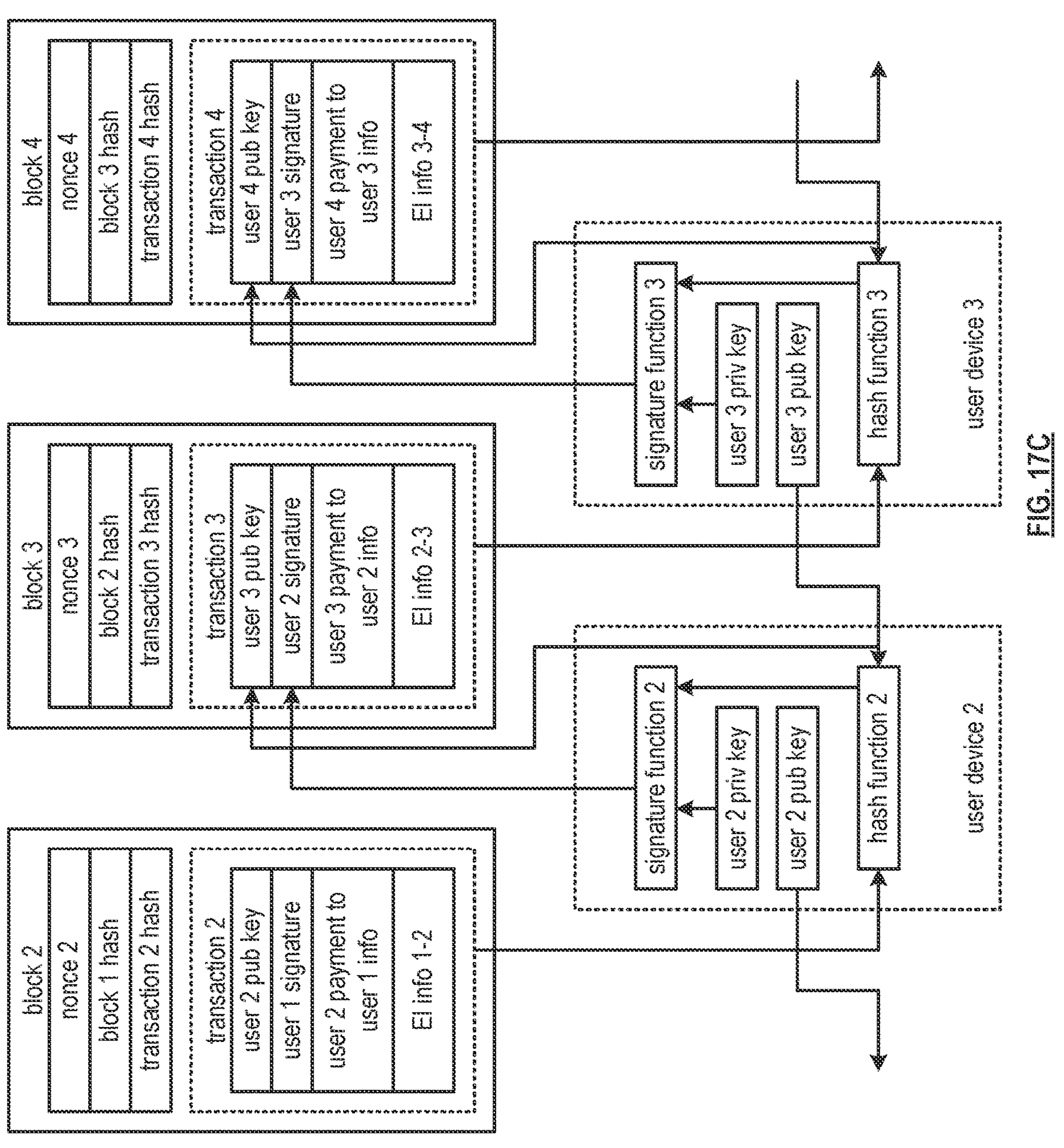
FIG. 17C is another schematic block diagram of a transactions blockchain in accordance with the present invention.

FIG. 17C is another schematic block diagram of a transactions blockchain. The transactions blockchain includes a plurality of blocks, where each block includes a secure exchange item package. Each secure exchange item package includes a header section and a transaction section. The header section includes one or more of a nonce, a hash of a preceding block of the secure exchange item package, where the preceding block was under control of a preceding device in a chain of control of the secure exchange item package, and a hash of a current block (e.g., a current transaction section) of the secure exchange item package, where the current block is under control of a current device in the chain of control of the secure exchange item package. The transaction section includes one or more of a public key of the current device, a signature of the preceding device, payment information regarding a change of control from the preceding device to the current device, and exchange item information that includes at least some of the identity of the exchange item, a brand of the exchange item, time restrictions of the exchange item, a digital image of the exchange item, the authenticated value, and use restrictions of the exchange item.

FIG. 17C further includes user devices 2-3 (e.g., the seller's computing device 12, the MP servers 18, the buyer's computing device 16, the retailer computing device 802) to facilitate illustration of generation of the secure exchange item package. Each user device includes a hash function, a signature function, and storage for a public/private key pair generated by the user device An example of operation of the generating of the secure exchange item package, when the user device 2 has control of the secure exchange item package and is passing control of the secure exchange item package to the user device 3 (e.g., the user device 3 is transacting an exchange with the user device 2), the user device 2 obtains the user 3 public key from the user device 3, performs a hash function 2 over the user 3 public key and the transaction 2 to produce a hashing resultant (e.g., preceding transaction to user device 2) and performs a signature function 2 over the hashing resultant utilizing a user 2 private key to produce a user 2 signature. Having produced the user 2 signature, the user device 2 generates the transaction 3 to include the user 3 public key, the user 2 signature, user 3 payment to the user 2 information, and EI information 2-3. The user 3 payment to the user 2 information includes payment instructions from user 3 to user 2. The EI information 2-3 includes an updated balance of the exchange item (e.g., after the transaction between the user device 3 and the user device 2), a serial number of the exchange item, an expiration date of the exchange item, a type of the exchange item, a brand identifier, an image, a personal identification number, and utilization rules for the exchange item.

Having produced the transaction 3 section of the block 3 (e.g., a secure exchange item package 3), a processing module (e.g., of the user device 2, of the user device 3, of a transaction mining server, of the marketplace server 18) generates the header section by performing a hashing function over the transaction section 3 to produce a transaction 3 hash, performing the hashing function over the preceding secure exchange item package (e.g., block 2) to produce a block 2 hash. The performing of the hashing function may include generating a nonce such that when performing the hashing function to include the nonce of the header section, a desired characteristic of the resulting hash is achieved (e.g., a desired number of preceding zeros is produced in the resulting hash).

Having produced the secure exchange item package 3, the user device 2 sends the secure exchange item package 3 to the user device 3. Having received the secure exchange item package 3, the user device 3 validates the received secure exchange item package 3. The validating includes one or more of verifying the user 2 signature over the preceding transaction section (e.g., transaction 2) and the actual user 3 public key utilizing the user 2 public key (e.g., a re-created signature function result compares favorably to user 2 signature) and verifying that an extracted user 3 public key of the transaction 3 compares favorably to the user 3 public key held by the user device 3. The user device 3 considers the received secure exchange item package 3 validated when the verifications are favorable (e.g., the available balance of the exchange item is trusted).

Figure 17D:
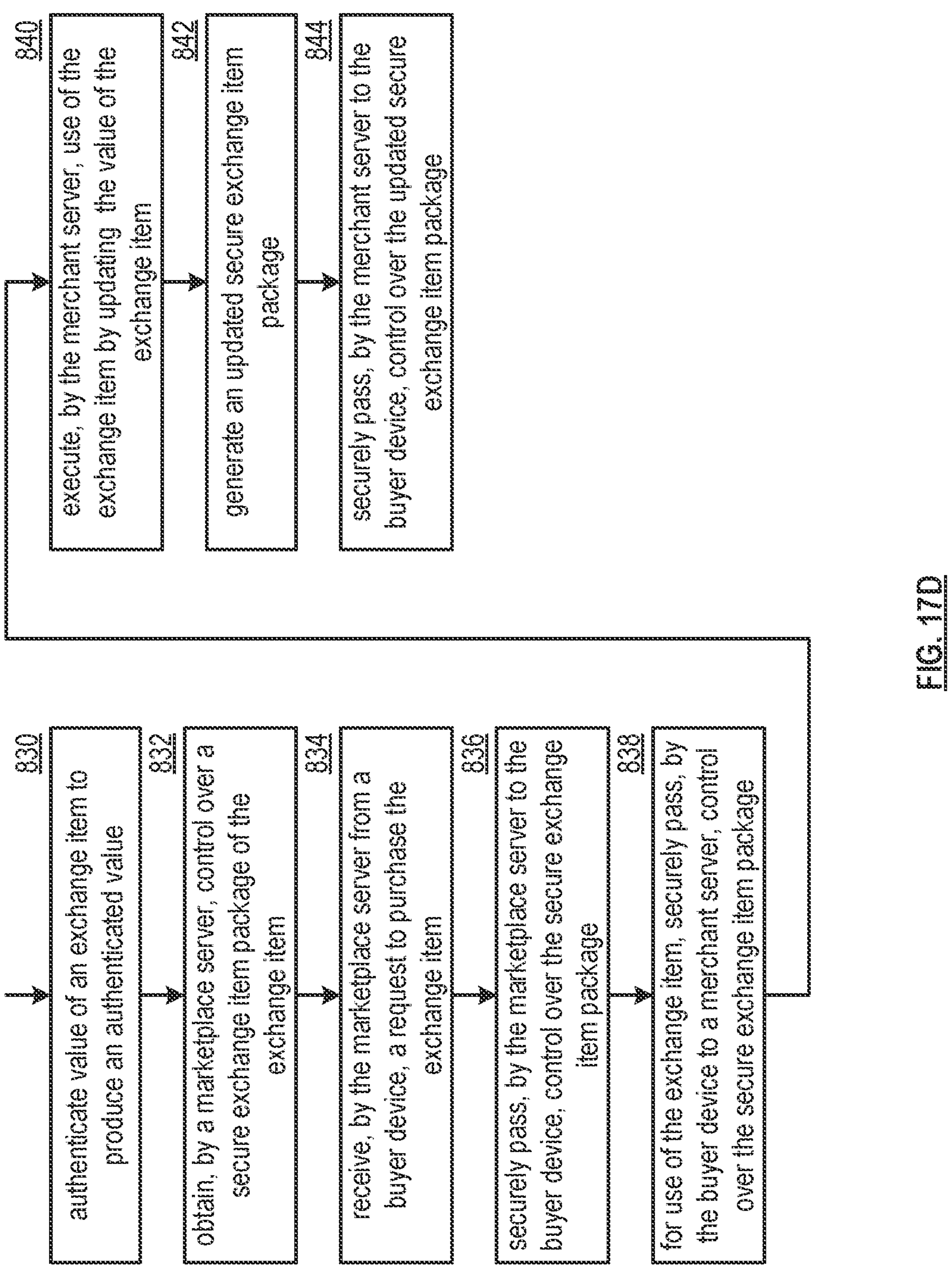
FIG. 17D is a logic diagram of an embodiment of a method for generating a transactions blockchain in accordance with the present invention.

FIG. 17D is a logic diagram of an embodiment of a method for generating a transactions blockchain. In particular, a method is presented for use in conjunction with one or more functions and features described in conjunction with FIGS. 1-16, 17A-C, and also FIG. 17D. The method includes step 830 where a processing module of a computing device of one or more computing devices of an exchange item marketplace network authenticates value of an exchange item to produce an authenticated value of the exchange item, where the exchange item includes one of a closed loop financial instrument and a digital good.

As an example of the authenticating the value of the exchange item, a seller device authenticates the value of the exchange item via a communication with a brand server, generates a secure exchange item package, and securely passes, to the marketplace server, control over the secure exchange item package such that the marketplace server obtains the control over the secure exchange item package. The securely passing includes updating a transaction section of the secure exchange item package by including a public key of a recipient device of the secure exchange item package and signing the secure exchange item package by a transferring device of the secure exchange item package. The secure exchange item package includes a header section and a transaction section. As another example of the authenticating the value of the exchange item, the marketplace server authenticates the value of the exchange item via a communication with the brand server, generates the secure exchange item package, and obtains control over the secure exchange item package as a result of being an originator of the secure exchange item package.

The method continues at step 832 where the marketplace server obtains control over the secure exchange item package, where the secure exchange item package includes identity of the exchange item, identity of an authenticated owner of the exchange item, identity of the marketplace server, and the authenticated value (e.g., face value of the exchange item and/or a remaining balance of the exchange item) of the exchange item and where only a device possessing control over the secure exchange item package may modify the secure exchange item package. As an example of the obtaining of the control, the marketplace server receives, from the seller device, a request to sell the exchange item and in response to valid processing of the request to sell, the seller device securely passes, to the marketplace server, control over the secure exchange item package.

The method continues at step 834 where the marketplace server receives, from a buyer device, a request to purchase the exchange item. In response to valid processing of the request to purchase the exchange item, the method continues at step 836 where the marketplace server securely passes, to the buyer device, control over the secure exchange item package. For use of the exchange item, the method continues at step 838 where the buyer device securely passes, to a merchant server, control over the secure exchange item package.

The method continues at step 840 where the margin server executes use of the exchange item by updating the value of the exchange item to produce an updated value of the exchange item (e.g., deducting a purchase price of a purchase transaction from the value of the exchange item to produce the updated value the exchange item). The method continues at step 842 where the merchant server generates an updated secure exchange item package, where the updated secure exchange item package includes identity of the exchange item, identity of the merchant server, identity of the buyer device, and the updated value of the exchange item. The method continues at step 844 where the merchant server securely passes, to the buyer device, control over the updated secure exchange item package.

Alternatively, or in addition to, for a second use of the exchange item, the buyer device securely passes, to a second merchant server, control over the updated secure exchange item package. The second merchant server executes the second use of the exchange item by updating the updated value of the exchange item to produce a second updated value of the exchange item, generates a second updated secure exchange item package, where the second updated secure exchange item package includes identity of the exchange item, identity of the second merchant server, identity of the buyer device, and the second updated value of the exchange item, and securely passing, to the buyer device, control over the second updated secure exchange item package.

The method described above in conjunction with one or more of the processing module, the seller device, the marketplace server, the buyer device, the merchant server, the second merchant server, can alternatively be performed by other modules of the exchange item marketplace network or by other devices. In addition, at least one memory section (e.g., a non-transitory computer readable storage medium, a computer readable memory) that stores operational instructions can, when executed by one or more processing modules of one or more computing devices of the exchange item marketplace network, cause the one or more computing devices to perform any or all of the method steps described above.

Figure 17E:
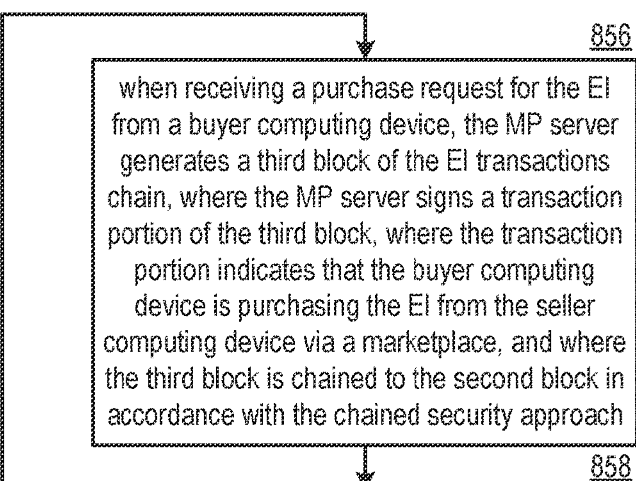
FIG. 17E is a logic diagram of another embodiment of a method for generating a transactions blockchain in accordance with the present invention.

FIG. 17E is a logic diagram of another embodiment of a method for generating a transactions blockchain. In particular, a method is presented for use in conjunction with one or more functions and features described in conjunction with FIGS. 1-16, 17A-D, and also FIG. 17E. The method includes step 850 where a processing module of a computing device (e.g., of an exchange item origination entity) of one or more computing devices of an exchange item marketplace network generates an origination block of an EI transaction chain, where the EI origination entity signs a transaction portion of the origination block, and where the transaction portion indicates EI information of an associated EI. For example, the origination entity generates value establishment information in accordance with a trust approach (e.g., self-signing over the value establishment information to produce the transaction portion, signing the value establishment information, that includes a public key of a private/public key pair of the EI origination entity, utilizing the private key to produce the transaction portion).

When receiving an EI purchase request from a seller computing device, the method continues at step 852 where a processing module of an EI distribution entity generates a first block of the EI transactions chain, where the EI distribution entity signs the transaction portion of the first block, where the transaction portion indicates that the seller computing device is purchasing the EI from the distribution entity, and where the first block is chained to the origination block in accordance with a chained security approach (e.g., hash of transaction portion, hash of a previous block). The EI distribution entity may be implemented utilizing the EI origination entity. For example, the EI distribution entity signs the transaction portion utilizing a private key of a private/public key pair of the seller computing device to produce the transaction portion of the first block.

When transacting a representation of the EI with a marketplace server, the method continues at step 854 where the seller computing device generates a second block of the EI transactions chain, where the seller computing device signs a transaction portion of the second block, where the transaction portion indicates that the MP server is representing the EI for the seller computing device, and where the second block is chained to the first block in accordance with the chained security approach. For example, the MP server receives secured EI information from the seller computing device (e.g., an offer for sale), provides pricing information to the seller computing device, receives a confirmed price from the seller computing device, issues secure sale information to the seller computing device, and updates inventory information within a virtual exchange item marketplace, where the secure sale information includes the second block of the EI transactions chain and a public key of the MP server.

When receiving a purchase request for the EI from a buyer computing device, the method continues at step 856 where the MP server generates a third block of the EI transactions chain, where the MP server signs a transaction portion of the third block, where the transaction portion indicates that the buyer computing device is purchasing the EI from the seller computing device via the marketplace, and where the third block is chained to the second block in accordance with the chained security approach. For example, the buyer computing device issues an EI purchase request to the MP server based on received inventory information from the MP server, the MP server generates secure buyer wallet information, the buyer computing device stores a security EI record, where the secure buyer wallet information includes the third block of the EI transactions chain and the secure EI record includes the EI transactions chain. For instance, the MP server signs a public key of the buyer computing device and the transaction portion utilizing a private key of a private/public key pair of the MP server to produce the transaction portion of the third block.

When utilizing the EI for payment in a purchasing transaction with a retailer computing device, the method continues at step 858 where the buyer computing device generates a fourth block of the EI transactions chain, where the buyer computing device signs a transaction portion of the fourth block, where the transaction portion indicates that the buyer computing device is utilizing the EI for payment in the purchasing transaction, and where the fourth block is chained to the third block in accordance with the chained security approach. For example, the buyer computing device issues a transaction request to the retailer computing device, the retailer computing device exchanges secure balance information with the buyer computing device (e.g., verifies the trust of the EI transactions chain, where the EI transactions chain indicates an available balance of the EI verifying that an available balance is sufficient), the retailer computing device issues secure transaction completion information to the buyer computing device, where the secure transaction completion information includes the fourth block of the EI transactions chain. The buyer computing device signs the public key of the retailer computing device and the transaction portion to produce a transaction portion of the fourth block. Alternatively, or in addition to, each entity of the plurality of transactions may verify the EI transactions chain by verifying a stored public key matches to recovered public keys when validating signatures over associated blocks.

The method described above in conjunction with the exchange item origination entity, the seller computing device, the buyer computing device, and the retailer computing device can alternatively be performed by other modules of the exchange item marketplace network or by other devices. In addition, at least one memory section (e.g., a non-transitory computer readable storage medium, a computer readable memory) that stores operational instructions can, when executed by one or more processing modules of one or more computing devices of the exchange item marketplace network, cause the one or more computing devices to perform any or all of the method steps described above.

Figure 18A:
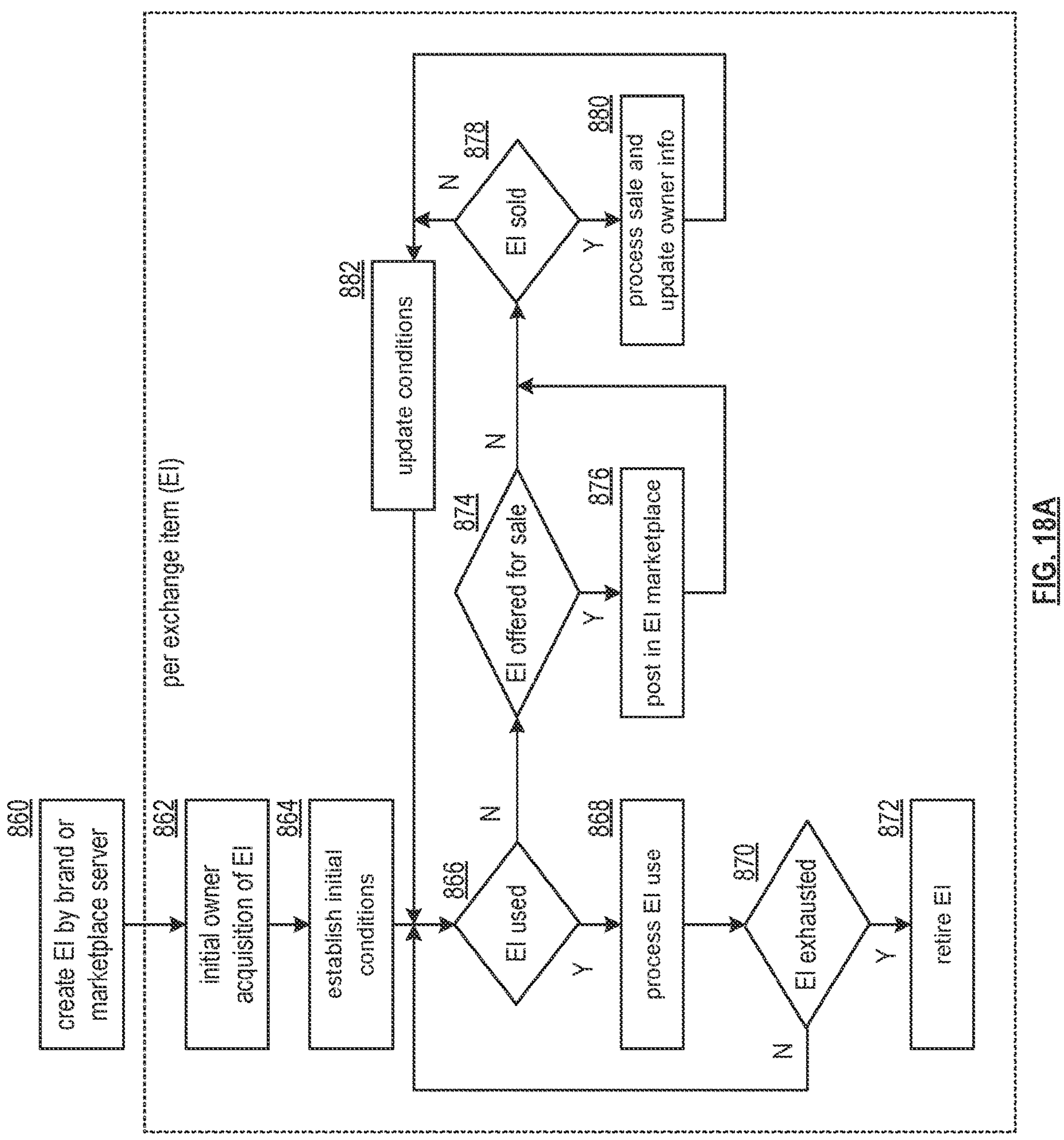
FIG. 18A is a logic diagram of an embodiment of a method for utilizing an exchange item in an exchange item marketplace network in accordance with the present invention.

FIG. 18A is a logic diagram of an embodiment of a method for utilizing an exchange item in an exchange item marketplace network. The method includes step 860 where a processing module (e.g., of a brand server, of a marketplace server) creates one or more exchange items to be offered for sale through the exchange item marketplace network. The method continues at step 862 where an initial owner acquires at least one of the EIs. The method continues at step 864 where a processing module of the exchange item marketplace network establishes initial conditions. Conditions includes types of conditions and values for the types of conditions. For example, a weather condition is associated with a value of a current temperature. As another example, a sports team score is associated with a particular game outcome. Other examples of condition types include stock prices, world events, purchase history of users associated with the exchange item marketplace, pricing history associated with exchange items, a physical location, a customer name, a merchant name, a brand-name, a date, a time, etc.

The establishing of the conditions includes utilizing the predetermination, interpreting the lookup, interpreting a query response, receiving the conditions, identifying the conditions based on or more of identification of the initial owner, identification of the brand of the EI, an EI type indicator, and EI serial number, and an EI utilization rule, etc. For example, the marketplace server performs a lookup based on a serial number of the exchange item to establish the initial conditions.

The method continues at step 866 where the processing module determines whether the EI has been used (e.g., redeemed, utilized for making a purchase, bartered, etc.). The determining includes interpreting a status associated with the EI of an exchange item database, interpreting a received a use message, receiving purchase transaction information, etc. the method branches to step 874 when the processing module determines that the EI has not been used. The method continues to step 868 when the processing module determines that the EI has been used.

When the EI has been used, the method continues at step 868 where the processing module processes the EI use. The processing includes one or more of facilitating completion of a purchase transaction, facilitating payment distribution, and updating the exchange item database to indicate the use. The method continues at step 870 where the processing module determines whether the EI is exhausted (e.g., no value left). The determining includes comparing a balance value associated with the EI to a minimum threshold level (e.g., zero dollars). For example, the processing module indicates that the EI has been exhausted when the balance value is zero. The method looks back to step 866 when the EI is not exhausted. The method continues to step 872 when the EI is exhausted where the EI is retired. Alternatively, and in accordance with a rule associated with exchange item, the processing module maintains the zero balance exchange item without retiring the exchange item (e.g., to keep open an opportunity to refresh the exchange item). The retiring includes the processing module updating the exchange item database to indicate that the EI has been exhausted and retired from use.

When the EI has not been utilized, the method continues at step 874 with a processing module determines whether the EI is to be offered for sale. The determining includes receiving a request to offer the EI for sale, interpreting a rule with regards to sale, interpreting a status associated with the EI, and receiving a purchase request for the EI. The method branches to step 878 when the EI is not to be offered for sale. The method continues to step 876 when the EI is to be offered for sale where the processing module posts the EI in the marketplace. For example, the processing module updates the exchange item database to indicate that the EI is for sale.

The mother continues at step 878 where the processing module determines whether the EI has been sold. The determining includes one or more of receiving purchase transaction information, interpreting a request for purchase of the EI, and interpreting a status associated with the EI in the exchange item database. The method branches to step 882 when the EI has not been sold. The method continues to step 880 when the EI has been sold where the processing module processes the sale and updates information. For example, the processing module updates the exchange item database to indicate that the EI has been sold, the purchase amount, and identification of the (new) owner.

The method continues at step 882 where the processing module updates the conditions. For example, the processing module obtains updated date and time information, sports scores, stock market information, world events information, and weather information. With the conditions updated, utilization and sale of other exchange items may be affected as different use rules associated with the different exchange items may unable shifts in parameters associated with exchange items. For example, an additional discount for a particular branded exchange item may be enabled when a temperature value of a temperature condition is less than a low threshold value. As another example, a balance of another exchange item may be increased by 10% for a two-hour time frame when a local baseball team wins a game and the exchange item is associated with a brand of the local baseball team. Having updated the conditions, the method loops back to step 866

Figure 18B:
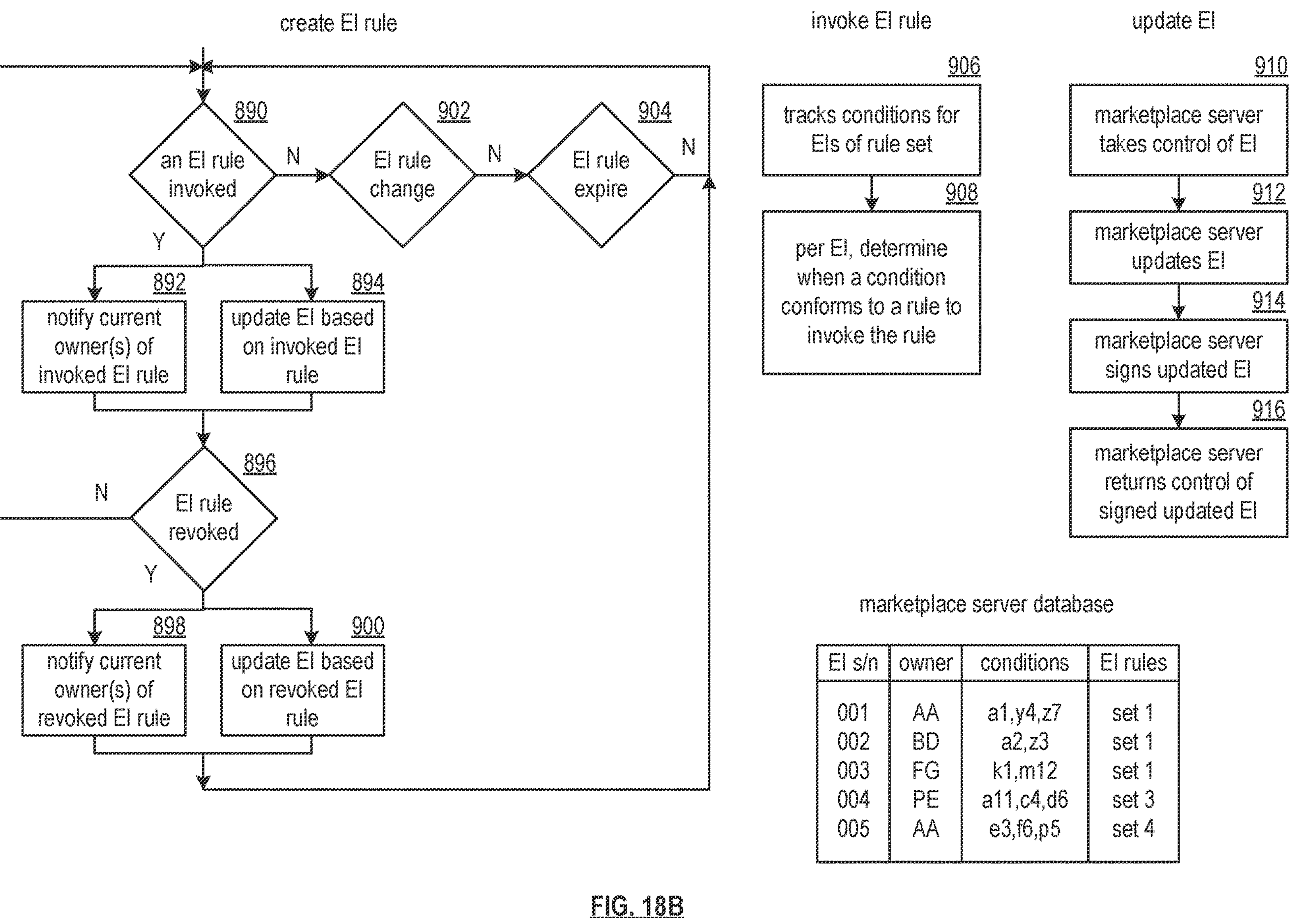
FIG. 18B is a logic diagram of an embodiment of a method for utilizing rules in an exchange item marketplace network in accordance with the present invention.

FIG. 18B is a logic diagram family of an embodiment of a method for utilizing rules in an exchange item (EI) marketplace network. A rule is associated with utilization of an exchange item. The rule may be imposed by one or more of an issuing brand, a merchant, an alternative brand, and by a marketplace server of the exchange item marketplace. A rule specifies allowable values or ranges of values of parameters associated with an exchange item is a function of one or more conditions and of one or more use options. Rules be imposed independently (e.g., alone without any interaction with other rules), in series (e.g., first rule invoked followed by a second rule invoked), in parallel (e.g., operating two or more rules together, and may interact where a first rule status may be utilized by a second rule), or in a nested fashion (e.g., where a rule is triggered when a value associated with a preceding rule compares favorably to a trigger threshold level). Each EI rule is associated with a rule lifecycle, which includes creation of the EI rule, and may include invoking of the EI rule and updating of the EI rule and/or of an associated EI of the EI rule (e.g., updating a marketplace server database).

A method associated with the creation of the EI rule includes step 890 where a processing module (e.g., by a brand server, by a marketplace server) determines whether an exchange item (EI) rule has been invoked. The determining may be based on one or more of interpreting values of conditions in accordance with the EI rule, receiving a message indicating that the rule has been invoked, and detecting an activity associated with the invoking of the rule. The method branches to steps 892 and 894 when the EI rule has been invoked. The method branches to step 902 when the EI rule has not been invoked where the processing module determines whether the EI rule has changed. The determining may be based on one or more of interpreting a change flag, receiving a change message, observing activity associated with a change of the rule, and comparing a previous EI rule to the EI rule. The method continues to step 904 when the EI rule has not been changed where the processing module determines whether the EI rule has expired (e.g., detecting that an active timeframe associated with the EI rule has elapsed). The method loops back to step 890 when the EI rule has not expired.

When the EI rule has been invoked, the method continues at step 892 where the processing module notifies a current owner of the invoked EI rule (e.g., issuing a message to a brand server that established (i.e., owner) the rule) and the method continues at step 894 where the processing module updates the EI based on the invoked EI rule. The updating includes modifying a record of the EI in the marketplace server database immediately or upon receiving a permissions grant from the owner, modifying the record of the EI in the marketplace server database.

The method continues at step 896 where the processing module determines whether the EI rule has been revoked. The determining may be based on one or more of interpreting updated conditions associated with the EI rule and indicating that the EI rule has been revoked and receiving a message indicating that the EI rule has been revoked (e.g., from a brand server). The method loops back to step 890 when the EI rule has not been revoked. The method continues to steps 898 and 900 when the EI rule has been revoked. The method continues at step 898 where the processing module notifies the current owner of the revoked EI rule (e.g., issuing an EI revoked message) and updates the associated EI based on the revoked EI rule (e.g., updates the marketplace server database).

A method associated with the invoking of the EI rule includes step 906 where the processing module tracks conditions for exchange items of a rule set. For example, the processing module receives conditions data associated with a plurality of conditions types and maps the conditions data a plurality of exchange items associated with rules that rely on the conditions to activate a course of action. The method continues at step 908 where the processing module, per exchange item, determines when a condition conforms to a rule to invoke the rule. For example, the processing module indicates to invoke the rule when a condition of the rule meets a threshold level.

A method associated with the updating of the EI rule includes step 910 where the marketplace server takes control of the exchange item. The taking of control includes invoking a rule that includes granting updating authority for the marketplace server. With the authority to update the exchange item in the marketplace server database, the marketplace server may modify a rule, add a rule, delete a rule, add conditions associated with a rule, delete conditions associated with a rule, and modify conditions associated with a rule.

The method continues at step 912 where the marketplace server updates the exchange item. For example, the marketplace server recovers a portion (e.g., a single transaction blockchain including a ledger of all exchange items) of the marketplace server database and modifies the recovered portion (e.g., modifies the blockchain) to produce an updated portion of the marketplace server database. The method continues at step 914 where the marketplace server signs the updated exchange item. For example, the marketplace server utilizes a private key of a public/private key pair of the marketplace server to electronically sign the updated exchange item to produce a signature of the marketplace server. The method continues at step 916 where the marketplace server returns control of the signed updated exchange item. For example, the marketplace server stores the signed updated exchange item into the marketplace or database and pushes the signed updated exchange item to one or more entities of the exchange item marketplace network. For instance, the marketplace server sends the signed updated exchange item to a computing device associated with purchase of the exchange item. As another instance, the marketplace server sends the signed updated exchange item to a brand server associated with the exchange item. Such a signed updated exchange item is illustrated where exchange item serial number 5, that is associated with owner AA, includes conditions e3, f6, p5 that is associated with the exchange item 5, and that now follows a rule set 4.

Figure 18C:
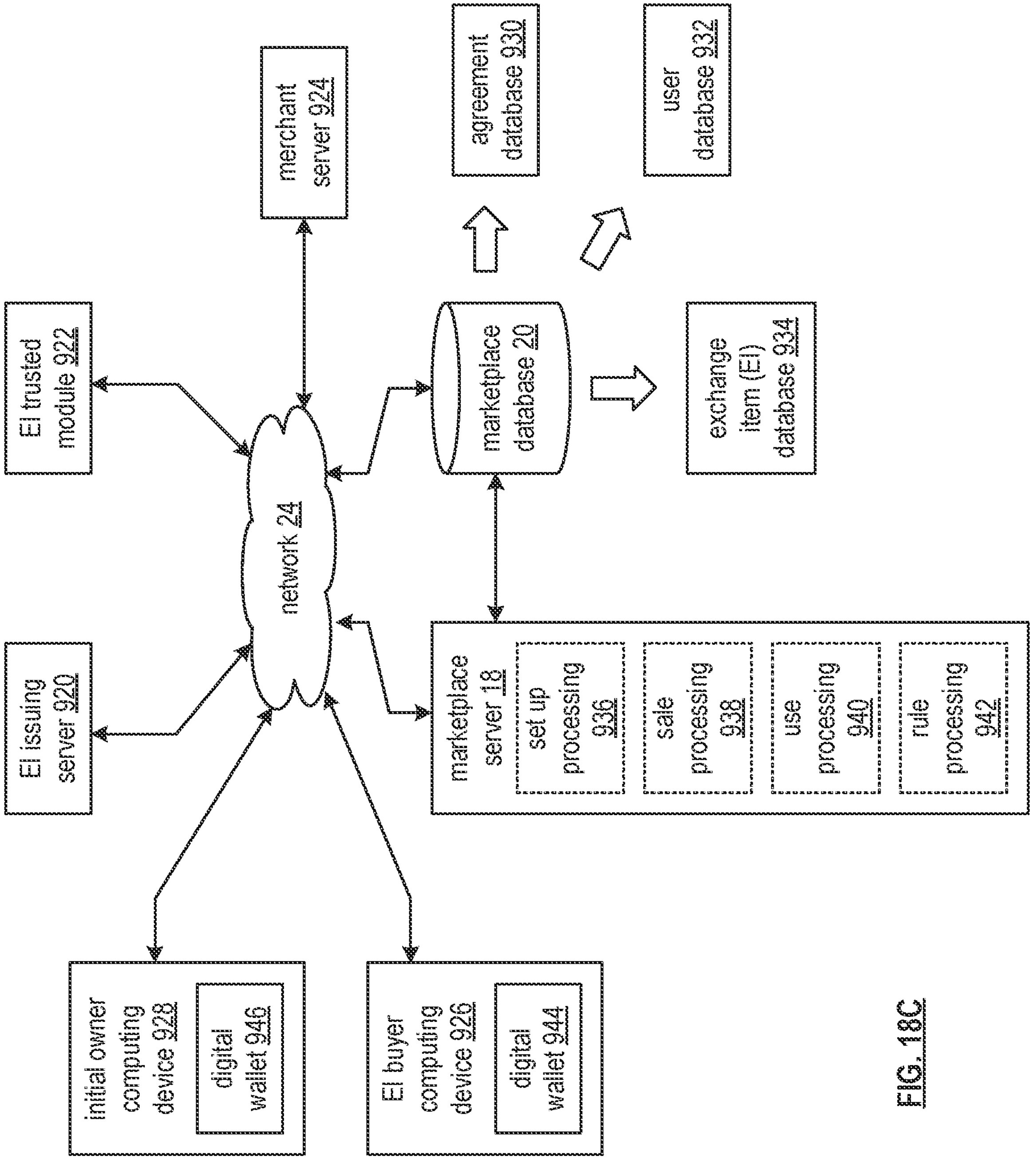
FIG. 18C is a schematic block diagram of another embodiment of an exchange item marketplace network in accordance with the present invention.

FIG. 18C is a schematic block diagram of another embodiment of an exchange item marketplace network that includes the network 24 of FIG. 2, an exchange item (EI) issuing server 920, and EI trusted module 922, a merchant server 924, the marketplace database 20 of FIG. 2, the marketplace server 18 and FIG. 2, an EI buyer computing device 926, and an initial owner computing device 928. The EI issuing server 920 may be implemented utilizing one or more of the brand server(s) 26 of FIG. 2, the processor server 28 of FIG. 2, and the distributor server 30 FIG. 2. The EI trusted module 922 may be implemented within one or more of the EI issuing server 920, the merchant server 924, and the marketplace server 18. The merchant server 924 may be implemented utilizing one or more of the retail server 34 of FIG. 2 and the point-of-sale equipment 32 of FIG. 2. The EI buyer computing device 926 may be implemented utilizing the buyer's computing device 16 of FIG. 6A. The initial owner computing device 928 may be implemented utilizing the seller's computing device 12 of FIG. 6A.

The marketplace database 20 includes a variety of databases, such as an agreement database 930, a user database 932, and an exchange item database 934. Each of the databases will be discussed in greater detail with reference to following figures. The marketplace server 18 includes a variety of processing capability, which may be implemented as a plurality of processing modules. In an embodiment, the marketplace server 18 includes a set of processing 936, a sale processing 938, a use processing 940, and a rule processing 942. Each of the processing modules will be discussed in greater detail with reference to following figures.

The EI buyer computing device 926 includes a digital wallet 944 and the initial owner computing device 928 includes another digital wallet 946. Each of the digital wallets 944-946 is utilized to store a variety of information associated with one or more exchange items, such as balance information, pricing information, history of sale, brand affiliation, rules, conditions, use options, owner information, and security information to ensure trust of the content of the digital wallet.

Figure 18D:
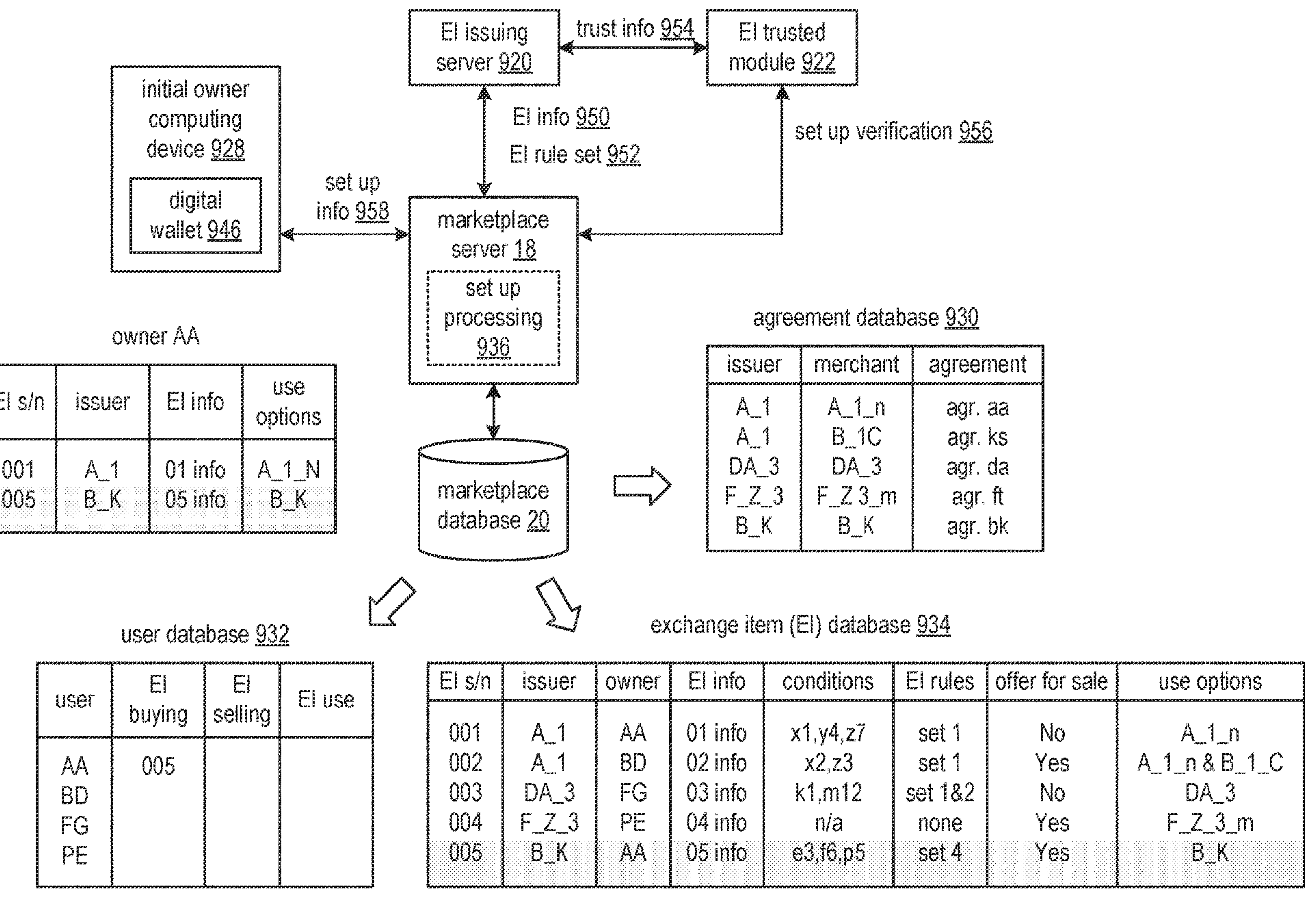
FIG. 18D is a schematic block diagram of another embodiment of an exchange item marketplace network in accordance with the present invention.

FIG. 18D is a schematic block diagram of another embodiment of an exchange item marketplace network that includes the initial owner computing device 928 of FIG. 18C, the EI issuing server 920 of FIG. 18C, the EI trusted module 922 of FIG. 18C, the marketplace server 18 of FIG. 18C, and the marketplace database 20 of FIG. 18C. Entities of the exchange item marketplace network may be operably coupled through the network 24 of FIG. 18C or may be directly connected to each other. The exchange item marketplace functions to establish agreements and set up exchange items. Such agreements include terms for one or more of creation of exchange items (EI), creation of EI rules for the exchange items, identification of condition types and condition values to be utilized in conjunction with the EI rules, and facilitating payment for sale and/or utilization of an exchange item. The agreements may involve two or more parties, such as a brand, a merchant, and an alternative brand. For example, an agreement between a brand and a merchant associated with the brand indicates a discount range associated with a particular exchange item. As another example, an agreement between a brand and the alternative brand indicates which products may be purchased using an exchange item not associated with the product. Agreement information includes one or more agreement points of each agreement (e.g., value, discount, balance, permissions, etc.).

In an example of operation of the establishing of the agreements and setting up of the exchange items, the setup (i.e., or set up) processing 936 of the marketplace server 18 establishes the agreement database 930. The establishing includes receiving agreement information and updating the agreement database 930 within the marketplace database 20. For example, the marketplace server 18 issues a query to one or more of the EI issuing server 920, another issuing server, a merchant server, another merchant server; and receives a query response. As another example, the marketplace server 18 receives an unsolicited message including the agreement information. Having received the agreement information, the marketplace server updates the agreement database 930. The agreement database 930 correlates issuer information, merchant information, and agreement information. For example, the agreement database 930 associates issuer A_1 with a merchant A_1_n as bound by an agreement aa (e.g., including one or more agreement points).

Having established the agreements, the marketplace server 18 facilitates setting up of the exchange items to include establishment of exchange item (EI) rules. An initiating entity establishes a first rule for a new exchange item. The initiating entity includes at least one of the EI issuing server 920 and the set up processing 936 of the marketplace server 18. The first rule is associated with establishment of a security approach to ensure that and subsequent rules associated with the EI can be trusted by all marketplace participants as time proceeds. For example, the EI issuing server 920 establishes trust information 954 to include a first contract block of a contract blockchain, where private/public key pairs are utilized to ensure trust as previously discussed with reference to FIGS. 17A-E. The first contract block establishes the EI issuing server 920 as the owner (e.g., a root of the contract blockchain).

The initiating entity further establishes the new exchange item. For example, the EI issuing server 920 establishes EI information 950 (e.g., value, type, issuance date, expiration date, use parameters, etc.). The initiating entity further establishes content of the first rule, and further content of other rules as an EI rule set 952. For example, the EI issuing server 920 utilizes a $4^{th}$ set of EI rules and an EI of serial number 5 for issuer B_K (e.g., identity of the EI issuing server 920) to include EI 05 info. The EI005 is to be for sale and is bound by a fourth set of EI rules which are associated with conditions e3, f6, p5 in accordance with use options of the issuer B_K. Having obtained the EI information 950 and the EI rule set 952, the set up processing 936 verifies the received EI information and set by exchanging set up verification 956 with the EI trusted module 922. For example, the EI trusted module 922 verifies the contract blockchain and sends an indication of a status of the verification to the marketplace server 18.

When the EI information 950 in the EI rule set 952 have been verified, set of processing 936 updates the exchange item database 934 of the marketplace database 20 with the EI information 950 in the EI rule set 952. For instance, the setup processing 936 establishes the role of the exchange item database 934 associated with the EI serial number 005. The set of processing 936 may further update the user database 932 to include a list of known users of the marketplace, a history of EI buying, selling, and using. For example, the set of processing 936 updates the user database 932 when the initial owner computing device 928 (e.g., owner AA) purchases the new EI by exchanging set up information 958 with the marketplace server 18. The initial owner computing device 928 updates a digital wallet 946 of the initial owner computing device 928 with an owner table. The owner table includes one or more of a list of EI serial numbers, and for each EI, an identifier of an issuer, associated EI information, use options, EI rules associated with the EI, and conditions associated with the EI. Alternatively, or in addition to, the marketplace server maintains a copy of the owner table in the marketplace database 20.

Figure 18E:
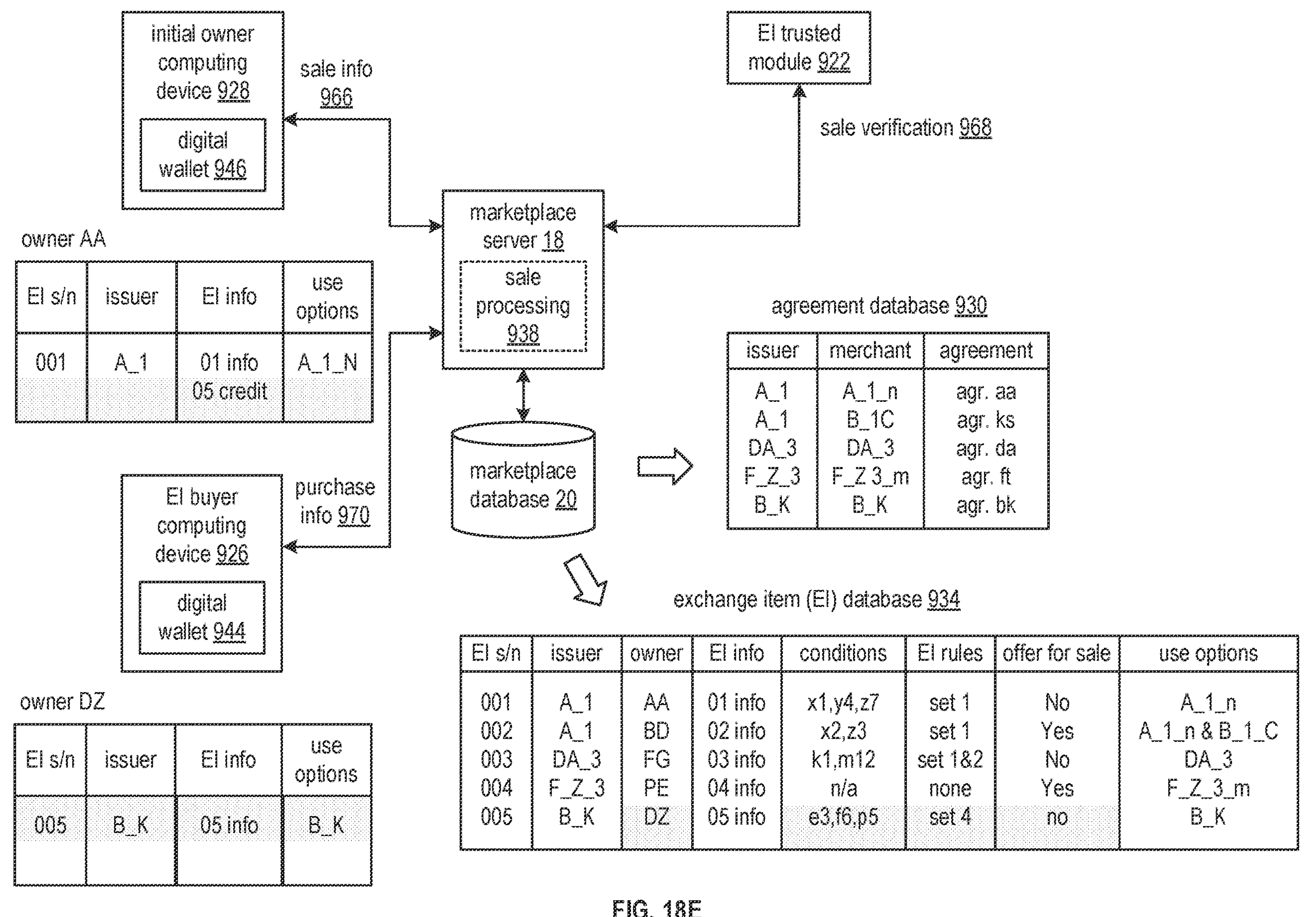
FIG. 18E is a schematic block diagram of another embodiment of an exchange item marketplace network in accordance with the present invention.

FIG. 18E is a schematic block diagram of another embodiment of an exchange item marketplace network that includes the initial owner computing device 928 of FIG. 18C, the EI buyer computing device 926 of FIG. 18C, the EI trusted module 922 of FIG. 18C, the marketplace server 18 of FIG. 18C, and the marketplace database 20 of FIG. 18C. The exchange item marketplace functions to process a sale of an exchange item (EI) from the initial owner computing device 928 to the EI buyer computing device 926.

In an example of operation of the processing of the sale of the EI serial number 005 by the initial owner computing device 928 (e.g., owner AA) the EI buyer computing device 926 (e.g., owner DZ), the sale processing 938 of the marketplace server 18 exchanges sale information 966 with the initial owner computing device 928, where the sale information 966 includes one or more of the EI serial number 005, a sale price, use options, a commission amount (e.g., to the marketplace), and credit information (e.g., a 05 credit of generic value usable in the marketplace to purchase another EI or to be converted into another form of payment). The initial owner computing device 928 updates the digital wallet 946 to indicate that the EI serial number 005 has been sold and that the 05 credit is available.

The sale processing 938 further exchanges sale verification 968 with the EI trusted module 922. For example, the EI trusted module 922 verifies the contract blockchain and a transaction blockchain associated with the EI to ensure that the sale is within sale allowance parameters associated with the EI as imposed by one or more of an agreement, and EI rule, conditions, and use options. When verified, the EI trusted module 922 issues the sale verification 968 to the sale processing 938 indicating that the sale is verified.

The sale processing 938 further exchanges purchase information 970 with the EI buyer computing device 926, such that the EI buyer computing device 926 updates the digital wallet 944 indicating that owner DZ has the EI serial number 005. Having processed the sale of the EI 005, the sale processing 938 updates the marketplace database 20 indicating that the EI serial 005 is now associated with owner DZ and is not currently for sale.

Figure 18F:
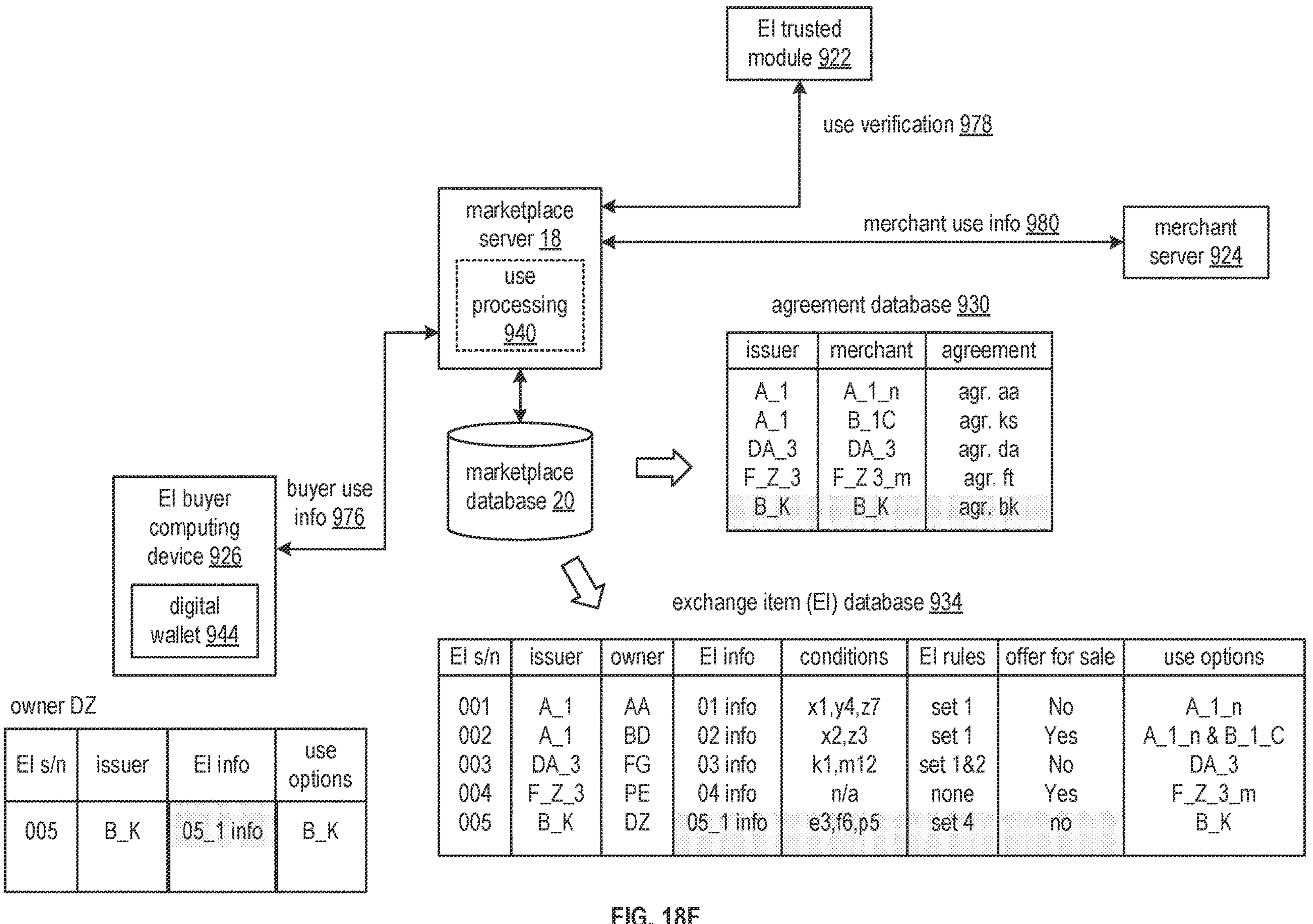
FIG. 18F is a schematic block diagram of another embodiment of an exchange item marketplace network in accordance with the present invention.

FIG. 18F is a schematic block diagram of another embodiment of an exchange item marketplace network that includes the EI buyer computing device 926 of FIG. 18C, the EI trusted module 922 of FIG. 18C, the merchant server 924 FIG. 18C, the marketplace server 18 of FIG. 18C, and the marketplace database 20 of FIG. 18C. The exchange item marketplace functions to process use of an exchange item (EI) by the EI buyer computing device 926 with the merchant server 924.

In an example of operation of the use of the EI, the EI buyer computing device 926 obtains EI info from the digital wallet 944 to issue buyer use information 976 to the marketplace server 18 when desiring to utilize the exchange item (e.g., EI serial number 005) with a merchant associated with the merchant server 924 for purchase of goods and/or services. When receiving the buyer use information 976, the use processing 940 of the marketplace server 18 verifies the use by exchanging use verification 978 with the EI trusted module 922. The use verification 978 includes one or more of the buyer use information 976 and an associated row of the exchange item database 934 associated with the exchange item (e.g., the row associated with the exchange item serial number 005). For example, the EI trusted module 922 verifies that the use of the EI compares favorably with the associated rules, conditions, and use options.

When receiving favorable use verification 978, the use processing 940 exchanges merchant use information 980 with the merchant server 924 to complete the use of exchange item. Alternatively, the marketplace server 18 receives the merchant use information 980 from the merchant server 924 via the EI buyer computing device 926 as part of the buyer use information 976 (e.g., a secure blockchain element is generated by the merchant server 924 and communicated directly to the EI buyer computing device 924).

The merchant use information 980 includes one or more of the buyer use information 976, the use verification 978, and any additional information to complete the use of the EI. Upon completion of the use of the EI, the use processing 940 updates the exchange item database 934 indicating that the EI has been utilized (e.g., indicating an amount of an outstanding balance utilized and a remaining available balance etc.). Alternatively, or in addition to, the use processing 940 performs a merchant verification process in accordance with a rule associated with the exchange item. For example, the use processing 940 extracts security information from the merchant use information 980, exchanges use information 978 with the EI trusted module 922, and interprets a use verification 978 response from the EI trusted module 922 to determine whether the merchant server 924 is verified (e.g., non-fraudulent). The EI trusted module 922 may verify the merchant server 924 by a variety of approaches including accessing a database of fraudulent merchants, invoking a rule of an associated exchange item to test a plurality parameters associated with the merchant use information 980, and requesting that the merchant server 924 electronically sign a message to verify that the merchant server 924 holds a correct private key associated with a previously verified merchant server 924.

FIG. 18G is a schematic block diagram of another embodiment of an exchange item marketplace network that includes the EI buyer computing device 926 of FIG. 18C, the EI issuing server 920, the EI trusted module 922 of FIG. 18C, the marketplace server 18 of FIG. 18C, and the marketplace database 20 of FIG. 18C. The exchange item marketplace functions to process rules associated with an exchange item (EI).

In an example of operation of the processing of the rules, the rule processing 942 of the marketplace server 18 records conditions for a plurality exchange items. A condition of the conditions for the plurality of exchange items further includes one of a range of time, a range of dates, a geographic location, a building address, a list of items, a user tendency profile, and a user loyalty profile. For example, the marketplace server 18 obtains the condition from a corresponding condition source.

For an exchange item of the plurality of exchange items, where the exchange item has a quantifiable value (e.g., valid tender, offered something formally in writing, offered a sum for a settlement, same as money, offer made to settle something), a serial number, and a current owner, the rule processing 942 determines whether a corresponding condition of the exchange item is compliant with one or more rules of an applicable set of rules (e.g., a contract regarding the exchange item from the issuer, where a set of rules is utilized for each EI, or for a group of EIs, for each owner, by brand, by retailer, etc.). The determining includes utilizing a sliding scale of compliance (e.g., conditional chaining) based on one or more of a user profile, exchange item information, an exchange item issuer, limited exchange item use, and timing of use. For example, the rule processing 942 obtains information with regards to conditions and EI rules from the exchange item database 934 and interprets conditions data in accordance with the EI rules to determine the compliance. For example, the rule processing 942 indicates that a weather rule is compliant when a temperature condition indicates a temperature value that is greater than a temperature threshold value associated with the weather rule.

The rule processing 942 may verify the compliance with the EI rule by obtaining issuer rule information 986 from the EI issuing server 920 associated with the EI and by further verifying compliance by exchanging rule verification 990 with the EI trusted module 922. The verifying of compliance further includes verifying a security scheme (e.g., contract blockchain or the EI rules) and by checking that the EI rule compares favorably to the issuer rule information 986 from the EI issuing server 920.

The rule processing 942 may update the applicable set of rules based on one or more of a rule changing, a rule expiring, and a new rule being added to the set. For example, the rule processing 942 updates the exchange item database 934 and sends owner rule info 988 to the EI buyer computing device 926 to indicate an EI rule change associated with a particular EI when current conditions and a previous rule indicate changing the rule when the conditions are compliant.

The rule processing 942 may further determine a specific use as the one or more rules of the applicable rule set (e.g., for a specific product, a specific store, etc.). For example, the rule processing 942 identifies raising a discount level for the exchange item in accordance with the EI rule as the specific use in accordance with the EI rule and favorable conditions to alter the discount level. Alternatively, or in addition to, the rule processing 942 determines a specific time frame as the one or more rules of the applicable rule set (e.g., for a set period of time, a day, etc.). For example, the rule processing 942 identifies a two-hour time window for the raised discount level for the exchange item in accordance with the one or more rules.

When the corresponding condition of the exchange item is compliant with the one or more rules, the rule processing 942 establishes a secure communication with a computing device affiliated with a current owner (e.g., of the exchange item and/or of the contract blockchain) to take control of the exchange item (e.g., to update an exchange item record of the exchange item). Having control includes holding a private key associated with modifying a blockchain associated with the exchange item. For example, the rule processing 942 exchanges a secure owner rule information 988 with the EI buyer computing device 926 associated with an exchange item serial number 005, where the rule processing 942, in accordance with a security rule, is allowed to modify the contract blockchain with regards to the EI rules.

While having control over the exchange item, the rule processing 942 securely modifies the quantifiable value of the exchange item based on the one or more rules to produce a modified exchange item. For example, the rule processing 942 adds another contract block to the contract blockchain, where the additional contract block includes a modified exchange item as modified exchange item info serial number 005. The modifying of the quantifiable value includes increasing the quantifiable value for the specific use when the specific use is utilized as the one or more rules of the applicable rule set and securely modifying the quantifiable value of the exchange item in accordance with the blockchain protocol.

Having modified the quantifiable value of the modified exchange item, the rule processing 942 sends a notification message (e.g., owner rule information 988) to the computing device (e.g., the EI buyer computing device 926) regarding the increased quantifiable value and the specific use. Having received the notification message, the EI buyer computing device 926 stores the (modified) exchange item in accordance with the blockchain protocol (e.g., stores the contract blockchain including the new contract block in the digital wallet 944).

The modifying of the quantifiable value may further include increasing the quantifiable value for use during the specific time frame when the specific time frame is utilized as the one or more rules of the applicable rule set (e.g., an increase discount level for the next two hours). Having modified the quantifiable value, the rule processing 942 sends another notification message to the computing device regarding the increased quantifiable value and the specific time frame.

While having control over the exchange item, the rule processing 942 further prevents the computing device or another computing device from accessing the exchange item. For example, the rule processing 942 issues owner rule information 988 to the EI buyer computing device 926 indicating that the exchange item is not to be utilized while being modified. Alternatively, or in addition to, the rule processing 942 updates the exchange item database 934 indicating that the exchange item is not to be accessed while being modified. When completing the modification, the rule processing 942 releases, via the secure communication, control of the modified exchange item to the computing device affiliated with the current owner. For example, the rule processing 942 issues yet another owner rule information 988 to the EI buyer computing device 926 indicating that the exchange item has been updated and released.

With the exchange item updated, and when the specific time frame expires (e.g., when utilized) and the modified exchange item is unused (e.g., the EI buyer computing device 926 has not used the modified exchange item at all), the rule processing 942 facilitates reverting of the exchange item. The reverting of the exchange item includes one or more of establishing another secure communication with the computing device affiliated with exchange item to take control of the modified exchange item and while having control over the modified exchange item, decreasing the increased quantifiable value to the quantifiable value to produce a reverted exchange item, preventing the computing device or another computing device from accessing the exchange item, releasing, via the other secure communication, control of the reverted exchange item to the computing device affiliated with the current owner, and sending another notification message to the computing device regarding the reverted exchange item.

Alternatively, when the specific time frame expires, and the modified exchange item was used but did not exhaust the quantifiable value, the rule processing 942 facilitates producing a further modified EI. The facilitating to produce the further modified EI includes one or more of identifying another rule of the applicable set of rules to further modify the modified exchange item, establishing another secure communication with the computing device affiliated to take control of the modified exchange item, and while having control over the modified exchange item, the rule processing 942 increases a remaining quantifiable value to produce a further modified exchange item, prevents the computing device or another computing device from accessing to the modified exchange item, releases, via the other secure communication, control of the further modified exchange item to the computing device affiliated with the current owner, and sends another notification message to the computing device regarding the further modified exchange item.

With the modified exchange item, the EI buyer computing device 926 may utilize the modified exchange item in conjunction with a purchase transaction from a merchant. For example, the EI buyer computing device 926 sends a use request to another server (e.g., a merchant server) regarding the modified exchange item (e.g., to utilize the modified EI for the purchase transaction). Having received the use request, the other server sends a use notification to the marketplace server 18. Having received the use notification, the rule processing 942 of the market place over 18 establishes a second secure communication with the computing device affiliated with the current owner to take control of the modified exchange item (e.g., exchanges owner rule information 988 with the EI buyer computing device 926).

While having control over the exchange item, the marketplace server 18 securely adjusts the quantifiable value of the exchange item based on the use notification to produce an adjusted exchange item (e.g., decrements a remaining balance by an amount of the purchase transaction and updates one or more of a transaction blockchain and the contract blockchain) and prevents the computing device, the other server, or other computing devices from accessing the exchange item. Once modified, the marketplace server 18 releases, via the second secure communication, control of the adjusted exchange item to the computing device affiliated with the current owner.

FIG. 18H is a diagram of an exchange item (D) database 934 that includes a variety of fields. The variety of fields includes an EI serial number, and issuer, and owner, EI information, conditions, EI rules, offer for sale, use options, blockchain control, and blockchain location when a blockchain approach is utilized as a security mechanism for entities trading in the EI to verify attributes associated with the EL For example, a transaction blockchain is associated with transactions from birth of the EI to complete utilization/retirement of the EI and a contract blockchain associated with EI rule changes as time progresses. A structure of the transaction blockchain and the contract blockchain is discussed in greater detail with reference to FIG. 18J.

To ensure favorable security, a controlling entity desiring to modify the blockchain must be associated with control of the blockchain as indicated by the blockchain control field of the exchange item database 934. The controlling entity may change from one entity to another during the EI lifecycle and may further be constrained as indicated by the EI rules. For example, a particular blockchain may be controlled by the EI issuer in the beginning and later controlled by the marketplace server in accordance with the EI rules established by the EI issuer. As another example, the blockchain may be controlled by the merchant server to update rules and conditions to support a particular promotion as allowed by the original and current EI rules.

A most recent revision of a particular blockchain may be temporarily stored in one or more entities of the exchange item marketplace as indicated by the blockchain location field. As such, the controlling entity may utilize the exchange item database 934 to identify the entity where the blockchain is temporarily stored to gain access to the blockchain for modification in accordance with the rules and conditions.

Figure 18J:
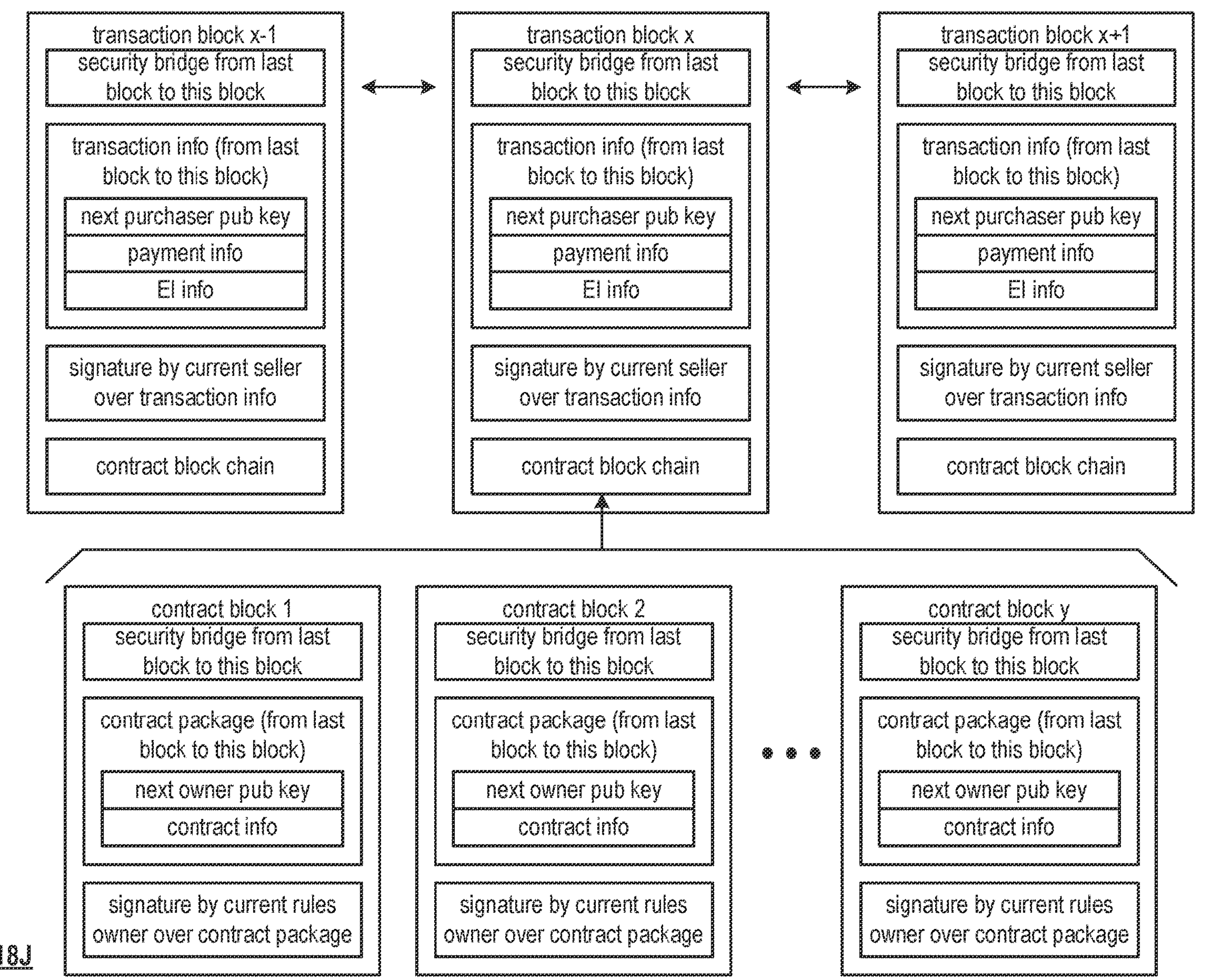
FIG. 18J is another schematic block diagram of a transactions blockchain in accordance with the present invention.

FIG. 18J is another schematic block diagram of a transactions blockchain that includes a series of transaction blocks. Each transaction block includes a security bridge from a last block to this block (e.g., hash over previous block and a previous nonce, and a hash over a current block and a current nonce), transaction information, a signature by a current seller over the transaction info, and a contract blockchain. The transaction information includes a next purchaser public key (e.g., a public key of a public/private key pair of the next purchaser associated with a next transaction), payment information, and EI information. The payment information includes payment information (e.g., payment amount, payment source, etc.) from the next purchaser to the current seller associated with the current block. The signature is created by the current seller signing the transaction information utilizing the private key of a public/private key pair of the current seller.

The contract blockchain includes one or more contract blocks representing changes to rules and/or conditions of the EI of the EI information. For example, the contract blockchain includes a complete contract blockchain for substantially all of the rules and/or conditions changes. As another example, the contract blockchain includes at least one contract block associated with the transaction block. Alternatively, or in addition to, the contract blockchain is maintained separately and is not included within the transaction block. Further alternatively, a single combined transaction and contract block chain is maintained as one entity.

Each contract block includes a security bridge from a last block to this block, a contract package (from a last contract block to this contract block), and a signature by a current rules owner over the contract package. Each contract package includes at least one next owner public key (e.g., associated with an exchange item marketplace entity expected to be a next owner of the contract blockchain), and contract information. The contract information includes one or more of EI rules, conditions, use options, EI information, agreements, merchant identifiers, issuer identifier, EI serial number, owner identifier, an offer for sale indicator, etc. The signature over the contract packages created by a current owner of the contract blockchain signing the contract package utilizing a private key of a public/private key pair associated with the current owner of the contract blockchain. The one or more blockchains may be verified from time to time utilizing industry-standard mining approaches and are applicable to both proof of work, proof of stake, and other hybrid mining techniques.

Figure 18K:
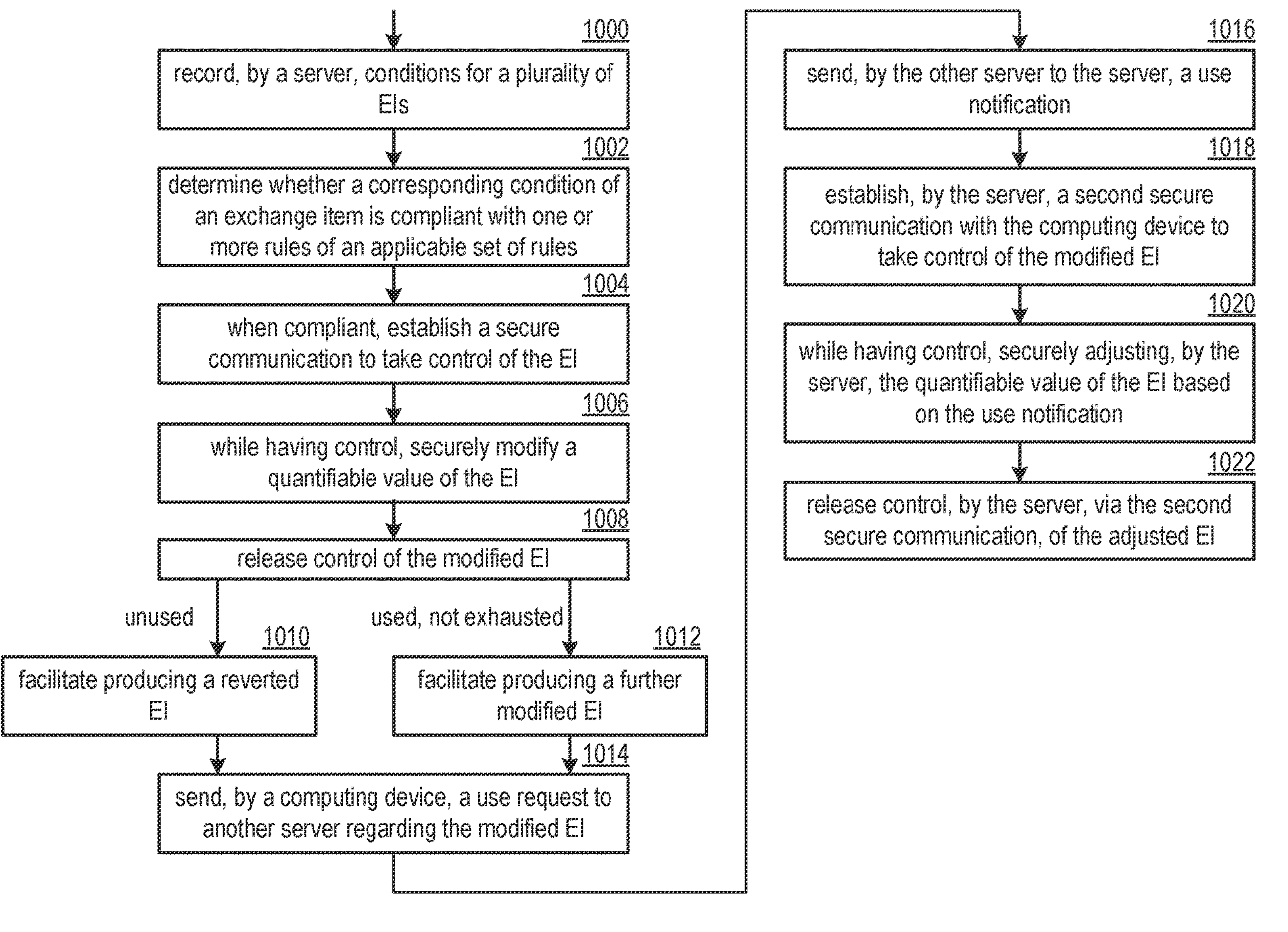
FIG. 18K is a logic diagram of an embodiment of a method for modifying an exchange item in an exchange item marketplace network in accordance with the present invention.

FIG. 18K is a logic diagram of an embodiment of a method for modifying an exchange item in an exchange item marketplace network. In particular, a method is presented for use in conjunction with one or more functions and features described in conjunction with FIGS. 1-17E, 18A-J, and also FIG. 18K. The method includes step 1000 where a processing module of a server (e.g., a marketplace server of a communication system) records conditions for a plurality of exchange items. For an exchange item of the plurality of exchange items, where the exchange item has a quantifiable value, a serial number, and a current owner, the method continues at step 1002 where the processing module determines whether a corresponding condition of the exchange item is compliant with one or more rules of an applicable set of rules. The determining may include determining a specific use as the one or more rules of the applicable rule set. The determining may further include determining a specific time frame as the one or more rules of the applicable rule set. The determining may yet further include utilizing a sliding scale of compliance based on one or more of a user profile, an exchange item information, exchange item issuer, limited exchange item use, and timing of use. The determining may still further include updating the applicable set of rules based on one or more of a rule changing, a rule expiring, and a new rule being added to the set. For example, updating the rules and utilizing the updated rules for a compliance determination.

When the corresponding condition of the exchange item is compliant with the one or more rules, the method continues at step 1004 where the processing module establishes a secure communication with a computing device affiliated with the current owner to take control of the exchange item. For example, the processing module accesses a contract blockchain currently possessed by the computing device.

While having control over the exchange item, the method continues at step 1006 where the processing module securely modifies the quantifiable value of the exchange item based on the one or more rules to produce a modified exchange item. The modifying may include modifying the quantifiable value by increasing the quantifiable value for the specific use when the specific use is utilized as the one or more rules of the applicable rule set and securely modifying the quantifiable value of the exchange item in accordance with a blockchain protocol (e.g., of the contract blockchain). The modifying may further include sending a notification message to the computing device regarding the increased quantifiable value and the specific use and storing, by the computing device, the exchange item in accordance with the blockchain protocol. The modifying of the quantifiable value may further include increasing the quantifiable value for use during the specific time frame (e.g., an increased discount for the next two hours) when the specific time frame is utilized as the one or more rules of the applicable rule set and sending a notification message to the computing device regarding the increased quantifiable value and the specific time frame. While having control over the exchange item, the processing module prevents the computing device or another computing device from accessing the exchange item (e.g., marking the modified exchange item as not accessible).

The method continues at step 1008 where the processing module releases, via the secure communication, control of the modified exchange item to the computing device affiliated with the current owner. For example, the processing module marks the modified exchange item as accessible enabling use of the modified exchange item by the computing device (e.g., to make a purchase transaction). When the specific time frame expires (e.g., two hours has elapsed), and the modified exchange item was used but did not exhaust the quantifiable value, the method branches to step 1012. When the specific time frame expires and the modified exchange item is unused, the method continues to step 1010.

When the specific time frame expires and the modified exchange item is unused, the method continues at step 1010 where the processing module facilitates producing a reverted EI. The facilitating includes establishing another secure communication with the computing device affiliated to take control of the modified exchange item. While having control over the modified exchange item, the processing module decreases the increased quantifiable value to the quantifiable value to produce a reverted exchange item, prevents the computing device or another computing device from accessing the exchange item, releases, via the other secure communication, control of the reverted exchange item to the computing device affiliated with the current owner, and sends another notification message to the computing device regarding the reverted exchange item. The method branches to step 1014.

When the specific time frame expires, and the modified exchange item was used but did not exhaust the quantifiable value, the method continues at step 1012 where the processing module facilitates producing a further modified EI. The facilitating of producing the further modified EI includes identifying another rule of the applicable set of rules to further modify the modified exchange item and establishing another secure communication with the computing device affiliated to take control of the modified exchange item. While having control over the modified exchange item, the processing module increases a remaining quantifiable value to produce a further modified exchange item, prevents the computing device or another computing device from accessing to the modified exchange item, releases, via the other secure communication, control of the further modified exchange item to the computing device affiliated with the current owner, and sends another notification message to the computing device regarding the further modified exchange item.

The method continues at 1014 where the computing device sends a use request to another server regarding the modified exchange item (e.g., to utilize the modified exchange item for a purchase transaction). The method continues at step 1016 where the other server sends a use notification to the other server (e.g., including information with regards to the purchase transaction). The method continues at step 1018 where the processing module of the server establishes a second secure communication with the computing device affiliated with the current owner to take control of the modified exchange item.

While having control over the exchange item, the method continues at step 1020 where the processing module of the server securely adjusts the quantifiable value of the exchange item based on the use notification to produce an adjusted exchange item (e.g., decrements a remaining balance by an amount of the purchase transaction). The adjusting may further include preventing the computing device, the other server, or other computing devices from accessing the exchange item during the adjusting. The method continues at step 1022 where the processing module of the server, and via the second secure communication, releases control of the adjusted exchange item to the computing device affiliated with the current owner.

The method described above in conjunction with the processing can alternatively be performed by other modules of the exchange item marketplace network or by other devices. In addition, at least one memory section (e.g., a computer readable memory, a non-transitory computer readable storage medium organized into a first memory section, a second memory section, a third memory section, a fourth memory section, etc.) that stores operational instructions can, when executed by one or more processing modules of one or more computing devices (e.g., one or more servers) of the exchange item marketplace network, cause the one or more computing devices to perform any or all of the method steps described above.

Figure 18L:
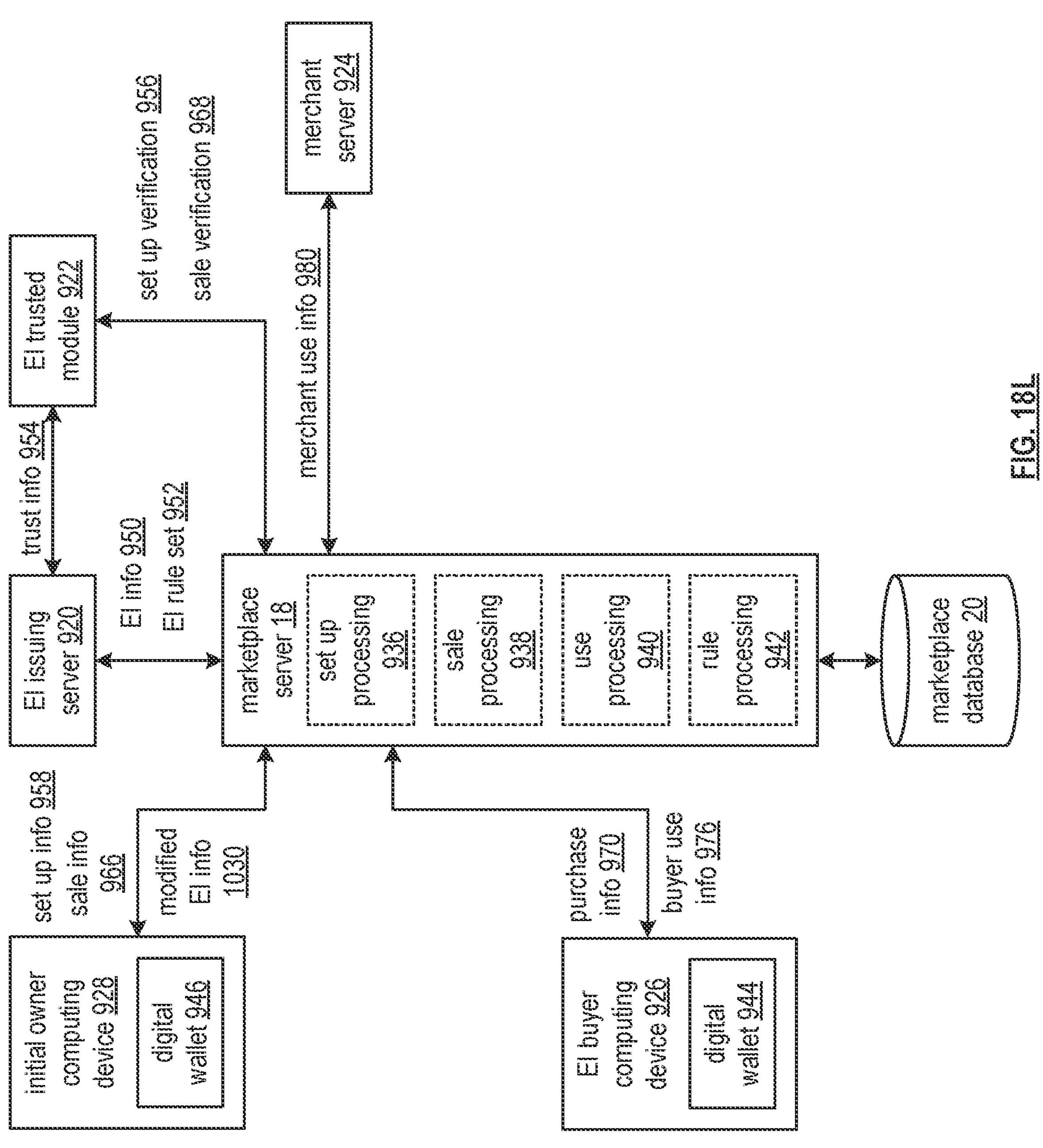
FIG. 18L is a schematic block diagram of another embodiment of an exchange item marketplace network in accordance with the present invention.

FIG. 18L is a schematic block diagram of another embodiment of an exchange item marketplace network (e.g., a data communication system) that includes the initial owner computing device 928 FIG. 18C, the exchange item (EI) issuing server 920 of FIG. 18C, the EI trusted module 922 of FIG. 18C, the merchant server 924 of FIG. 18C, marketplace server 18 FIG. 18C, the marketplace database 20 of FIG. 18C, and the EI buyer computing device 926 FIG. 18C. Entities of the exchange item marketplace network may be operably coupled to each other via the network 24 of FIG. 18C or may be directly coupled. The initial owner computing device 928 includes the digital wallet 946 of FIG. 18C and the EI buyer computing device 926 includes the digital wallet 944 of FIG. 18C. The marketplace server 18 includes the set up processing 936, the sale processing 938, the use processing 940, and the rule processing 942 all of FIG. 18C. The exchange item marketplace network functions to transfer secure custody of an exchange item between entities in accordance with a secure custody protocol. The secure custody protocol includes utilizing one or more of a contract blockchain and a transaction blockchain as previously discussed.

In an example of operation of the transferring the secure custody of the exchange item between entities, the marketplace server 18 (e.g., the server) establishes an initial validity of the exchange item that includes data regarding a quantifiable value, a serial number, and issuance information, where the initial validity authenticates the exchange item and the data. The issuance information includes one or more of issuer identity, and issuance date, and expiration time frame, EI rules, and use parameters. The establishing may include receiving a plurality of exchange items from the EI issuing server 920, where the plurality of exchange items includes the exchange item, and establishing the initial validity of the exchange item with the EI issuing server 920. For example, the set up processing 936 receives EI information 950 and an EI rule set 952 from the EI issuing server 920, where the EI issuing server 920 issues trust information 954 (e.g., a first contract block of the contract blockchain) to the EI trusted module 922 while generating the EI information 950 and the EI rule set 952. Having received the EI information 950 and the EI rule set 952, the set up processing 936 exchanges set up verification 956 with the EI trusted module 922 to validate the EI information 950 and the EI rule set 952.

Having established the initial validity of the exchange item, the marketplace server 18 executes a secure custody protocol to establish that the initial owner computing device 928 (e.g., a first computing device) of the exchange item marketplace network (e.g., data communication system) has secure custody of the exchange item and to maintain validity of the exchange item. The secure custody protocol may further include one or more of a chain of custody mechanism (e.g., the blockchains), exchange item modification restrictions for computing devices of the data communication system (e.g., the initial owner computing device 928, the EI buyer computing device 926, the merchant server 924), and exchange item modification rights for servers of the data communication system. For example, the sale processing 938 exchanges set up information 958 with the initial owner computing device 928 (e.g., a request to purchase the exchange item, confirmation of sale, the EI info 950, one or more of the transaction blockchain and the contract blockchain).

Having executed the secure custody protocol, in response to an exchange item transfer and in accordance with the secure custody protocol, the marketplace server 18 facilitates transfer of the secure custody of the exchange item from the first computing device (e.g., the initial owner computing device 928) to the server or to a second computing device (e.g., the EI buyer computing device 926) of the data communication system. Such transfer supports one or more of a sale of the exchange item, use of the exchange item for a purchase transaction with a merchant associated with the merchant server 924, and modification of the exchange item in accordance with the EI rule set 952.

The transferring the secure custody of the exchange item from the initial owner computing device 928 to the EI buyer computing device 926 includes creating, by the sale processing 938, an offer for sale digital file for the exchange item in response to an offer for sale request from the initial owner computing device 928 and writing the offer for sale digital file for the exchange item to the marketplace database 20 (e.g., a virtual marketplace database) that includes a user interface for computing devices of the data communication system to view offer for sale digital files for a plurality of exchange items. The transferring further includes the sale processing 938 receiving purchase information 970 that includes a request to purchase the exchange item from the EI buyer computing device 926 and upon successful execution of the purchase, transferring the secure custody of the exchange item to the EI buyer computing device 926. For example, the sale processing 938 exchanges sale verification 968 with the EI trusted module 922 to update the transaction blockchain to indicate that the EI buyer computing device 926 is purchasing the exchange item from the initial owner computing device 928.

The transferring the secure custody of the exchange item from the first computing device to the second computing device may further include the sale processing 938 transferring, in response to another exchange item transfer and in accordance with the secure custody protocol, the secure custody of the exchange item from the second computing device to the marketplace server 18 or to a third computing device of the data communication system. The transferring the secure custody of the exchange item from the first computing device to the second computing device may still further include the initial owner computing device 928 sending a request to use the exchange item to the use processing 940 of the marketplace server 18, where the request to use the exchange item identifies the second computing device. When the use is authorized (e.g., the use processing 940 verifies that such use is authorized in accordance with the EI rule set 952), the use processing 940 transfers the secure custody of the exchange item to the second computing device for the second computing device to execute the use, where the second computing device changes the quantifiable value of the exchange item to produce a use modified exchange item (e.g., modified EI info 1030), and the use processing 940 transfers secure custody of the use modified EI info 1030 from the second computing device to the first computing device.

When transferring the secure custody of the exchange item from the initial owner computing device 928 (e.g., the first computing device) to the EI buyer computing device 926 (e.g., the second computing device), the rule processing 942 of the marketplace server 18 determines whether a change to the data of the exchange item occurred while the exchange item is in the secure custody of the second computer. For example, the rule processing 942 indicates the change to the data when the use processing 940 receives merchant use information 980 from the merchant server 924 in response to the EI buyer computer device 926 issuing buyer use information 976 to the use processing 940 to facilitate the purchase transaction with the merchant server 924.

When the change to the data of the exchange item occurred while the exchange item is in the secure custody of the second computer, the use processing 940 of the marketplace server 18 determines whether the exchange item is exhausted (e.g., a remaining balance of zero). When the exchange item is exhausted, the use processing 940 retires the exchange item (e.g., removes the exchange item from the marketplace database 20 and/or issues retirement information to a current owner of exchange item.

When the exchange item is in the secure custody of the server, the rule processing 942 of the marketplace server 18 may modify the data of the exchange item to produce a modified exchange item. The modifying of the data of the exchange item includes identifying a set of rules regarding the exchange item, where the set of rules includes one or more rules, where a rule of the set of rules includes an amount of data change and one or more conditions on when to apply the amount of change. The modifying further includes the rule processing 942 determining that a condition involving the first computing device conforms to the one or more conditions and when the condition involving the first computing device conforms to the one or more conditions, the rule processing 942 modifies the data of the exchange item in accordance with the amount of change (e.g., updates the marketplace database 20). Having modified the data of the exchange item, the rule processing 942 transfers secure custody of the modified exchange item to the initial owner computing device 928 device in accordance with the secure custody protocol.

Figure 18M:
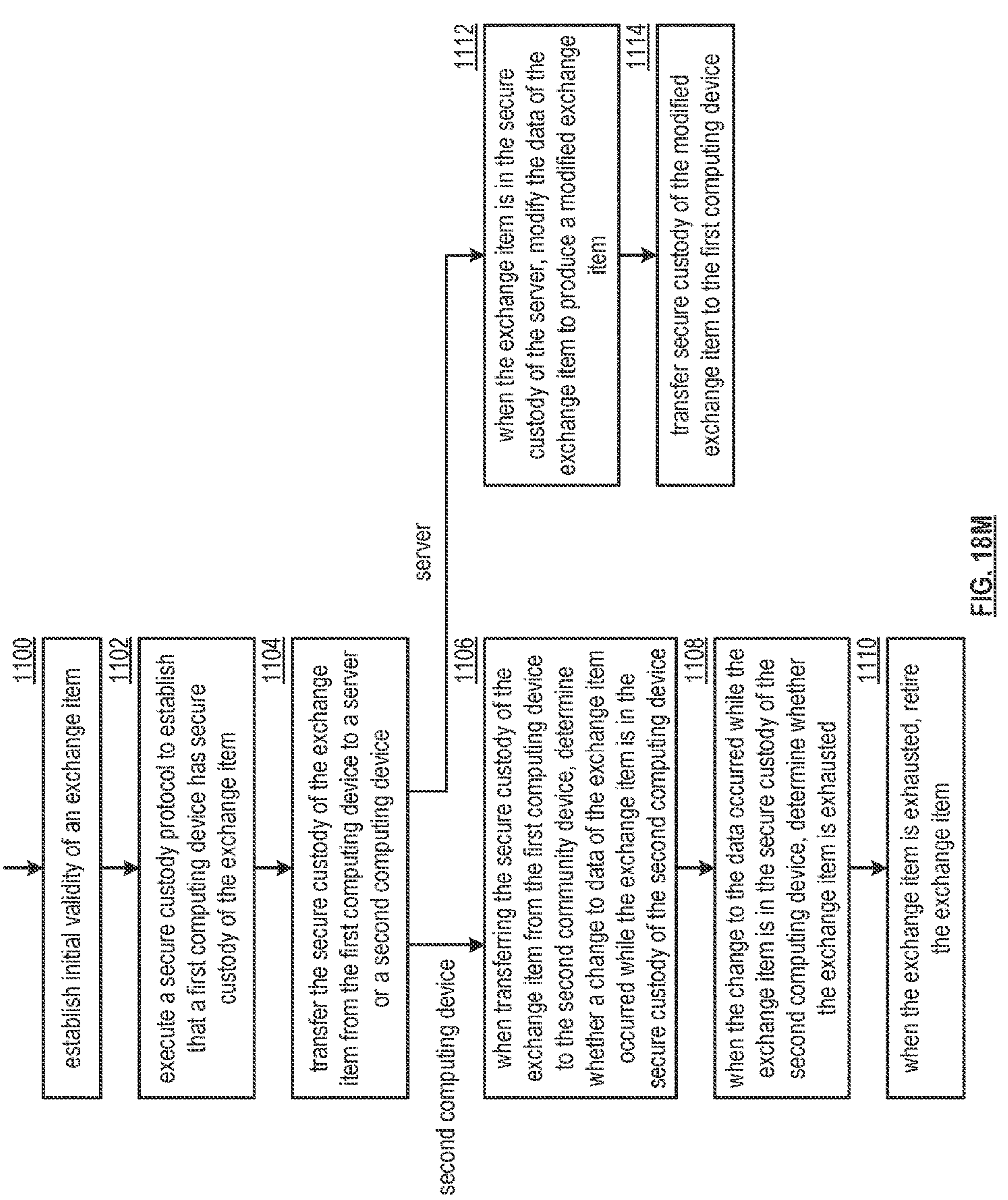
FIG. 18M is a logic diagram of an embodiment of a method for securely modifying an exchange item in an exchange item marketplace network in accordance with the present invention.

FIG. 18M is a logic diagram of an embodiment of another method for modifying an exchange item in an exchange item marketplace network. In particular, a method is presented for use in conjunction with one or more functions and features described in conjunction with FIGS. 1-17E, 18A-L, and also FIG. 18M. The method includes step 1100 where a processing module of a server (e.g., a marketplace server of a communication system) establishes an initial validity of an exchange item that includes data regarding a quantifiable value, a serial number, and issuance information, where the initial validity authenticates the exchange item and the data. The establishing may include receiving a plurality of exchange items from an issuing server, where the plurality of exchange items includes the exchange item, and establishing the initial validity of an exchange item with the issuing server.

The method continues at step 1102 where the processing module executes a secure custody protocol to establish that a first computing device of the data communication system has secure custody of the exchange item and to maintain validity of the exchange item. For example, the processing module generates a secure transaction block of a transaction blockchain, where the secure transaction block indicates that the first computing device has secure custody.

The method continues to step 1104 where the processing module transfers, in response to an exchange item transfer and in accordance with the secure custody protocol, the secure custody of the exchange item from the first computing device to the server or to a second computing device of the data communication system (e.g., for a sale, a purchase, or a modification). The method branches to step 1112 when transferring to the server. When transferring to the second computing device, the transferring the secure custody of the exchange item from the first computing device to the second computing device includes creating an offer for sale digital file for the exchange item in response to an offer for sale request from the first computing device the offer for sale digital file for the exchange item to a virtual marketplace database that includes a user interface for computing devices of the data communication system to view offer for sale digital files for a plurality of exchange items, receiving a request to purchase the exchange item from the second computing device, and upon successful execution of the purchase, transferring the secure custody of the exchange item to the second computing device.

The transferring the secure custody of the exchange item from the first computing device to the second computing device may further include transferring, in response to another exchange item transfer and in accordance with the secure custody protocol, the secure custody of the exchange item from the second computing device to the server or to a third computing device of the data communication system. The transferring the secure custody of the exchange item from the first computing device to the second computing device may still further include sending, by the first computing device, a request to use the exchange item to the server, where the request to use the exchange item identifies the second computing device. When the use is authorized, processing module transfers the secure custody of the exchange item to the second computing device for the second computing device to execute the use, where the second computing device changes the quantifiable value of the exchange item to produce a use modified exchange item, and transfers secure custody of the use modified exchange item from the second computing device to the first computing device.

When transferring the secure custody of the exchange item from the first computing device to the second computing device, the method continues at step 1106 where the processing module determines whether a change to the data of the exchange item occurred while the exchange item is in the secure custody of the second computing device (e.g., a lowering of a remaining balance based on usage of the exchange item). When the change to the data of the exchange item occurred while the exchange item is in the secure custody of the second computing device, the method continues at step 1108 where the processing module determines whether the exchange item is exhausted (e.g., remaining balance has reached zero). When the exchange item is exhausted, the method continues at step 1110 where the processing module retires the exchange item.

When the exchange item is in the secure custody of the server, the method continues at step 1112 or the processing module modifies the data of the exchange item to produce a modified exchange item. The modifying the data of the exchange item includes identifying a set of rules regarding the exchange item, where the set of rules includes one or more rules, where a rule of the set of rules includes an amount of data change and one or more conditions on when to apply the amount of change, determining that a condition involving the first computing device conforms to the one or more conditions, and when the condition involving the first computing device conforms to the one or more conditions, modifying the data of the exchange item in accordance with the amount of change. The method continues at step 1114 where the processing module transfers secure custody of the modified exchange item to the first computing device in accordance with the secure custody protocol.

The method described above in conjunction with the processing can alternatively be performed by other modules of the exchange item marketplace network or by other devices. In addition, at least one memory section (e.g., a computer readable memory, a non-transitory computer readable storage medium organized into a first memory section, a second memory section, a third memory section, a fourth memory section, a fifth memory section etc.) that stores operational instructions can, when executed by one or more processing modules of one or more computing devices (e.g., one or more servers) of the exchange item marketplace network, cause the one or more computing devices to perform any or all of the method steps described above.

Figure 18N:
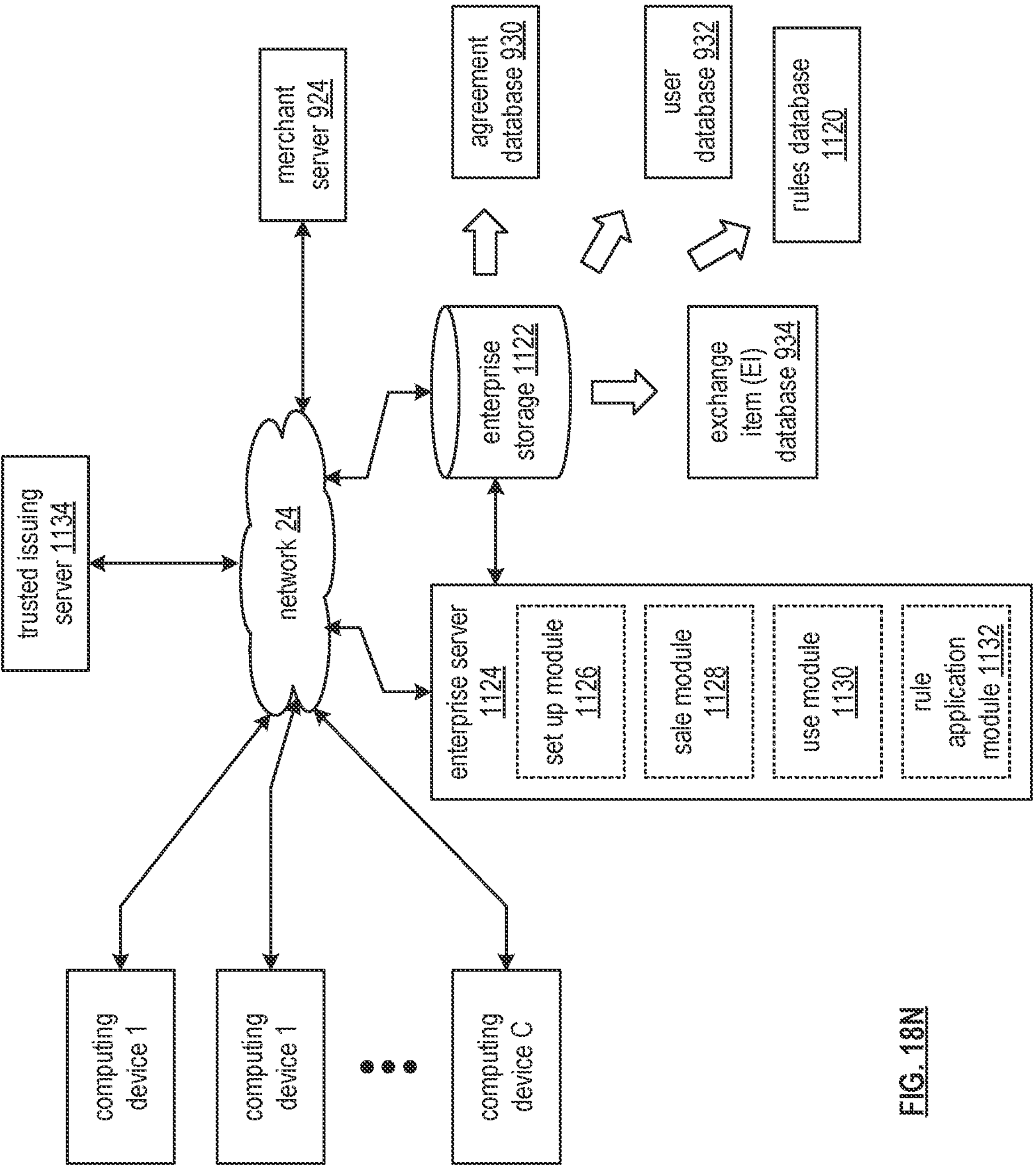
FIG. 18N is a schematic block diagram of another embodiment of an exchange item marketplace network in accordance with the present invention.

FIG. 18N is a schematic block diagram of another embodiment of an exchange item marketplace network (e.g., a data communication system, a network-based virtual exchange item marketplace) that includes the network 24 of FIG. 18C, the merchant server 924 of FIG. 18C, an enterprise storage 1122, an enterprise server 1124, a trusted issuing server 1134, and a plurality of computing devices 1-C. The trusted issuing server 1134 may be implemented utilizing one or more of a secure server, the exchange item (EI) issuing server 920 of FIG. 18C, and the EI trusted module 922 of FIG. 18C. The enterprise storage 1122 may be implemented utilizing a plurality of storage servers at a local or distributed level for storing large amounts of data. For example, the enterprise storage 1122 may be implemented utilizing the marketplace database 20 of FIG. 18C. The enterprise server 1124 may be implemented utilizing one or more servers for processing large amounts of data. For example, the enterprise server 1124 may be implemented utilizing the marketplace server 18 of FIG. 18C. The plurality of computing devices may include one or more of the initial owner computing device 928 of FIG. 18C, the EI buyer computing device 926 of FIG. 18C, and any other computer that is part of the data communication system.

The enterprise storage 1122 includes one or more of the agreement database 930 of FIG. 18C, the user database 932 of FIG. 18C, the exchange item database 934 of FIG. 18C, and a rules database 1120. The enterprise server 1124 includes a network interface, a memory, and a processing module operably coupled to the network interface into the memory. The network interface may be implemented utilizing the network interface module(s) 78 of FIG. 4. The memory may be implemented utilizing one or more of the main memory 66 of FIG. 4, the memory interface module(s) 80 of FIG. 4, the flash memory 92 of FIG. 4, the HD memory 94 of FIG. 4, the SS memory 96 of FIG. 4, and the cloud memory 98 of FIG. 4. The processing module may be implemented utilizing the processing module 62 of FIG. 4 and may be utilized to implement one or more of a set up module 1126, a sale module 1128, a use module 1130, and a rule application module 1132.

The set up module 1126 functions to initially validate exchange items and create records in the exchange item database 934 for validated exchange items, where each of the exchange items includes data regarding a quantifiable value, a serial number, and issuance information. The sale module 1128 functions to securely transfer a selected exchange item from the first computing device to the second computing device. The use module 1130 functions to securely apply the selected exchange item to a closed loop digital transaction in accordance with an agreement of the agreements database 930. The rule application module 1132 functions to securely modify the data of the selected exchange item in accordance with an applicable set of rules from the rules database 1120. Examples of operation of the enterprise server 1124 are discussed in greater detail below.

The enterprise storage 1122 further functions to store the user database 932, where the user database 932 includes one or more of a user identifier field (e.g., identified person and associated computing devices), an exchange item buying information field; (e.g., which Hs the user buys), and exchange item use information field (e.g., how much, how often, and what types of Hs the user uses), and an exchange item selling information field.

To facilitate offering exchange items for sale, the processing module of the enterprise server 1124 accesses a record in the user database 932 of a user associated with a computing device, accesses one or more of the exchange item database, the agreements database, and the rules database to identify one or more exchange items of interest to the user, and sends, via the network interface, a message to the computing device regarding the one or more exchange items of interest.

When acquiring an exchange item, the computing device of the plurality of computing devices stores a user exchange item database (e.g., a portion of the exchange item database 934 that is pertinent to the user and computing device) that includes one or more of an exchange item identifier field, an issuer identifier field, an exchange item information field, a use options field, a control field, a location field, a status field, and a transaction field. The exchange item database 934 includes one or more records, where each record includes one or more of an exchange item identifier field, an issuer identifier field, a current owner identifier field, an exchange item information field (e.g., value, type, issuance date, expiration date, use parameters), a conditions field (e.g., tracks conditions of an owner regarding potential applicability of rules), a rules identifier field (e.g., identifies one or more applicable rule sets), an offer for sale field (e.g., an indication that current owner is offering the EI for sale, doesn't prohibit current owner from using EI), a use options field (e.g., identifies which merchants will accept the EI as a form of payment, this is determined based on content of the agreement database 930), a control field (e.g., identifies the entity that currently has the right to use or modify the EI), a location field (e.g., identifies the entity that currently has physical possession of the EI, which may be different than the entity that has control, for example, the server may have physical possession and a computing device may have control), a status field (e.g., identify the status of the EI such as active, inactive, valid, questionable validity, exhausted, expired, etc.), and a transaction field (e.g., a record of the transaction history of the EI, built into blockchain). Each field may include sub-fields to accommodate various pieces of information being recorded.

The agreements database includes one or more of an issuer identifier field, an exchange item type field (e.g., identifies the types of EI that are part of the agreement), a recipient entity identifier field (e.g., identifies the entities that will accept the EI as a form of payment), an agreement identifier field (e.g., agreement between issuer and recipient entity on use of EI), and a rules identifier field (e.g., if rules exist for EI, do they apply for use with the recipient, may vary from recipient to recipient). The rules database includes one or more of an issuer identifier field, an exchange item type field (e.g., per issuer), a rule set field (e.g., includes rules for a set of rules: discount, conditions to be met, etc.), and a rules applicability field (e.g., for an EI type, does the rule set apply or not).

When adding a new exchange item to the data communication system, the set up module 1126 establishes establish, via the network interface and the network 24, a secure communication link with the trusted issuing server 1134, where the issuing server 1134 performs one or more of creating the EI to put directly into the exchange item database, providing on-the-fly creation at request of a user or merchant, providing the EI as a location based promotion, and providing the EI as a user based promotion, etc. Having established the link, the set up module 1126 receives, via the network interface and the network 24, the data of the exchange item from the trusted issuing server 1134 in accordance with a secure custody protocol (e.g., utilizing a contract blockchain). Having received the data, the set up module 1126 establishes the enterprise server 1124 as having secure custody of the exchange item (e.g., as a current owner as noted within the contract blockchain). Having established the secure custody, the set up module 1126 creates a record in the exchange item database 934 for the exchange item.

When the exchange item is to be sold to a computing device, the sale module 1128 receives, via the network interface and the network 24, a request to sell a particular exchange item for a first computing device (e.g., computing device 1). Having received the request, the sale module 1128 verifies that the first computing device has secure custody of the particular exchange item in accordance with the secure custody protocol (e.g., verifies a signature of the computing device 1). When the first computing device has secure custody of the particular exchange item, the sale module 1128 verifies the data of the exchange item (e.g., verifies with the trusted issuing server 1134, verifies with the exchange item database 934, verifies a signature over the data). When the data of the exchange item is verified, the sale module 1128 adds an offer for sale digital record for the particular exchange item in the network-based virtual exchange item marketplace (e.g., indicates for sale in the exchange item database 934).

When the exchange item is to be sold from the first computing device to the second computing device, the sale module 1128 receives, via the network interface and the network 24, a request to purchase a particular exchange item from the second computing device (e.g., computing device 2) and authenticates the second computing device. When the second computing device is authenticated, the sale module 1128 transfers secure custody of the particular exchange item from the first computing device to the second computing device in accordance with the secure custody protocol (e.g., facilitates modification of the contract blockchain to indicate that the computing device 2 is the new owner), and removes the offer for sale digital record for the particular exchange item from the network-based virtual exchange item marketplace (e.g., updates the exchange item database 934).

When a computing device (e.g., computing device 2) utilizes an exchange item in a purchase transaction (e.g., a closed loop digital transaction), the use module 1130 receives, via the network interface and the network 24 from a computing device, a request to use the exchange item in a particular closed loop digital transaction with a recipient entity server (e.g., the merchant server 924). Having received the request, the use module 1130 accesses the agreements database 930 to determine whether an agreement exists between an issuing server (e.g., the trusted issuing server 1134) of the particular exchange item and the recipient entity server. When the agreement exists, the use module 1130 determines whether the particular closed loop digital transaction is in accordance with the agreement (e.g., user is allowed, the particular type of transaction is allowed, rules and conditions apply, etc.). When the particular closed loop digital transaction is in accordance with the agreement, the use module 1130 authorizes the particular closed loop transaction. When the agreement does not exist or the particular closed loop digital transaction is not in accordance with the agreement, use module 1130 denies the particular closed loop transaction.

From time to time, the rule application module 1132 considers modifying the data of the exchange item (e.g., based on one or more of interpreting a schedule, receiving a request, detecting a change in a condition). When considering the modifying of the data, the rule application module 1132 obtains condition information of a computing device having secure custody of a particular exchange item (e.g., condition from user profile and history provides the condition information, physical location, environmental conditions, etc.). The obtaining includes one or more of identifying a condition source, interpreting condition data from the identified condition source, receiving the condition information, performing a lookup, and generating the condition information based on condition data.

Having obtained the condition information, the rule application module 1132 accesses rules of the applicable set of rules associated with the particular exchange item from the rules database 1120. Having accessed the rules, the rule application module 1132 compares the condition information with the rules of the applicable set of rules. When the condition information compares favorably with the rules of the applicable set of rules, the rule application module 1132 obtains secure custody of the particular exchange item from the computing device in accordance with the secure custody protocol (e.g., take custody by a data transfer or update the exchange item database 934 to indicate that the enterprise server 1124 has secure custody). While having secure custody, the rule application module 1132 modifies the data of the particular exchange item in accordance with the rules of the application set of rules to produce a modified exchange item and transfers secure custody of the modified exchange item to the computing device.

Figure 18P:
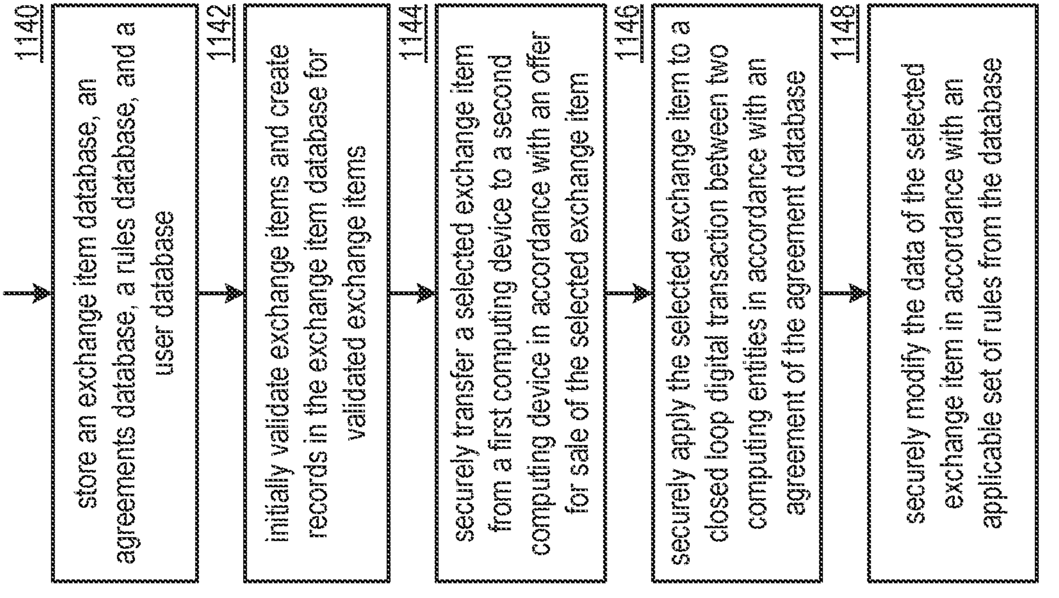
FIG. 18P is a logic diagram of an embodiment of a method for securely processing an exchange item in an exchange item marketplace network in accordance with the present invention.

FIG. 18P is a logic diagram of an embodiment of another method for securely processing an exchange item in an exchange item marketplace network. In particular, a method is presented for use in conjunction with one or more functions and features described in conjunction with FIGS. 1-17E, 18A-N, and also FIG. 18P. The method includes step 1140 where a processing module (e.g., of an enterprise server of a data communication system) stores an exchange item database, an agreements database, and a rules database in an enterprise storage. The storing may further include storing a user database in the enterprise storage and accessing a record in the user database of a user associated with a computing device of a plurality of computing devices. The storing may yet further include accessing a record in the user database of a user associated with a computing device, accessing one or more of the exchange item database, the agreements database, and the rules database to identify one or more exchange items of interest to the user, and sending a message to the computing device regarding the one or more exchange items of interest. The storing may still further include storing, by the computing device of the plurality of computing devices, a user exchange item database (e.g., a portion of the user database).

The method continues at step 1142 where the processing module initially validates exchange items and creates records in the exchange item database for validated exchange items, where each of the exchange items includes data regarding a quantifiable value, a serial number, and issuance information. The initially validating the exchange items and creating records in the exchange further includes establishing a secure communication link with a trusted issuing server, receiving the data of an exchange item from the issuing server in accordance with a secure custody protocol, establishing the enterprise server as having secure custody of the exchange item, and creating a record in the exchange item database for the exchange item.

The method continues to step 1144 where the processing module securely transfers a selected exchange item from a first computing device to a second computing device in accordance with an offer for sale of the selected exchange item. The secure transferring of the selected exchange item from the first computing device to the second computing device in accordance with the offer for sale of the selected exchange item further includes a variety of approaches. In a first approach, the processing module receives a request to sell the selected exchange item from the first computing device, and verifies that the first computing device has secure custody of the particular exchange item in accordance with a secure custody protocol. When the first computing device has secure custody of the particular exchange item, the processing module verifies the data of the exchange item. When the data of the exchange item is verified, the processing module adds an offer for sale digital record for the particular exchange item in a network-based virtual exchange item marketplace (e.g., an exchange item database).

In a second approach to the securely transferring the selected exchange item from the first computing device to the second computing device in accordance with the offer for sale of the selected exchange item, the processing module receives a request to purchase a particular exchange item from the second computing device, and authenticates the second computing device. When the second computing device is authenticated, the processing module transfers secure custody of the particular exchange item from a first computing device to the second computing device in accordance with a secure custody protocol and removes an offer for sale digital record for the particular exchange item from the network-based virtual exchange item marketplace (e.g., from the exchange item database).

The method continues at step 1146 where the processing module securely applies the selected exchange item to a closed loop digital transaction between two computing entities (e.g., computing device or server) in accordance with an agreement of the agreements database. The securely applying the selected exchange item to the closed loop digital transaction further includes receiving, from a computing device, a request to use an exchange item in a particular closed loop digital transaction with a recipient entity server, and accessing the agreements database to determine whether an agreement exists between an issuing server of the particular exchange item and the recipient entity server. When the agreement exists, the processing module determines whether the particular closed loop digital transaction is in accordance with the agreement. When the particular closed loop digital transaction is in accordance with the agreement, the processing module authorizes the particular closed loop transaction. When the agreement does not exist or the particular closed loop digital transaction is not in accordance with the agreement, the processing module denies the particular closed loop transaction.

The method continues at step 1148 where the processing module securely modifies the data of the selected exchange item in accordance with an applicable set of rules from the rules database. The securely modifying of the data of the selected exchange item further includes obtaining condition information of a computing device having secure custody of a particular exchange item, accessing rules of the applicable set of rules associated with the particular exchange item from the rules database, and comparing the condition information with the rules of the applicable set of rules. When the condition information compares favorably with the rules of the applicable set of rules, the processing module obtains secure custody of the particular exchange item from the computing device in accordance with secure custody protocol. While having secure custody, the processing module modifies the data of the particular exchange item in accordance with the rules of the application set of rules to produce a modified exchange item and transfers secure custody of the modified exchange item to the computing device.

The method described above in conjunction with the processing can alternatively be performed by other modules of the exchange item marketplace network or by other devices. In addition, at least one memory section (e.g., a computer readable memory, a non-transitory computer readable storage medium organized into a first memory section, a second memory section, a third memory section, a fourth memory section, a fifth memory section etc.) that stores operational instructions can, when executed by one or more processing modules of one or more computing devices (e.g., one or more servers) of the exchange item marketplace network, cause the one or more computing devices to perform any or all of the method steps described above.

Figure 19A:
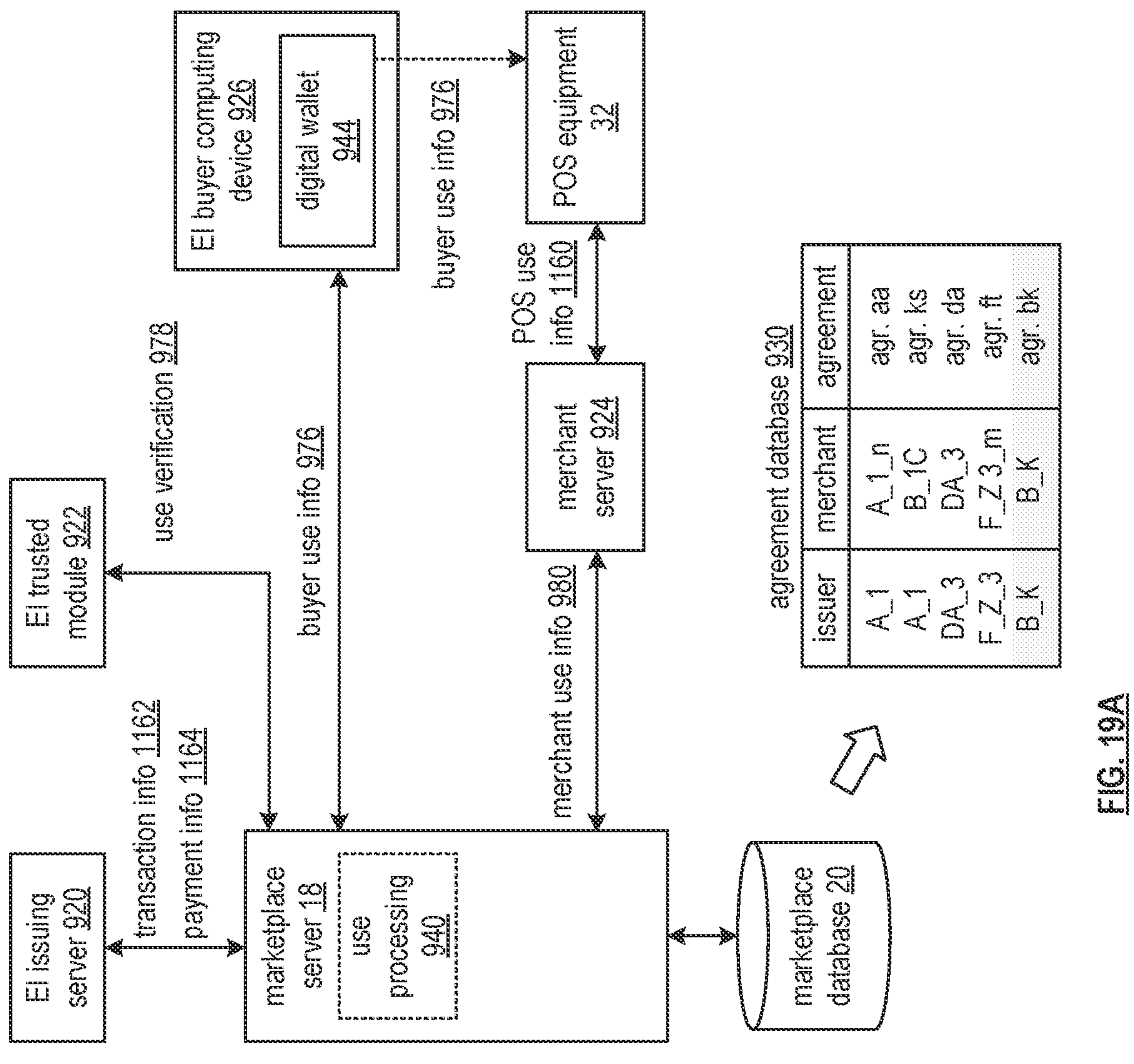
FIG. 19A is a schematic block diagram of another embodiment of an exchange item marketplace network in accordance with the present invention.

FIG. 19A is a schematic block diagram of another embodiment of an exchange item marketplace network that includes the exchange item (EI) issuing server 920 of FIG. 18C, the EI trusted module 922 of FIG. 18C, the EI buyer computing device 926 of FIG. 18C, the point-of-sale (POS) equipment 32 of FIG. 2, the merchant server 924 of FIG. 18C, the marketplace database 20 of FIG. 18C, and the marketplace server 18 of FIG. 18C. The marketplace database 20 includes the agreement database 930 of FIG. 18C. The marketplace server 18 includes the use processing 940 FIG. 18C. The EI buyer computing device 926 includes the digital wallet 944 of FIG. 18C. The entities of the exchange item marketplace network may be directly operably coupled and/or operably coupled via the network 24 of FIG. 18C. The exchange item marketplace network functions to redeem an exchange item.

In an example of operation of the redeeming of the exchange item, the use processing 940 obtains an indication of an exchange item redemption purchase transaction. The obtaining includes one or more of receiving buyer use information 976 from the EI buyer computing device 926, receiving merchant use information 980 from the merchant server 924, where the EI buyer computing device 926 sends the buyer use information 976 to the point-of-sale equipment 32, and where the point-of-sale equipment 32 issues point-of-sale use information 1160 to the merchant server 924. The buyer use information 976, the point-of-sale use information 1160, and the merchant use information 980 may include one or more of a remaining balance of an exchange item, a purchase amount of the purchase transaction (e.g., which may be greater than, equal to, or less than the remaining balance, EI information, EI rules, and identifiers of entities involved in the purchase transaction.

Having obtained the indication of the redemption purchase transaction, the use processing 940 determines an EI rule for the exchange item of the redemption in accordance with an agreement from a brand associated with the EI. The determining includes one or more of interpreting a portion of the agreement database 930, obtaining use verification 978 from the EI trusted module, receiving the EI rule from the EI buyer computing device 926, and verifying the EI rule in accordance with a secure custody protocol (i.e., verify one or more signatures of a contract blockchain).

When the EI rule includes paying in the marketplace server 18 a commission upon redemption of the exchange item (e.g., as identified in the EI rule), these processing 940 issues transaction information 1162 to the EI issuing server 920. The issuing includes generating the transaction information 1162 based on the redemption purchase transaction. The transaction information 1162 includes one or more of the buyer use information 976, the merchant use information 980, an identifier of the exchange item, EI information, a remaining balance of the exchange item, a purchase amount, a difference between the purchase amount and the remaining balance of the EI, an identifier of the EI buyer computing device, an identifier of the merchant server 9 to 24, an identifier of the exchange item market place network, and an identifier of the purchase transaction.

Having sent the transaction information, the use processing 940 receives payment information 1164 from the EI issuing server 920, where the payment information 1164 includes one or more of the transaction identifier, a commission payment to the market place server, payment to the merchant server 924, an indication of an amount retained by the brand of the EI issuing server 920, and the transaction information. Alternatively, the use processing 940 receives the payment information from the merchant server 924, when the merchant server interprets the EI rule and utilizes a portion of payment of the redemption transaction to provide the commission to the marketplace server 18.

Figure 19B:
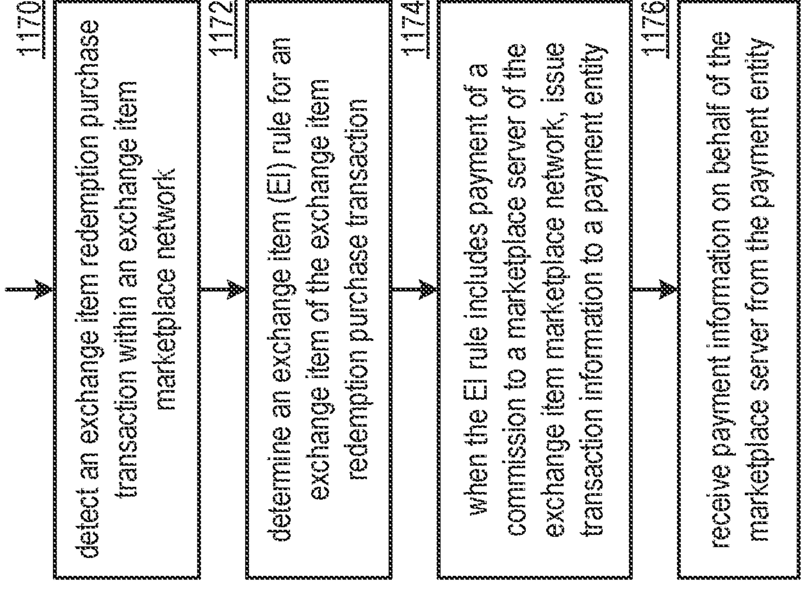
FIG. 19B is a logic diagram of an embodiment of a method for redeeming an exchange item in an exchange item marketplace network in accordance with the present invention.

FIG. 19B is a logic diagram of an embodiment of a method for redeeming an exchange item in an exchange item marketplace network. The method includes step 1170 where a processing module (e.g., the marketplace server) detects an exchange item redemption purchase transaction within an exchange item (EI) market place network. The obtaining includes one or more of receiving buyer use information from an EI buyer computing device, receiving merchant use information from the merchant server, where the EI buyer computing device sends the buyer use information to point-of-sale equipment, and where the point-of-sale equipment issues point-of-sale use information to the merchant server.

The method continues at step 1172 where the processing module determines an exchange item rule for an exchange item of the exchange item redemption purchase transaction. The determining includes one or more of interpreting a portion of an agreement database, obtaining use verification from an EI trusted module, receiving from the EI buyer computing device, and verifying the EI rule in accordance with a secure custody protocol (e.g., verifying one or more signatures, verifying one or more hashes, and verifying one or more nonces of a contract blockchain).

When the EI rule includes payment of a commission to a marketplace server of the exchange item market place network, the method continues at step 1174 where the processing module issues transaction information to a payment entity. The issuing includes generating the transaction information based on the redemption purchase transaction, identifying the payment entity (e.g., performing a lookup, receiving an identifier, and interpreting a query; such as an EI issuing server, a merchant server, etc.) and sending the transaction information to the identified payment entity.

The method continues at step 1176 where the processing module receives payment information on behalf of the marketplace server from the payment entity. Alternatively, the processing module receives the payment information from the merchant server, when the merchant server interprets the EI rule and utilizes a portion of payment of the redemption transaction to provide the commission to the marketplace server. The amount of the payment includes at least one of a percentage of the amount of the EI redeemed, a percentage of the total purchase transactions (i.e., which may be higher than the amount redeemed), a flat rate, a credit with the brand, and a newly created exchange item in the amount of the commission.

Figure 20A:
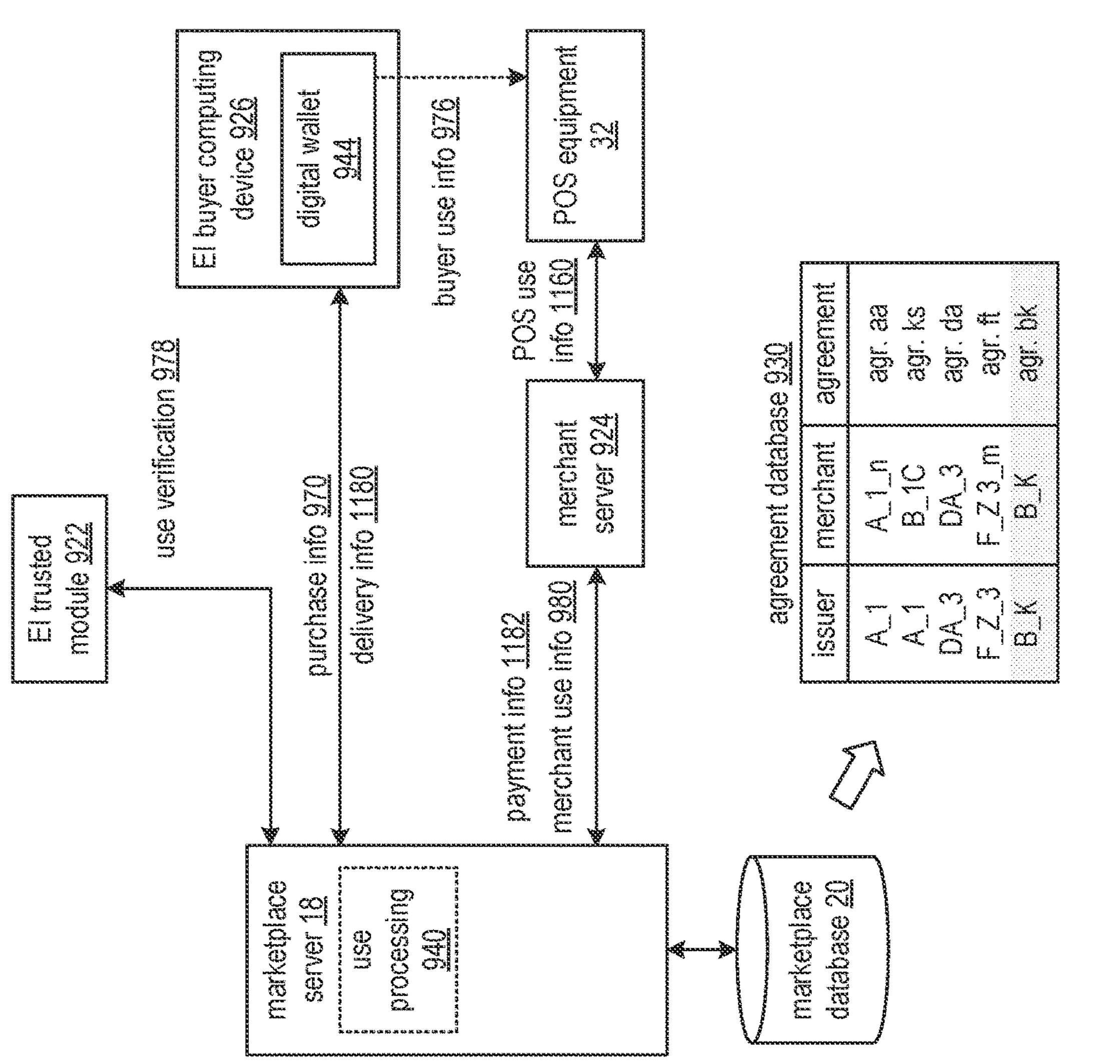
FIG. 20A is a schematic block diagram of another embodiment of an exchange item marketplace network in accordance with the present invention.

FIG. 20A is a schematic block diagram of another embodiment of an exchange item marketplace network that includes the EI trusted module 922 of FIG. 18C, the EI buyer computing device 926 of FIG. 18C, the point-of-sale (POS) equipment 32 of FIG. 2, the merchant server 924 of FIG. 18C, the marketplace database 20 of FIG. 18C, and the marketplace server 18 of FIG. 18C. The marketplace database 20 includes the agreement database 930 of FIG. 18C. The marketplace server 18 includes the use processing 940 FIG. 18C. The EI buyer computing device 926 includes the digital wallet 944 of FIG. 18C. The entities of the exchange item marketplace network may be directly operably coupled and/or operably coupled via the network 24 of FIG. 18C. The exchange item marketplace network functions to trigger payment associated with a purchase transaction.

In an example of operation of the triggering of the payment, the use processing 940 generates a new exchange item (EI) based on purchase information 970 received from the EI buyer computing device 926, where the purchase information 970 indicates a need for an escrow agent function. The purchase information 970 may further include a transaction identifier, a purchase amount, and escrow indicator, EI info, EI rules, and identifiers of entities involved in the purchase transaction. The generating includes one or more of receiving the purchase information 970, detecting an escrow indicator, receiving payment information 1182, generating the new EI with a secure custody protocol, sending the new EI to the digital wallet 944, and storing the new EI in the marketplace database 20.

Having generated the new EI, the use processing 940 detects utilization of the new EI by the EI buyer computing device 926 with regards to initializing the purchase transaction. The detecting includes receiving merchant use information 980 from the merchant server 924, where the EI buyer computing device issues buyer use information 976 to the point-of-sale equipment 32, where the point-of-sale equipment 32 issues point-of-sale use information 1160 to the merchant server 924, and/or receive further purchase information 970 from the EI buyer computing device 926.

Having detected the utilization of the new EI, the use processing 940 determines whether to finalize the purchase transaction to include payment to the merchant server 924. The determining includes one or more of receiving delivery information 1180 from the EI buyer computing device 926, receiving further merchant this information 980 from the merchant server 924 with regards to finalizing the purchase transaction (e.g., including a delivery indicator), interpreting one or more of an agreement and an exchange item rule of the EI, and indicating to finalize the purchase transaction when the received information compares favorably to one or more of the agreement and the EI rule (i.e., delivery has been completed as indicated by one or more of the merchant server, a third party (e.g., a delivery company), and the EI buyer computing device). The delivery information 1180 includes a delivery step confirmation, e.g., order step, ship step, initial delivery step, final delivery step, on-site integration/set up step, and customer signoff step. In a first instance, any one party indicating delivery (e.g., final delivery) triggers finalizing the purchase transaction. In another instance, all parties must indicate delivery (e.g., final delivery) to trigger the finalizing of the purchase transaction.

When finalizing the purchase transaction, the use processing 940 issues payment information 1182 to the merchant server 924. The payment information includes one or more of the transaction ID, payment, and amount retained by the marketplace, and the purchase information 970. The issuing includes generating the payment information 1182 based on the EI and the purchase information 970 and sending the payment information 1182 to the merchant server 924.

Figure 20B:
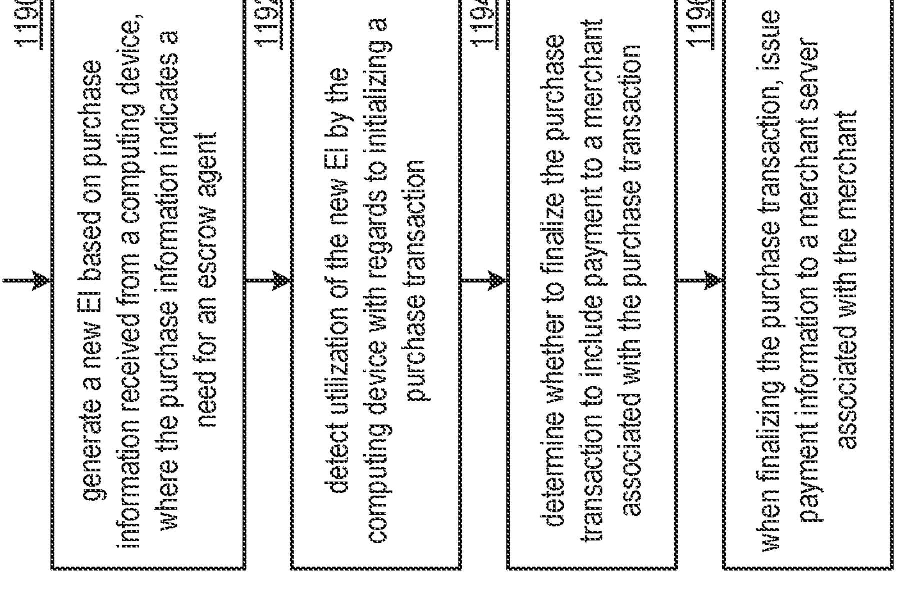
FIG. 20B is a logic diagram of an embodiment of a method for triggering payment in an exchange item marketplace network in accordance with the present invention.

FIG. 20B is a logic diagram of an embodiment of a method for triggering payment in an exchange item marketplace network. The method includes step 1190 where a processing module (e.g., of a marketplace server) generates a new exchange item (EI) based on purchase information received from a computing device, where the purchase information indicates a need for an escrow agent. The generating includes one or more of receiving the purchase information, detecting an escrow indicator, receiving payment information (e.g., funds provided by the computing device), generating a new exchange item in accordance with a secure custody protocol, sending the new exchange item to a digital wallet of the computing device, and storing the new exchange item in a marketplace database.

The method continues at step 1192 where the processing module detects utilization of the new EI by the computing device with regards to initializing a purchase transaction. The detecting includes one or more of receiving merchant use information from a merchant server, where the computing device issues buyer use information to point-of-sale equipment, where the point-of-sale equipment issues point-of-sale use information to the merchant server, and receiving further purchase information from the computing device.

The method continues at step 1194 with a processing module determines whether to finalize the purchase transaction to include payment to a merchant server associated with the purchase transaction. The determining includes one or more of receiving delivery information from the computing device, receiving further merchant use information from the merchant server with regards to finalizing the purchase transaction (i.e., an indication of delivery), interpreting one or more of an agreement and an EI rule of the EI, and indicating to finalize the purchase transaction when the received information compares favorably to the one or more of the agreement and the EI rule (i.e., delivery has been completed as indicated by one or more of the merchant server, a third party, and the computing device).

When finalizing the purchase transaction, the method continues at step 1196 where the processing module issues payment information to a merchant server associated with the merchant. The issuing includes generating the payment information based on the EI and the purchase information and sending the payment information to the merchant server.

Figure 21A:
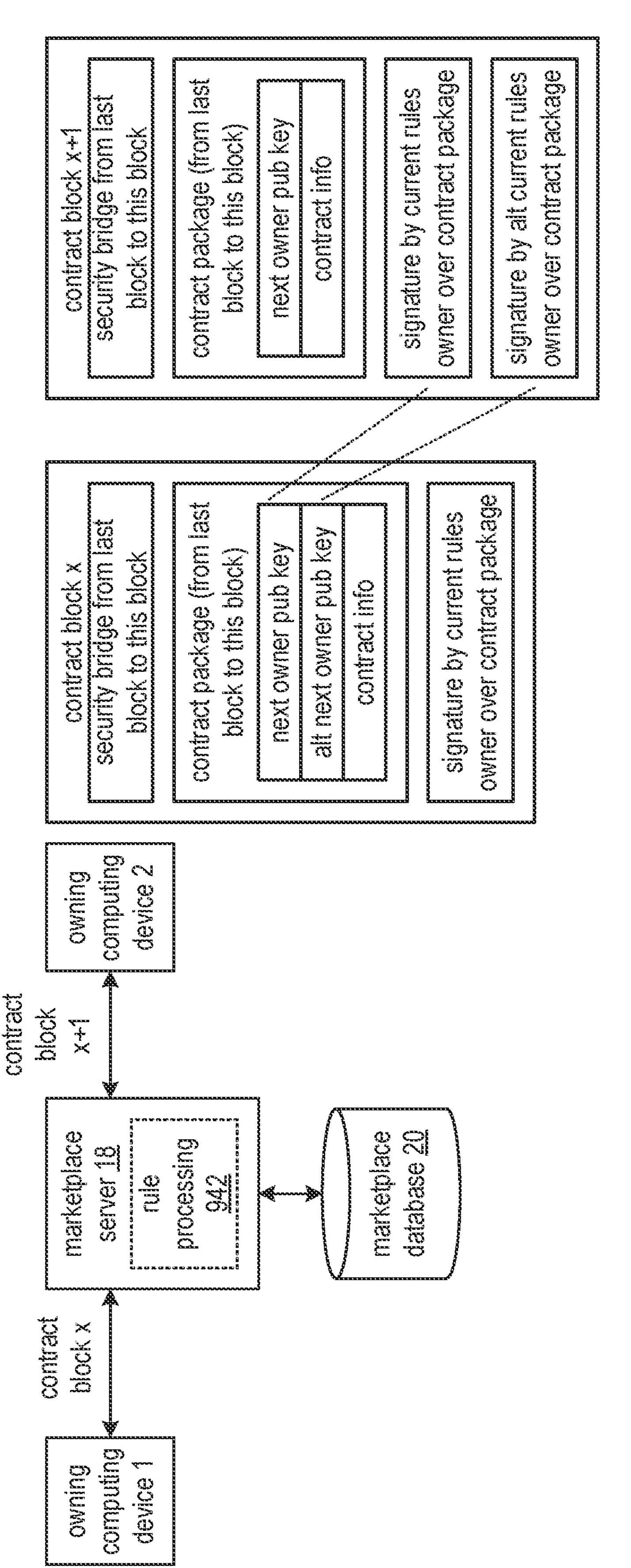
FIG. 21A is a schematic block diagram of another embodiment of an exchange item marketplace network in accordance with the present invention.

FIG. 21A is a schematic block diagram of another embodiment of an exchange item marketplace network that includes the marketplace server 18 of FIG. 18C, the marketplace database 20 of FIG. 18C, an owning computing device 1, and an owning computing device 2. The marketplace server 18 includes several processing 942 of FIG. 18 C. The owning computing devices 1-2 may be implemented utilizing one or more of the initial owner computing device 928 of FIG. 18C and the EI buyer computing device 926 of FIG. 18C. The exchange item marketplace network functions to generate a replacement security parameter.

An example of operation of the generating of the replacement security parameter, rule processing 942 detects a need by the owning computing device 2 to generate a public/private key pair for utilization within a contract blockchain, where each contract block of the contract blockchain includes one or more of a security bridge from the last block to this block, a contract package (i.e., from the last block to this block), and a signature by a current rules owner over the contract package. The detecting includes one or more of receiving a request, detecting a security issue, interpreting a key replacement schedule, and verifying one or more of an agreement and an EI rule that the owning computing device 2 is authorized to generate a new replacement private key for utilization within the contract blockchain. An agreement establishes rules for the exchange item where a particular computing device is allowed to sign a next transaction block after generating a new and/or a replacement private key.

Having detected the need, the rule processing 942 obtains control over the contract blockchain. The obtaining includes invoking an EI rule associated with the contract blockchain with a current owner (i.e., owning computing device 1) to transfer the contract blockchain (i.e., x) to the rule processing 942 (i.e., generate a new contract block to include a public key of the rule processing, sign in a private key of the owning computing device 1), receiving the contract blockchain from the owning computing device 1, and verifying the contract blockchain (i.e., verify one or more of hashes, signatures, nonces).

Having obtained control, in accordance with the EI rule, the rule processing 942 generates a next contract block (i.e. x+1) include a public key of the owning computing device 2 and a signature by the owning computing device 2 (i.e., alternative current rules owner) utilizing the new replacement private key. The generating includes one or more of sending the next contract block to the owning computing device 2, where the owning computing device 2 provides the signature with the new private key, and receiving an updated next contract block from the owning computing device 2. Alternatively, or in addition to, the owning computing device 2 adds a new signature to two or more contract blocks of the contract blockchain. Contract information of the contract package indicates that a signature (i.e., utilizing and associated private key) by either of the next owner or an alternate current rules owner is acceptable. The additional signature may be further retroactively embedded in more contract blocks (e.g., at the public key and the signatures using the private key of the new key pair).

Having generated the next contract block, the rule processing 942 returns control over the contract blockchain. The returning of the control includes adding another contract block indicating that the owning computing device 1 is the next owner (i.e., adding the public key of the owning computing device 1, and signing utilizing a private key of the rule processing 942), and sending the updated blockchain to the owning computing device 1.

Figure 21B:
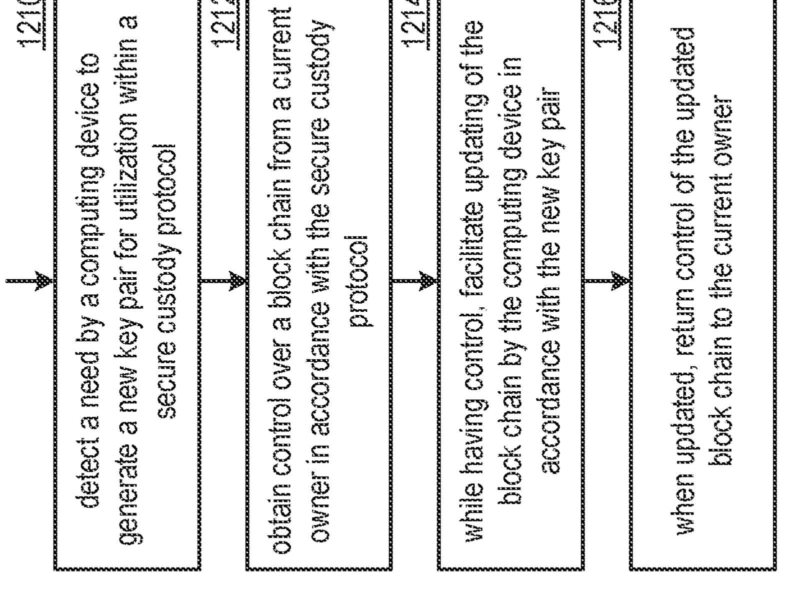
FIG. 21B is a logic diagram of an embodiment of a method for generating a replacement security parameter in an exchange item marketplace network in accordance with the present invention.

FIG. 21B is a logic diagram of an embodiment of a method for generating a replacement security parameter in an exchange item marketplace network. The method includes step 1210 where a processing module (e.g., of a marketplace server) detects a need by a computing device to generate a new key pair for utilization within a secure custody protocol. The detecting includes one or more of receiving a request, detecting a security issue, interpreting a key replacement schedule, verifying one or more of an agreement and an EI rule that the computing device is authorized to generate a new and/or replacement private key for the utilization within a contract blockchain of the secure custody protocol.

The method continues at step 1212 where the processing module obtains control over a blockchain from a current owner in accordance with the secure custody protocol. The obtaining includes one or more of invoking an EI rule associated with the contract blockchain with the current owner to transfer the contract blockchain to the processing module (i.e., generate the contract block to include a public key of the processing module, sign utilizing the private key of the current owner), receiving the contract blockchain, and verifying the contract blockchain (i.e., verifying signatures, hashes, nonces).

While having control, the method continues at step 1214 for the processing module facilitates updating of the blockchain by the computing device in accordance with the new key pair. The facilitating includes one or more of sending a next contract block to the computing device, where the computing device provides a signature with a new private key, and receiving an updated next contract block from the computing device. Alternatively, or in addition to, the computing device adds a new signature to two or more contract blocks of the contract blockchain.

When updated, the method continues at step 1216 where the processing module returns control of the updated blockchain to the current owner. The returning of the control includes one or more of adding another contract block indicating that the current owner is the next owner (i.e., adding a public key of the current owner and signing utilizing a private key of the processing module), sending the updated blockchain to the current owner, storing the updated blockchain in a marketplace database, and publishing the updated blockchain to other entities of the exchange item marketplace network associated with exchange item.

Figure 22A:
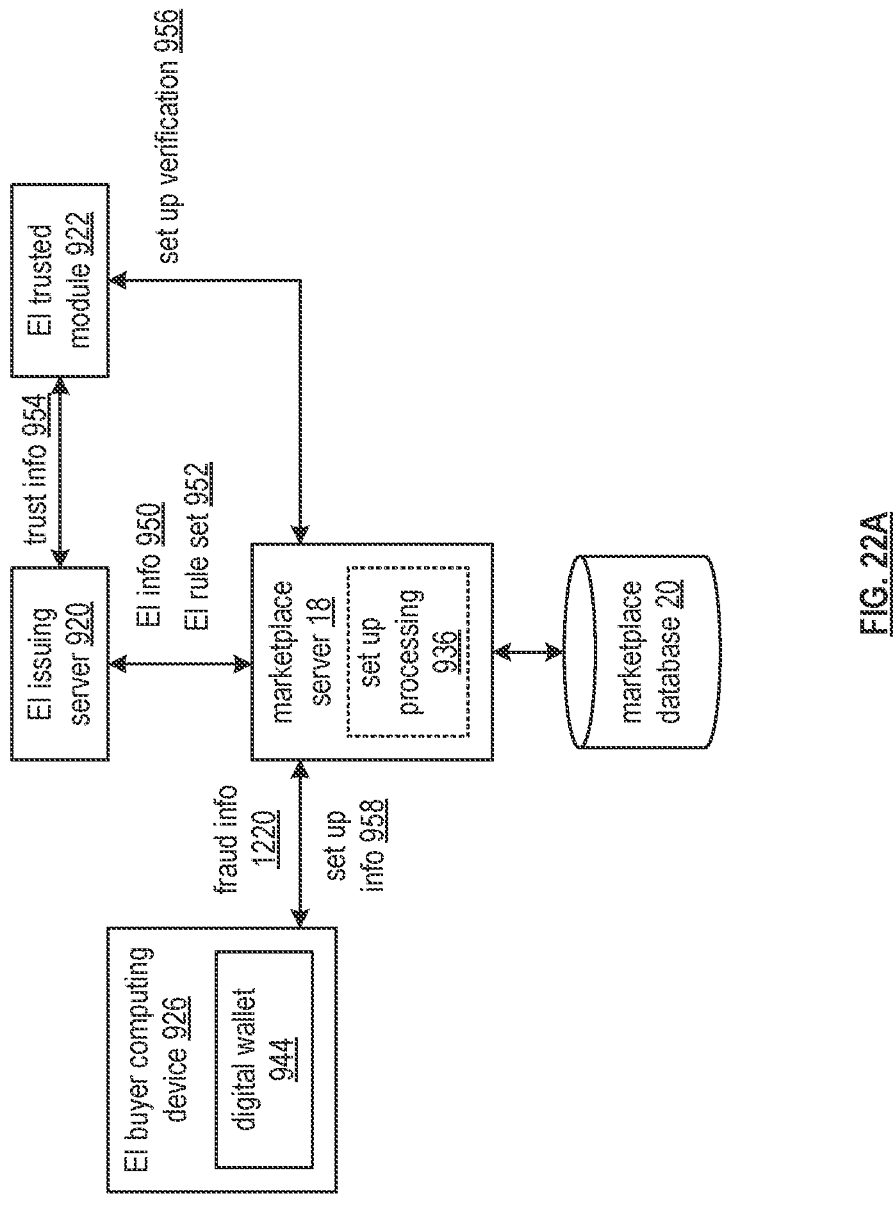
FIG. 22A is a schematic block diagram of another embodiment of an exchange item marketplace network in accordance with the present invention.

FIG. 22A is a schematic block diagram of another embodiment of an exchange item marketplace network that includes the exchange item (EI) issuing server 920 of FIG.

18C, the EI trusted module 922 of FIG. 18C, the EI buyer computing device 926 of FIG. 18C, the marketplace database 20 of FIG. 18C, and the marketplace server 18 of FIG. 18C. The marketplace server 18 includes the set up processing 936 FIG. 18C. The EI buyer computing device 926 includes the digital wallet 944 of FIG. 18C. The entities of the exchange item marketplace network may be directly operably coupled and/or operably coupled via the network 24 of FIG. 18C. The exchange item marketplace network functions to abate fraud.

In an example of operation of the abating of the fraud, the set up processing 936 identifies a potentially fraudulent exchange item (EI) associated with the exchange item marketplace network. The identified includes one or more of detecting an unfavorable condition associated with a secure custody protocol (i.e., verification of one or more of a nonce, a hash, and a signatures unfavorable), receiving an alert, receiving fraud information 1220 from the EI buyer computing device 926, identifying another exchange item associated with the exchange item, where the other exchange item is a fraudulent exchange item (i.e., associated with a common selling computing device, associated with a common payment instrument such as a stolen credit card).

Having identified the potentially fraudulent EI, the set up processing 936 determines a fraud abatement approach. The fraud abatement approach includes one or more of replacing exchange item, retiring the exchange item, marking the exchange item as fraudulent, and modifying the exchange item. The determining includes one or more of interpreting one or more of a rule, an agreement, a use option associated with the EI (i.e., recover from the marketplace database 20), and selecting the fraud abatement approach based on the interpretation. For example, select replacing the exchange item when the current owner (i.e., the EI buyer computing device 926, as a verified owner) is not likely a root cause of the fraud.

When the fraud abatement approach includes replacing the EI, the set up processing 936 invokes control over the exchange item. The invoking includes securely transferring a transaction blockchain from one or more of the EI buyer computing device and the marketplace database to the marketplace server 18 (i.e., establish the marketplace server as the next owner in accordance with an EI rule).

Having invoked the control, the set up processing 936 obtains new EI information 950 and replaces the EI information of the transaction blockchain. The obtaining includes receiving the EI information 950 and an EI rule set 952 from the EI issuing server 920, where the EI issuing server 920 exchanges trust information 954 with the EI trusted module 922, and where the marketplace server 18 exchanges set up verification 956 with the EI trusted module 922 to reestablish the secure custody protocol. The replacing includes updating the exchange item to include the EI info 950 to produce an updated exchange item.

Having replaced the EI information, the set up processing 936 returns control of the updated exchange item with the verified owner. The returning of the control includes updating the transaction blockchain to indicate that the verified owner is the next owner and sending the updated transaction blockchain as set up information 958 to the verified owner (i.e., the EI buyer computing device 926).

Figure 22B:
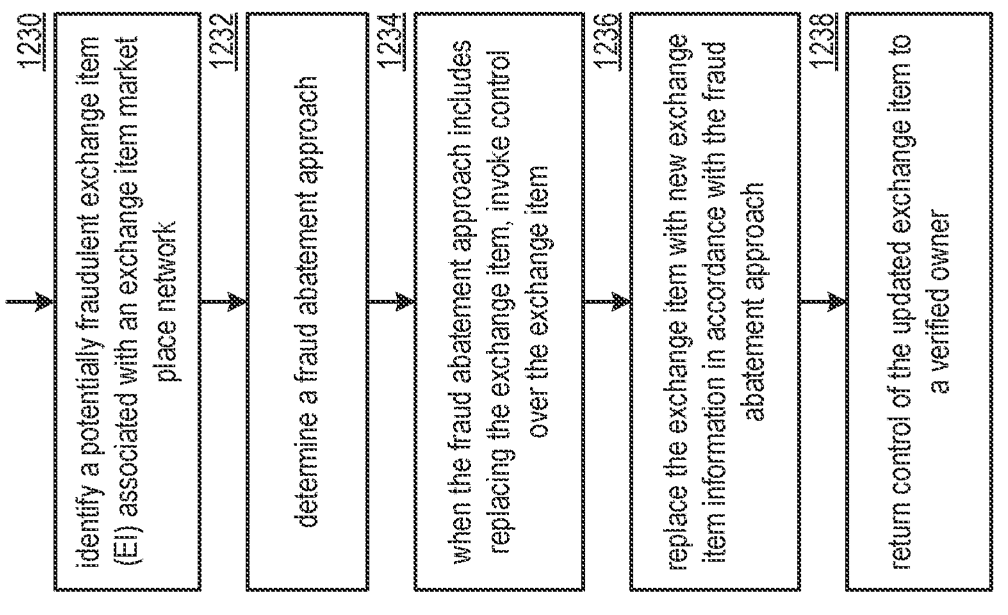
FIG. 22B is a logic diagram of an embodiment of a method for abating fraud in an exchange item marketplace network in accordance with the present invention.

FIG. 22B is a logic diagram of an embodiment of a method for abating fraud in an exchange item marketplace network. The method includes step 1230 where a processing module (e.g., of a marketplace server) identifies a potentially fraudulent exchange item (EI) associated with the exchange item marketplace network. The identified includes one or more of detecting an unfavorable condition associated with a secure custody protocol (i.e., verification of one or more of a nonce, a hash, and a signature is unfavorable), receiving an alert, identifying another exchange item associated with exchange item, where the other exchange item is a known fraudulent exchange item.

The method continues at step 1232 where the processing module determines a fraud abatement approach. The determining includes interpreting one or more of a rule, an agreement, and a use option associated with the EI, and selecting the fraud abatement approach based on interpretation. For example, select a replacing the exchange item approach when a current owner is not likely a root cause of the fraud, and an EI rule indicates to replace the exchange item in such a scenario.

When the fraud abatement approach includes replacing the exchange item, the method continues at step 1234 where the processing module invokes control over the exchange item. The invoking of the control includes securely transferring a transaction blockchain to the processing module as a next owner in accordance with another EI rule. The method continues at step 1236 where the processing module replaces the exchange item with new exchange item information in accordance with the fraud abatement approach. For example, the processing module obtains the new exchange item information by one or more of receiving the new EI info and an EI rule set from an EI issuing server, where the EI issuing server exchanges trust information within an EI trusted module, and where the processing module exchanges set up verification with the EI trusted module to reestablish the secure custody protocol, and updates the exchange item with the obtained new exchange item info to produce an updated exchange item.

The method continues at step 1238 where the processing module returns control of the updated exchange item to a verified owner. The returning of the control includes updating the transaction blockchain to indicate that the verified owner is the next owner and sending the updated blockchain to the verified owner.

Figure 23A:
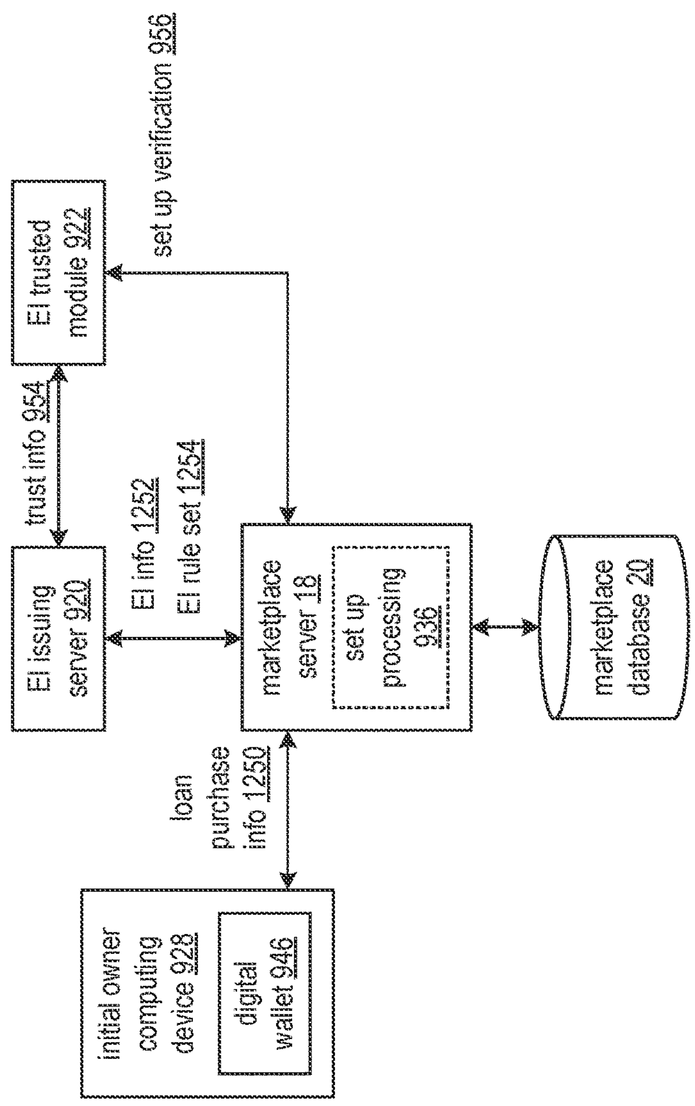
FIG. 23A is a schematic block diagram of another embodiment of an exchange item marketplace network in accordance with the present invention.

FIG. 23A is a schematic block diagram of another embodiment of an exchange item marketplace network that includes the exchange item (EI) issuing server 920 of FIG. 18C, the EI trusted module 922 of FIG. 18C, the initial owner computing device 928 of FIG. 18C, the marketplace database 20 of FIG. 18C, and the marketplace server 18 of FIG. 18C. The marketplace server 18 includes the set up processing 936 FIG. 18C. The initial owner computing device 928 includes the digital wallet 946 of FIG. 18C. The entities of the exchange item marketplace network may be directly operably coupled and/or operably coupled via the network 24 of FIG. 18C. The exchange item marketplace network functions to create temporary credit.

In an example of operation of the creating of the temporary credit, the set up processing 936 receives loan purchase information 1250 from the initial owner computing device 928 to establish credit for acquisition of an exchange item (e.g., cash, store credit, etc.), where the initial computing device generates the loan purchase information 1250 and sends the loan purchase information 1250 to the marketplace server 18. The loan purchase information includes one or more of an exchange item type (i.e., cash, brand, other, etc.), a borrower identifier, a credit line, an outstanding balance, a maximum draw, an interest rate, use restrictions, payback terms, a payback instrument (i.e., a credit card, a bank account number, another exchange item), collateral (i.e., another exchange item owned by the borrower), and a cosigner identifier (ID).

Having received the loan purchase information 1250, the set up processing 936 determines whether to establish the requested credit. The determining may be based on one or more of a requester ID, the loan purchase information, a credit rating associated with a requester ID, and an interpretation of a query response with regards to finding a backing creditor/cosigner (i.e., a brand, where use restrictions specified or utilization the exchange item, for example, for purchase of items with the brand only). For example, one or more EI issuing servers may indicate a willingness to provide credit in terms of a credited outstanding balance for an exchange item tied to a brand of a particular EI issuing server.

When establishing the requested credit, the set up processing 936 generates the exchange item in accordance with the determination to establish the requested credit. The generating includes one or more of exchanging EI information 1252 and an EI rule set 1254 with the EI issuing server, verifying the EI information by exchanging set up verification 956 with the EI trusted module 922, where the EI trusted module 922 exchanges trust information 954 with the EI issuing server 920, and imposing any additional rules and use options in accordance with credit approval (i.e., restrictions imposed by a third-party).

Having generated exchange item, the set up processing 936 transfers the exchange item to the initial owner computing device 928 in accordance with a secure custody protocol. For example, the set up processing 936 generates a transaction blockchain to include the exchange item and sends the transaction blockchain to the initial owner computing device 928 (i.e., as a next owner of the transaction blockchain) as further loan purchase information 1250.

Figure 23B:
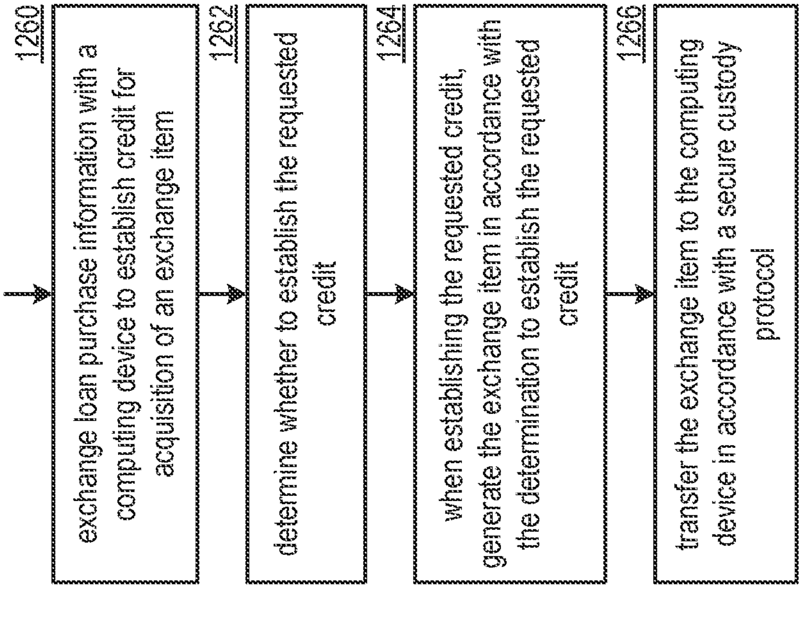
FIG. 23B is a logic diagram of an embodiment of a method for creating temporary credit in an exchange item marketplace network in accordance with the present invention.

FIG. 23B is a logic diagram of an embodiment of a method for creating temporary credit in an exchange item marketplace network. The method includes step 1260 where processing module (e.g., of a marketplace server) exchanges loan purchase information with a computing device to establish credit for acquisition of an exchange item, where the computing device generates the loan purchase information, sends the loan purchase information to the marketplace server, sends loan purchase information back to the computing device indicating options, and the marketplace server receives a selection from the options.

The method continues at step 1262 where the processing module determines whether to establish the requested credit. The determining may be based on one or more of a requester identifier, the loan purchase information, a credit rating of the requester, and an interpretation of a query response with regards to finding a further creditor (i.e., a brand). When establishing the requested credit, the method continues at step 1264 where the processing module generates the exchange item in accordance with the determination to establish the requested credit. For example, the processing module exchanges EI information and an EI rule set with a brand server, verifies EI information, and imposes additional rules and use options in accordance with credit approval (e.g., restrictions imposed by the brand and/or a third-party).

The method continues at step 1266 where the processing module transfers the exchange item to the computing device in accordance with a secure custody protocol. For example, the processing module generates a transaction blockchain to include the exchange item and sends the transaction blockchain to the computing device, where the computing device is associated as a next owner.

Figure 24A:
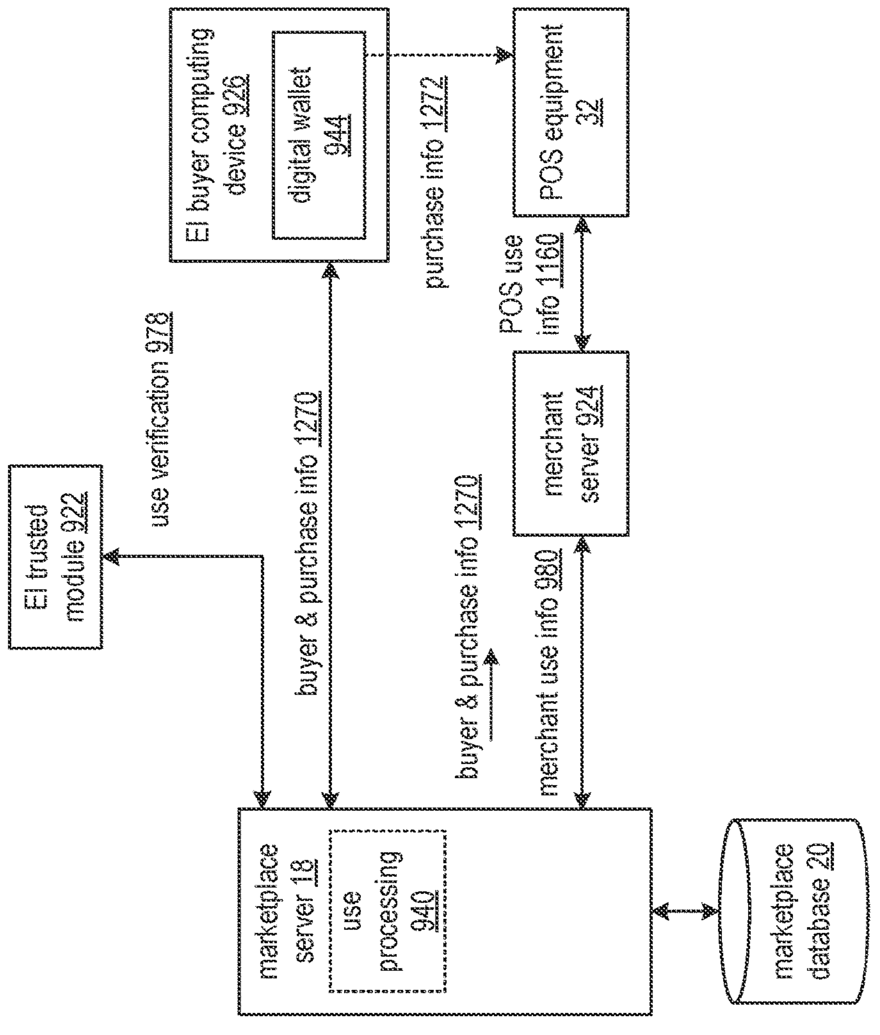
FIG. 24A is a schematic block diagram of another embodiment of an exchange item marketplace network in accordance with the present invention.

FIG. 24A is a schematic block diagram of another embodiment of an exchange item marketplace network that includes the EI trusted module 922 of FIG. 18C, the EI buyer computing device 926 of FIG. 18C, the point-of-sale (POS) equipment 32 of FIG. 2, the merchant server 924 of FIG. 18C, the marketplace database 20 of FIG. 18C, and the marketplace server 18 of FIG. 18C. The marketplace server 18 includes the use processing 940 FIG. 18C. The EI buyer computing device 926 includes the digital wallet 944 of FIG. 18C. The entities of the exchange item marketplace network may be directly operably coupled and/or operably coupled via the network 24 of FIG. 18C. The exchange item marketplace network functions to reveal an identity associated with a purchase transaction.

In an example of operation of the revealing of the identity, these processing 940 receives, from the EI buyer computing device 926, an indication of a purchase transaction utilizing an exchange item. For example, the use processing 940 receives buyer and purchase information 1270 from the EI buyer computing device 926. As another example, the use processing 940 receives merchant use information 980 from the merchant server, where the EI buyer computing device 926 issues purchase information 1272 to the point-of-sale equipment 32, and where the point-of-sale equipment 32 issues point-of-sale use information 1160 to the merchant server 924. The buyer and purchase information includes one or more of a transaction blockchain, a contract blockchain, a buyer identifier (ID), buyer purchase history, a transaction ID, a purchase amount, EI information, EI rules, and identifiers associated with the purchase transaction. The purchase information includes a subset of the buyer and purchase information. For example, the purchase information includes one or more of the transaction blockchain, the contract blockchain, a transaction ID, the purchase amount, the EI information, and the EI rules.

Having received the indication of the purchase transaction, the use processing 940 determines whether buyer information (i.e., confidential/private information) is to be accessed by the merchant server 924. The determining includes one or more of receiving an instruction and interpreting one or more of an agreement, and EI rule, a deception, and conditions. For example, the use processing 940 indicates to share the buyer information with the merchant server 924 when an EI rule associated with an exchange item of the purchase transaction indicates that the sharing is allowed.

When the buyer information is to be accessed by the merchant server, the use processing 940 facilitates accessing, by the merchant server 924, the buyer information. The facilitating includes one or more of sending, in accordance with a secure custody protocol, the buyer and purchase information 1272 the merchant server 924, where the buyer and purchase information includes the buyer information for extraction by the merchant server 924.

Having facilitated the access, these processing 940 facilitates completion of the purchase transaction. For example, these processing 940 updates a transaction blockchain associated with exchange item to indicate utilization of the exchange item for payment of the purchase transaction and updates the marketplace database 20 to indicate completion of the purchase transaction.

Figure 24B:
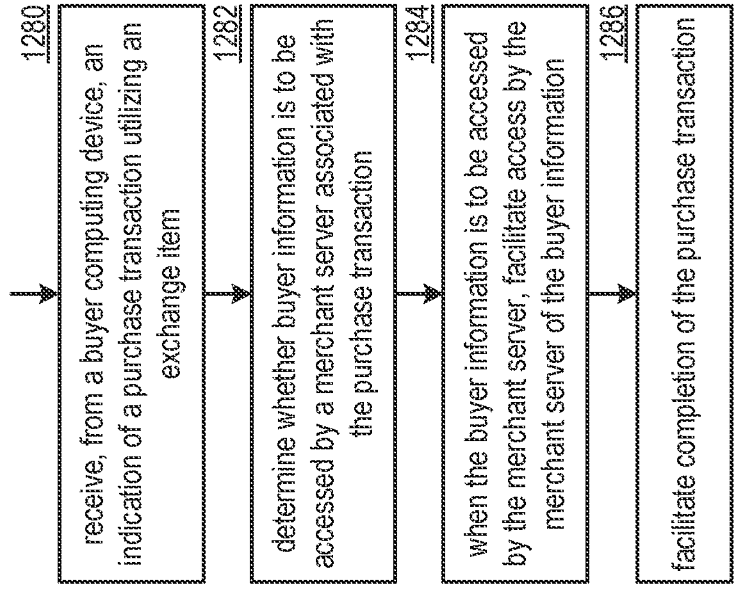
FIG. 24B is a logic diagram of an embodiment of a method for revealing an identity in an exchange item marketplace network in accordance with the present invention.

FIG. 24B is a logic diagram of an embodiment of a method for revealing an identity in an exchange item marketplace network. The method includes step 1280 where a processing module (e.g., of a marketplace server) receives, from a buyer computing device, an indication of a purchase transaction utilizing an exchange item. The receiving includes one or more of receiving buyer purchase information from the buyer computing device, receiving merchant use information from a merchant server, where the buyer computing device issues purchase information to point-of-sale equipment, and where the point-of-sale equipment issues point-of-sale use information to the merchant server.

The method continues at step 1282 where the processing module determines whether buyer information is to be accessed by a merchant server associated with the purchase transaction. The determining includes interpreting one or more of an agreement, and EI rule, and conditions. When the buyer information is to be accessed by the merchant server, the method continues at step 1284 where the processing module facilitates access by the merchant server of the buyer information. For example, the processing module sends, in accordance with a secure custody protocol, the buyer and purchase information to the merchant server, where the buyer in purchase information includes the buyer information for extraction by the merchant server.

The method continues at step 1286 for the processing module facilitates completion of the purchase transaction. The facilitating includes updating a transaction blockchain associated with exchange item to indicate utilization of the exchange item for payment of the purchase transaction and updating a marketplace database based on the updated transaction blockchain.

Figure 25A:
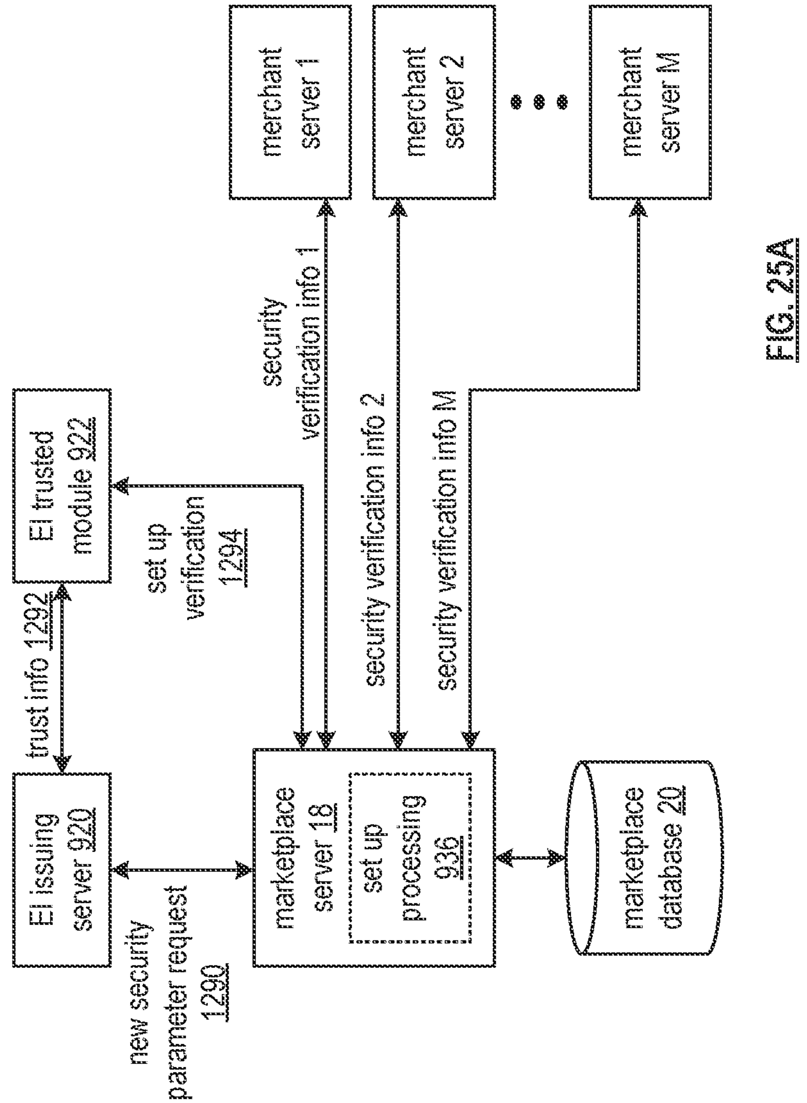
FIG. 25A is a schematic block diagram of another embodiment of an exchange item marketplace network in accordance with the present invention.

FIG. 25A is a schematic block diagram of another embodiment of an exchange item marketplace network that includes the exchange item (EI) issuing server 920 of FIG. 18C, the EI trusted module 922 of FIG. 18C, a plurality of merchant servers 1-M, the marketplace database 20 of FIG. 18C, and the marketplace server 18 of FIG. 18C. Each merchant server may be implemented utilizing the merchant server 924 of FIG. 18C. The marketplace server 18 includes the set up processing 936 FIG. 18C. The entities of the exchange item marketplace network may be directly operably coupled and/or operably coupled via the network 24 of FIG. 18C. The exchange item marketplace network functions to authorize replacement of a security parameter.

In an example of operation of the authorizing of the replacement of the security parameter, the set up processing 936 receives a new security parameter adoption request 1290 from the EI issuing server 920. The new security parameter request 1290 includes one or more of a request type opcode, and identifier of the EI issuing server, an alternate signature signed utilizing an alternate private key associated with a known validated public key of the EI issuing server, another verification mechanism, a new public key that is signed, and a unique security verification code for each merchant server. The receiving includes, where the EI issuing server 920 detects an anomaly with one or more security parameters (i.e., a lost private key utilized to sign elements of a security custody protocol utilized in the exchange item marketplace network), generates the security parameter request indicating that a private key has been lost, where the generating may further indicate which exchange items are associated with the lost private key (i.e., exchange items are associated with one or more of a transaction blockchain and a contract blockchain that includes signatures utilizing the lost private key).

Having received the new security parameter request 1290, the set up processing 936 identifies a subset of merchant servers of the plurality of merchant servers to facilitate verification of a replacement security parameter. The identifying includes one or more of interpreting an agreement, accessing a list, and interpreting an EI rule associated with an EI that is affiliated with the detected anomaly.

Having identified the subset of merchant servers, the set up processing 936 forwards a portion of the new security parameter request 1290 each of the merchant servers of the identified subset of merchant servers. For example, for each merchant server, the set up processing 936 forwards a unique security verification code corresponding to the merchant server along with a new public key that is paired with a new private key of a replacement public/private key pair. Having forwarded the portion of the new security parameter, the set up processing 936 receives security verification information from at least some of the merchant servers indicating a verification result. For example, the set up processing 936 receives a security verification 1 from the merchant server 1, where the security verification 1 indicates whether the merchant server 1 has verified the corresponding unique security verification code for the merchant server 1.

When receiving a threshold number of favorable verification results from the merchant servers, the set up processing 936 facilitates completion of the security parameter adoption. The facilitating includes one or more of exchanging set up verification 1294 with the EI trusted module 922, where the EI trusted module and hundred and 22 exchanges trust information 1292 with the EI issuing server 920 with regards to the new security parameter, and may modify one or more exchange items in the marketplace database 20 in accordance with the new security parameter. For example, the set up processing 936 acquire signatures from the EI issuing server 920 (i.e. utilizing the new private key) of transaction blocks and contract blocks and stores corresponding updated transaction blockchains and contract blockchains in the marketplace database 20. Alternatively, or in addition to, the set up processing 936 forwards the updated transaction blockchains and updated contract blockchains to one or more computing devices associated with exchange items that have been updated.

Figure 25B:
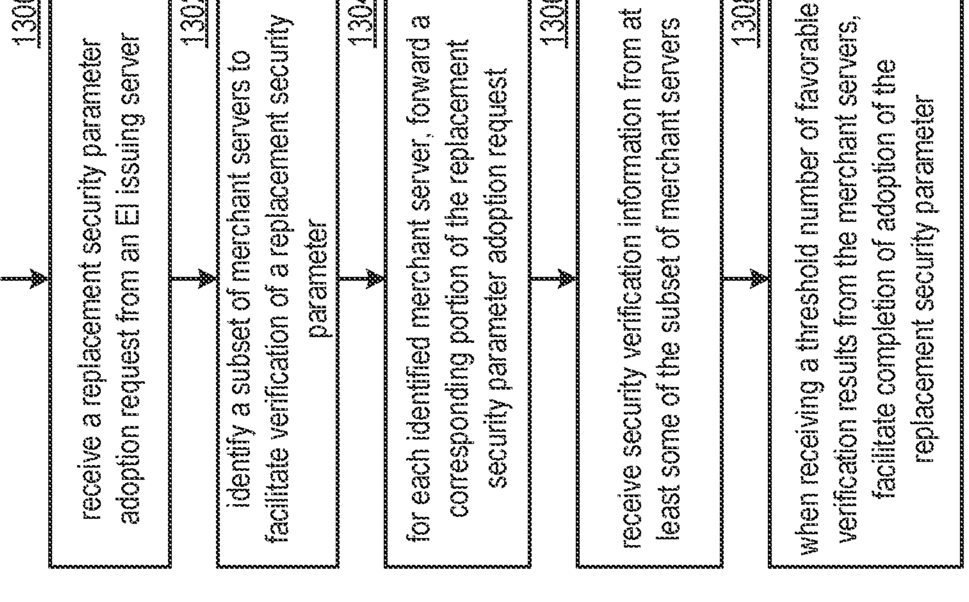
FIG. 25B is a logic diagram of an embodiment of a method for authorizing replacement of a security parameter in an exchange item marketplace network in accordance with the present invention.

FIG. 25B is a logic diagram of an embodiment of a method for authorizing replacement of a security parameter in an exchange item marketplace network. The method includes step 1300 where a processing module (e.g., of a marketplace server) receives a replacement security parameter adoption request from an exchange item (EI) issuing server, where the EI issuing server detects an anomaly with one or more security parameters (i.e., a lost private key utilized to sign elements of a secure custody protocol utilized in an exchange item marketplace network) and generates the secure parameter request indicating that a private key has been lost, where the generating may further indicate which exchange items are associated with the lost private key.

The method continues at step 1302 where the processing identifies a subset of merchant servers to facilitate verification of a replacement security parameter. The identifying includes interpreting one or more of an agreement and an EI rule associated with the EI issuing server extracted from files of the merchant servers. For each identified merchant server, the method continues at step 1304 where the processing module forwards a corresponding portion of the replacement security parameter adoption request. For example, the processing module forwards a unique security verification code corresponding to the merchant server along with a new public key that is paired with a new private key (e.g., of a replacement public/private key pair) of the EI issuing server.

The method continues at step 1306 where the processing module receives security verification information from at least some of the subset of merchant servers, where each merchant server verifies the unique security verification code and indicates a corresponding verification result (e.g., valid, invalid). When receiving a threshold number of favorable verification results from the merchant servers, the weather continues at step 1308 where the processing module facilitates completion of adoption of the replacement security parameter. The facilitating includes one or more of exchanging set up verification information with an EI trusted module, where the EI trusted module exchanges trust information with the EI issuing server with regards to the new security parameter, modifying one or more exchange items in a marketplace database in accordance with the new security parameter (i.e., acquiring signatures of blocks utilized with a secure custody protocol using the new security parameter), and sending them modified exchange items to one or more computing devices of the exchange item marketplace network.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue"

indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a marketplace server of a data communication system, the method comprising:

detecting a need by a second computing device of the data communication system to generate a new public/private key pair for utilization within a contract blockchain, wherein each contract block of the contract blockchain includes a contract package that includes one or more of contract information and a next owner public key, and wherein a first computing device of the data communication system is a current owner of the contract blockchain;

obtaining control over the contract blockchain from the first computing device in accordance with a secure custody protocol associated with the contract blockchain;

generating a next contract block of the contract blockchain in accordance with the secure custody protocol, wherein the next contract block includes an updated contract package that includes updated contract information that indicates signatures from the first computing device or the second computing device is acceptable for adding an additional contract block to the contract blockchain, and wherein the next contract block includes a signature of the second computing device utilizing a private key of the new public/private key pair over the updated contract package; and returning control of the contract blockchain to the first computing device in accordance with the secure custody protocol.

2. The method of claim 1, wherein the detecting comprises one or more of:

receiving a request;

detecting a security issue;

interpreting a key replacement schedule;

verifying an agreement indicates the second computing device is authorized to generate the new public/private key pair for utilization within the contract blockchain; and verifying an exchange item rule associated with an exchange item associated with the contract blockchain indicates the second computing device is authorized to generate the new public/private key pair for utilization within the contract blockchain.

3. The method of claim 1, wherein the obtaining control comprises one or more of:

invoking an exchange item rule associated with the contract blockchain with the current owner to transfer the contract blockchain to the marketplace server;

receiving the contract blockchain from the first computing device; and verifying the contract blockchain.

4. The method of claim 3, wherein the transferring the contract blockchain comprises:

generating a new contract block for the contract blockchain, wherein the new contract block includes a public key of the marketplace server, a public key of the second computing device, and a signature based on a private key of the first computing device.

5. The method of claim 3, wherein the verifying the contract blockchain comprises one or more of:

verifying a hash of the contract blockchain;

verifying one or more signatures of the contract blockchain; and verifying a nonce of the contract blockchain.

6. The method of claim 1, wherein the each contract block of the contract blockchain further comprises one or more of:

a security bridge from a previous contract block of the contract blockchain to a current contract block of the contract blockchain; and a current signature by a current rules owner over the contract package.

7. The method of claim 1, wherein the generating the next contract block includes one or more of:

sending the next contract block to the second computing device; and receiving the next contract block from the second computing device that includes the signature generated with the private key of the new public/private key pair.

8. The method of claim 1, wherein the contract information further comprises one or more of:

a set of exchange item rules associated with an exchange item of the contract blockchain;

exchange item information regarding one or more exchange items;

merchant identifiers;

exchange item issuer identifiers;

an exchange item serial number associated with the exchange item;

use options associated with the exchange item; and an exchange item owner identifier.

9. The method of claim 1, wherein the next contract block further comprises:

a signature by the first computing device over the updated contract package.

10. The method of claim 1, wherein the returning control comprises:

adding another contract block to the contract blockchain to produce an updated contract blockchain that indicates the first computing device is a next owner of the contract blockchain; and sending the updated contract blockchain that includes the other contract block to the first computing device.

11. A marketplace server of a data communication system, the marketplace server comprising:

memory;

an interface; and a processing module, wherein the processing module is operably coupled to the memory and the interface, and wherein the processing module is operable to:

detect a need by a second computing device of the data communication system to generate a new public/private key pair for utilization within a contract blockchain, wherein each contract block of the contract blockchain includes a contract package that includes one or more of contract information and a next owner public key, and wherein a first computing device of the data communication system is a current owner of the contract blockchain;

obtain control over the contract blockchain from the first computing device in accordance with a secure custody protocol associated with the contract blockchain;

generate a next contract block of the contract blockchain in accordance with the secure custody protocol, wherein the next contract block includes an updated contract package that includes updated contract information that indicates signatures from the first computing device or the second computing device is acceptable for adding an additional contract block to the contract blockchain, and wherein the next contract block includes a signature of the second computing device utilizing a private key of the new public/private key pair over the updated contract package; and return control of the contract blockchain to the first computing device in accordance with the secure custody protocol.

12. The marketplace server of claim 11, wherein the processing module is further operable to perform the detecting the need by one or more of:

receiving, via the interface, a request;

detecting a security issue;

interpreting a key replacement schedule;

verifying an agreement indicates the second computing device is authorized to generate the new public/private key pair for utilization within the contract blockchain; and verifying an exchange item rule associated with an exchange item associated with the contract blockchain indicates the second computing device is authorized to generate the new public/private key pair for utilization within the contract blockchain.

13. The marketplace server of claim 11, wherein the processing module is further operable to perform the obtaining control by one or more of:

invoking an exchange item rule associated with the contract blockchain with the current owner to transfer the contract blockchain to the marketplace server;

receiving, via the interface, the contract blockchain from the first computing device; and verifying the contract blockchain.

14. The marketplace server of claim 13, wherein the processing module is further operable to perform the transferring the contract blockchain by:

generating a new contract block for the contract blockchain, wherein the new contract block includes a public key of the marketplace server, a public key of the second computing device, and a signature based on a private key of the first computing device.

15. The marketplace server of claim 13, wherein the processing module is further operable to perform the verifying the contract blockchain by one or more of:

verifying a hash of the contract blockchain;

verifying one or more signatures of the contract blockchain; and verifying a nonce of the contract blockchain.

16. The marketplace server of claim 11, wherein the processing module is further operable to determine that each contract block of the contract blockchain further comprises one or more of:

a security bridge from a previous contract block of the contract blockchain to a current contract block of the contract blockchain; and a current signature by a current rules owner over the contract package.

17. The marketplace server of claim 11, wherein the processing module is further operable to perform the generating the next contract block by one or more of:

sending, via the interface, the next contract block to the second computing device; and receiving, via the interface, the next contract block from the second computing device that includes the signature generated with the private key of the new public/private key pair.

18. The marketplace server of claim 11, wherein the processing module is further operable to determine the contract information further includes one or more of:

a set of exchange item rules associated with an exchange item of the contract blockchain;

exchange item information regarding one or more exchange items;

merchant identifiers;

exchange item issuer identifiers;

an exchange item serial number associated with the exchange item;

use options associated with the exchange item; and an exchange item owner identifier.

19. The marketplace server of claim 11, wherein the processing module is further operable to determine the next contract block further includes a signature by the first computing device over the updated contract package.

20. The marketplace server of claim 11, wherein the processing module is further operable to perform the returning control by:

adding another contract block to the contract blockchain to produce an updated contract blockchain that indicates the first computing device is a next owner of the contract blockchain; and sending, via the interface, the updated contract blockchain that includes the other contract block to the first computing device.

* * * * *